United States Patent
Petro et al.

(10) Patent No.: US 6,269,387 B1
(45) Date of Patent: Jul. 31, 2001

(54) METHOD AND APPARATUS FOR 3-STAGE 32-BIT ADDER/SUBTRACTOR

(75) Inventors: Anthony M. Petro; James S. Blomgren, both of Austin, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 09/206,463

(22) Filed: Dec. 7, 1998

Related U.S. Application Data

(60) Provisional application No. 60/069,250, filed on Dec. 11, 1997.

(51) Int. Cl.$^7$ .................................................. G06F 7/50
(52) U.S. Cl. ................................................... 708/710
(58) Field of Search ................................. 708/710, 711, 708/712, 713

(56) References Cited

U.S. PATENT DOCUMENTS

| | | | |
|---|---|---|---|
| 3,987,291 | * 10/1976 | Gooding et al. | 708/711 |
| 5,299,145 | * 3/1994 | Yoshida | 708/670 |
| 5,327,369 | * 7/1994 | Ashkenazi | 708/710 |
| 5,463,573 | * 10/1995 | Yoshida | 708/670 |
| 5,467,298 | * 11/1995 | Yoshida | 708/670 |
| 5,600,583 | * 2/1997 | Bosshart et al. | 708/710 |
| 5,943,251 | * 8/1999 | Jiang et al. | 708/710 |

\* cited by examiner

*Primary Examiner*—David H Malzahn
(74) *Attorney, Agent, or Firm*—Booth & Wright, L.L.P.; Matthew J. Booth

(57) ABSTRACT

An apparatus that takes two N-nary operands and selectably performs either addition or subtraction on them to produce an arithmetic result and a carry indicator. Carry-lookahead logic is utilized to create HPG signals for each N-nary dit of the intermediate sum of the two operands and also to create "block" HPG indicators for blocks of dits. In the preferred 1-of-4 embodiment, subtraction may be implemented as four's complement addition. The value of each dit of the intermediate sum is incremented by one before final output if a carry has propagated into the dit.

28 Claims, 28 Drawing Sheets

METHOD AND APPARATUS FOR 3-STAGE 32-BIT ADDER/SUBTRACTOR

This application claims the benefits of the earlier filed U.S. Provisional Application Ser. No. 60/069,250, filed Dec. 11, 1997, which is incorporated by reference for all purposes into this application.

BACKGROUND OF THE INVENTION

1. Field of the Invention

The present invention relates to digital computing, and more particularly to an apparatus and method for a three logic-level 32-bit adder/subtractor that implements carry-propagate logic.

2. Description of the Related Art

Traditional Binary Addition

In most computer systems, addition and subtraction of numbers is supported. In systems using traditional binary logic, the truth table for one-bit addition is set forth in Table 1.

TABLE 1

| A | B | A + B |
|---|---|-------|
| 0 | 0 | 0 |
| 0 | 1 | 1 |
| 1 | 0 | 1 |
| 1 | 1 | 0* |

In the last row of Table 1, a carry condition occurs. That is, the result is 0, but a carry into the next-higher-order bit position, corresponding to a decimal value of 2, has conceptually occurred.

In addition to single bits, the addition operation may be performed on multiple bits, including addition of two two-bit values. The truth table for such an operation is set forth in Table 2, where the first operand A is a two-bit value comprising bits $A_0$ and $A_1$. The second operand, B, is a two-bit value comprising bits $B_0$ and $B_1$.

TABLE 2

| $A_1$ | $A_0$ | $B_1$ | $B_0$ | A = Decimal Value | B = Decimal Value | A + B | A + B = Dec. Value |
|---|---|---|---|---|---|---|---|
| 0 | 0 | 0 | 0 | 0 | 0 | 00 | 0 |
| 0 | 0 | 0 | 1 | 0 | 1 | 01 | 1 |
| 0 | 0 | 1 | 0 | 0 | 2 | 10 | 2 |
| 0 | 0 | 1 | 1 | 0 | 3 | 11 | 3 |
| 0 | 1 | 0 | 0 | 1 | 0 | 01 | 1 |
| 0 | 1 | 0 | 1 | 1 | 1 | 10 | 2 |
| 0 | 1 | 1 | 0 | 1 | 2 | 11 | 3 |
| 0 | 1 | 1 | 1 | 1 | 3 | 00* | 0 |
| 1 | 0 | 0 | 0 | 2 | 0 | 10 | 2 |
| 1 | 0 | 0 | 1 | 2 | 1 | 11 | 3 |
| 1 | 0 | 1 | 0 | 2 | 2 | 00* | 0 |
| 1 | 0 | 1 | 1 | 2 | 3 | 01* | 1 |
| 1 | 1 | 0 | 0 | 3 | 0 | 11 | 3 |
| 1 | 1 | 0 | 1 | 3 | 1 | 00* | 0 |
| 1 | 1 | 1 | 0 | 3 | 2 | 01* | 1 |
| 1 | 1 | 1 | 1 | 3 | 3 | 10* | 2 |

Each output value in the "A+B" column of Table 2 indicated with an asterisk denotes a carry condition where a logical one has conceptually carried into the next-higher-order bit (the bit position corresponding to a decimal value of four).

N-nary Logic

The N-nary logic family supports a variety of signal encodings, including 1-of-4. The N-nary logic family is described in a copending patent application, U.S. patent application Ser. No. 09/019,355, filed Feb. 5, 1998, now U.S. Pat. No. 6,066,965, and titled "Method and Apparatus for a N-Nary logic Circuit Using 1-of-4 Encoding", which is incorporated herein for all purposes and is hereinafter referred to as "The N-nary Patent." In 1-of-4 encoding, four wires are used to indicate one of four possible values. In contrast, traditional static logic design uses two wires to indicate four values, as is demonstrated in Table 2. In Table 2, the $A_0$ and $A_1$ wires are used to indicate the four possible values for operand A: 00, 01, 10, and 11. The two B wires are similarly used to indicate the same four possible values for operand B. "Traditional" dual-rail dynamic logic also uses four wires to represent two bits, but the dual-rail scheme always requires two wires to be asserted. In contrast, N-nary logic only requires assertion of one wire. The benefits of N-nary logic over dual-rail dynamic logic, such as reduced power and reduced noise, should be apparent from a reading of The N-nary Patent.

All signals in N-nary logic, including 1-of-4, are of the 1-of-N form where N is any integer greater than one. A 1-of-4 signal requires four wires to encode four values (0–3 inclusive), or the equivalent of two bits of information. More than one wire will never be asserted for a 1-of-N signal. Similarly, N-nary logic requires that a high voltage be asserted for all values, even 0.

Any one N-nary gate may comprise multiple inputs and/or outputs. In such a case, a variety of different N-nary encodings may be employed. For instance, consider a gate that comprises two inputs and two outputs, where the inputs are a 1-of-4 signal and a 1-of-2 signal and the outputs comprise a 1-of-4 signal and a 1-of-3 signal. Various variables, including P, Q, R, and S, may be used to describe the encoding for these inputs and outputs. One may say that one input comprises 1-of-P encoding and the other comprises 1-of-Q encoding, wherein P equals two and Q equals four. Similarly, the variables R and S may be used to describe the outputs. One might say that one output comprises 1-of-R encoding and the other output comprises 1-of-S encoding, wherein R equals four and S equals 3. Through the use of these, and other, additional variables, it is possible to describe multiple N-nary signals that comprise a variety of different encodings.

SUMMARY OF THE INVENTION

The present invention is an apparatus that takes two N-nary operands and performs an arithmetic operation, either addition or subtraction, on them to produce a result. In the preferred embodiment, the operands comprises two 32-bit 1-of-4 operands. Carry-lookahead logic is utilized to create HPG signals for each N-nary dit of the intermediate sum of the two operands. The HPG signals are used to create "block" HPG indicators for blocks of dits. A 1-of-2 ADD/SUB selector signal may be used to select whether addition or subtraction is performed. In subtraction for two 1-of-4 operands, subtraction is implemented as three's complement addition. In the least significant dit, the three's complement of the A operand is incremented by one, to create the four's complement, before it is added to the B operand. The value of each dit of the intermediate sum is incremented by one before final output if a carry has propagated into the dit. The present invention produces as outputs a 32-bit 1-of-4 sum and a 1-of-2 carry signal.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention relates to a logic gate that adds or subtracts two input values. For addition, the present invention produces a sum and also produces a carry propagate indicator using N-nary logic. The gate has a selectable subtract mode that produces a difference and a borrow/carry propagate indicator for the two input values. This disclosure describes numerous specific details that include specific formats, structures, circuits, and logic functions in order to provide a thorough understanding of the present invention. One skilled in the art will appreciate that one may practice the present invention without these specific details. Additionally, this disclosure does not describe in detail some well-known structures such as N-FETs, P-FETs, nor does it describe N-nary logic in detail, in order not to obscure the present invention.

N-nary Logic Circuits

Figure 1:
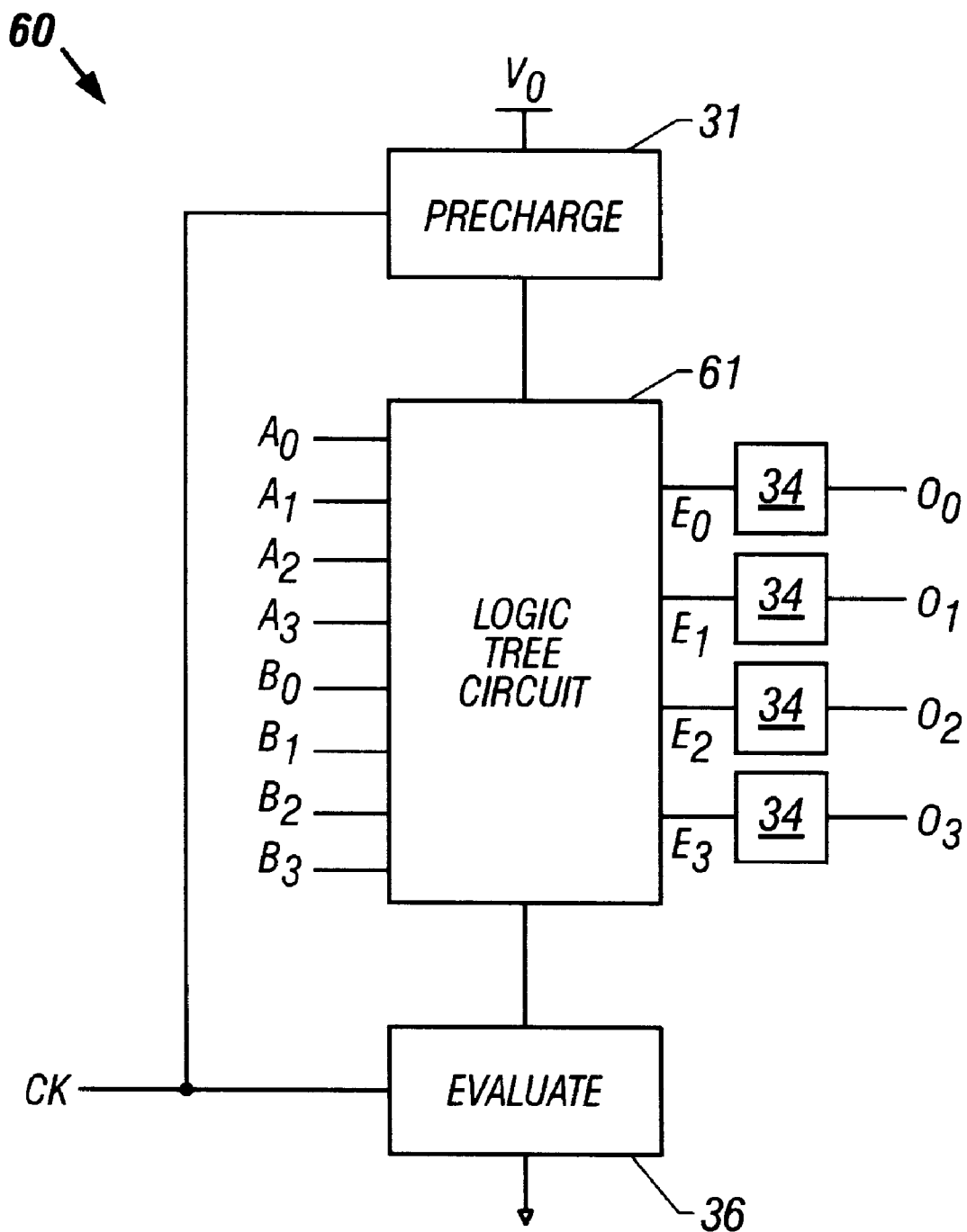
FIG. 1 is a block diagram of an N-nary gate.

N-nary logic may be used to create circuits to perform a desired function. The present invention utilizes N-nary logic in the preferred embodiment of a 3-level 32-bit sum/carry-propagate adder/subtractor. A background discussion of N-nary circuits is in order before discussing the 3-level 32-bit combined sum/carry-propagate adder/subtractor of the present invention. FIG. 1 illustrates a 1-of-N logic gate 60 that uses two sets of 1-of-N signals for the inputs and produces one 1-of-N signal for the output. In gate 60, the A and B inputs comprise four wires each, with each set of wires representing 2 bits (one dit) of data. A is a one-dit input, B is a one-dit input, and 0 is a one-dit output. In other words, the gate 60 depicted in FIG. 1 comprises 4 input bits (2 dits) and 2 output bits (one dit).

Figure 2:
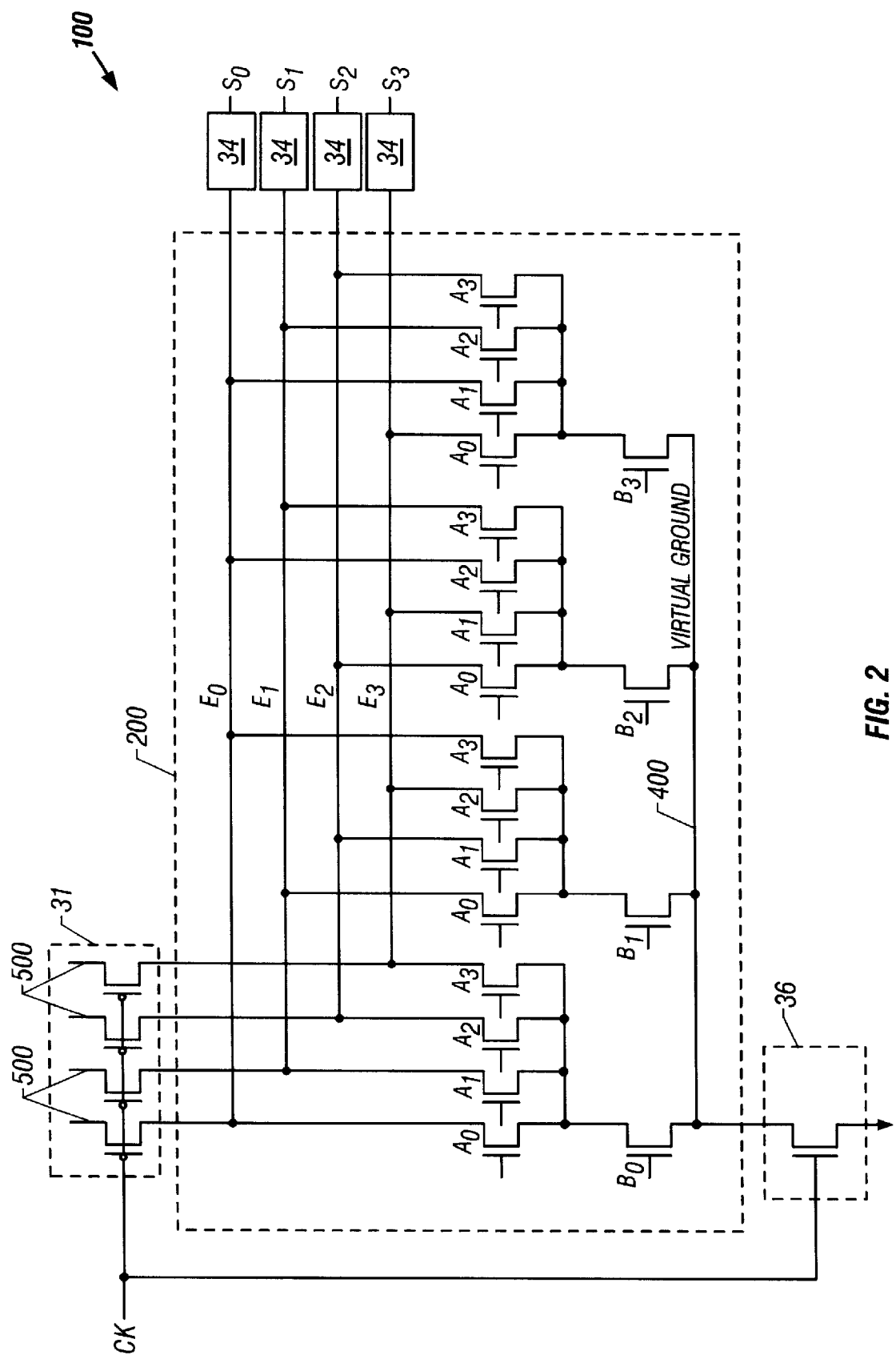
FIG. 2 is an illustration of an N-nary adder gate.

Referring to FIG. 1, each N-nary dit logic circuit 60 comprises a logic tree circuit 61, a precharge circuit 31, and an evaluate circuit 36. The logic tree circuit 61 performs a logic function on the two 1-of-4 input signals that could comprise a variety of functions, for example, the Boolean logic functions AND/NAND and OR/NOR, or the more complex add/subtract/carry-propagate function of the present invention. The logic gates of the N-nary family are clocked pre-charge (CP) gates. FIG. 2 illustrates that each input into the logic tree circuit 61 $A_0$-$A_{-3}$, $B_0$–$B_3$ is coupled to at least one N-channel field effect transistor (NFET) $A_0$–$A_3$, $B_0$–$B_3$. Referring back to FIG. 1, the logic tree circuit 61 therefore comprises one or more N-channel FETS. Coupled to the wires of the 1-of-4output signal are the output buffers 34 that aid in driving additional circuits that couple to the output signal. The preferred embodiment of the present invention uses a circuit with an inverting function as the output buffer 34.

Referring again to FIG. 1, a precharge circuit 31 couples to the logic tree circuit 61 and precharges the dynamic logic of the logic tree circuit 61. The precharge circuit 31 comprises one or more FETs with the preferred embodiment of the circuit comprising P-channel FETs (PFETs). Each evaluation path of the logic tree circuit 61 has its own precharge PFET, shown as 500 in FIG. 2. The PFETs 500 of the precharge circuit 31 quickly and fully precharge all of the dynamic logic in the logic tree circuit 61 during the precharge phase of the clock cycle.

FIG. 2 is a diagram of an N-nary adder gate. FIG. 2 illustrates that the precharge PFET 500 for an evaluation node E of an N-nary circuit is connected to positive high voltage, Vcc, and is used to create conductive paths between the evaluation node E and Vcc. Each precharge PFET 500 is coupled to an input, the pre-charge signal. When the precharge signal for any evaluate node has a low voltage, then there is a conductive path between Vcc and the evaluation node E. Coupled to the precharge circuit 31 is the clock signal CK. A low clock signal on CK will cause the FETs in the logic tree circuit 32 to charge when using P-channel FETs in the precharge circuit 31.

An evaluate circuit 36 couples to the logic tree circuit 61 and controls the evaluation of the logic tree circuit 61. The evaluate circuit 36 comprises one or more FETs connected to the CK signal, with the preferred embodiment of the evaluate circuit comprising a single N-channel FET. The single N-FET acts as an evaluation transistor that is used to control when the gate is sensitive to inputs, helps avoid races between other devices, and prevents excessive power consumption. During the precharge phase, the evaluate circuit 36 receives a low value so that no path to Vss may exist through the NFET(s) of the logic tree circuit 61. During the evaluate phase, the evaluate circuit 36 receives a high signal so that a path to Vss through the NFET(s) of the logic tree circuit 61 may exist. Coupled to the evaluate circuit 36 is the clock signal CK. A high clock signal on CK will cause the FETs in the logic tree circuit 61 to evaluate when using N-channel FETs in the evaluate circuit 36. In other words, when the clock signal is high, the evaluate circuit 36 evaluates the logic tree circuit 61.

An evaluate node, E, which comprises the four wires $E_0$, $E_1$, $E_2$, and $E_3$, is the signal pathway between the logic tree circuit 61 and an output buffer 34, and constitutes an evaluation path of the logic tree circuit 61. As stated earlier, each evaluation node wire $E_0$, $E_1$, $E_2$, and $E_3$ has its own precharge PFET. The signal on a particular wire, $E_0$, $E_1$, $E_2$, $E_3$ of the evaluate node E is high only when there is no connection to Vss through the logic tree circuit 61 NFET(s) associated with that particular wire. If the pre-charge signal is low at time 0 and there is no path to ground through the NFET(s) associated with an evaluate node E of the logic tree circuit 61, then the evaluate node wire E gets pulled to a high voltage. This is called the precharge phase of the gate and we may also say that the gate is in precharge mode. If the precharge signal switches to a high voltage at a later time, the evaluate node E will be floating, but the charge left on it will leave the voltage high. This is called the evaluate phase of the gate, and we may also say that the gate is in evaluate mode. If input signals generate a high voltage for any NFET(s) in the logic tree circuit 61 such that a path from the evaluate node E to ground (Vss) exists, then the charge on the evaluate node E will drain to ground, and the evaluate voltage will drop to Vss. If no such path exists, then the evaluate node E will remain at Vcc. When any gate, therefore, switches from precharge mode to evaluate mode, the evaluate node voltage is high, and it either stays high or goes low. Once the evaluate node voltage goes low during the evaluate phase, it cannot be driven high again until the next precharge phase.

Figure 3:
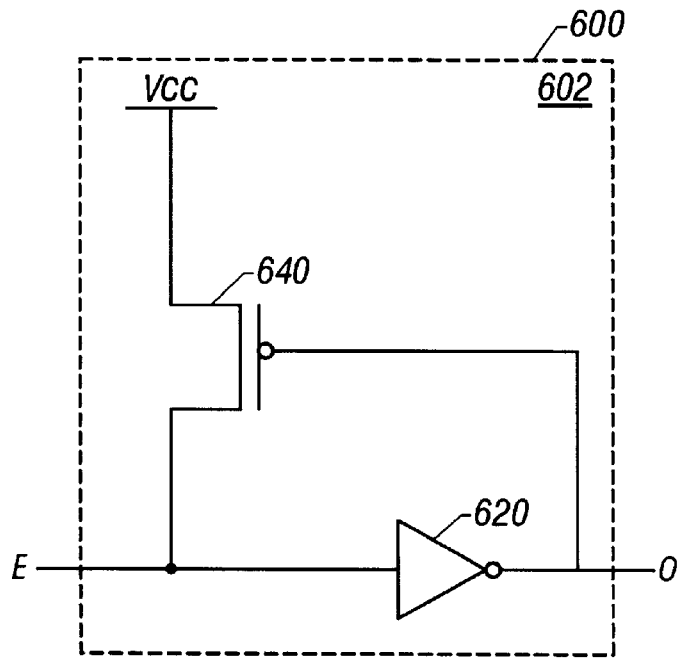
FIG. 3 is a diagram of a first embodiment of an N-nary output driver circuit.
Figure 4:
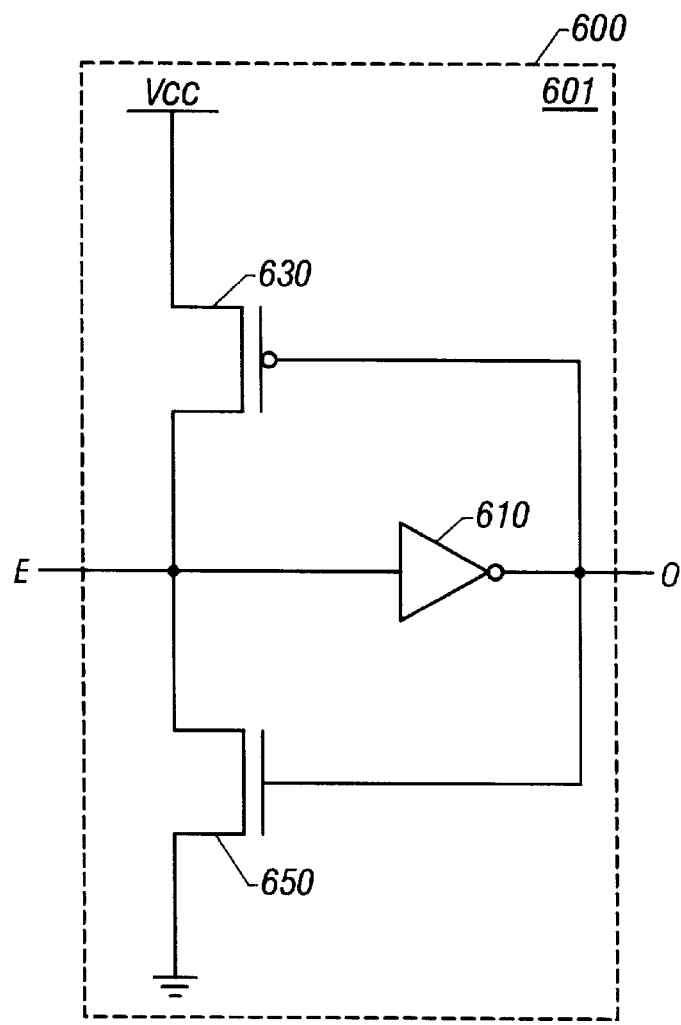
FIG. 4 is a diagram of a second embodiment of an N-nary output driver circuit.

Each evaluate node wire $E_0$, $E_1$, $E_2$, and $E_3$ couples to an output buffer 34. Two embodiments of the output driver circuit 600 comprising the output buffer 34 are illustrated in FIGS. 3 and 4. FIG. illustrates a half keeper output driver circuit 602 that comprises an inverter 620 and a PFET device 640. FIG. 4 illustrates a full keeper output driver circuit 601 that comprises an inverter 610 coupled to a PFET device 630 and an NFET device 650. Full keeper circuits 601 are necessary for gates that can be in neither evaluate nor precharge mode for lengthy periods. The flow through the output driver circuit 600 is from evaluate node E to the output signal path 0. The inverter 610, 620 of the output driver circuit 600 is necessary because the evaluate nodes of CP gates of the N-nary logic family precharge to a high value and evaluate to a low value. The output driver circuit 600 of the output buffer 34 holds the value of an evaluate node E during an evaluate phase if the evaluate node E has not discharged. If the evaluate node E has discharged, then there is a path to ground holding its value low. The output of each evaluate node E will switch from low to high once, at most, during an evaluate phase. The output of each evaluate node E, once coupled to an output driver circuit 600 of an output buffer 34, is therefore suitable for feeding a subsequent CP gate.

Figure 5:
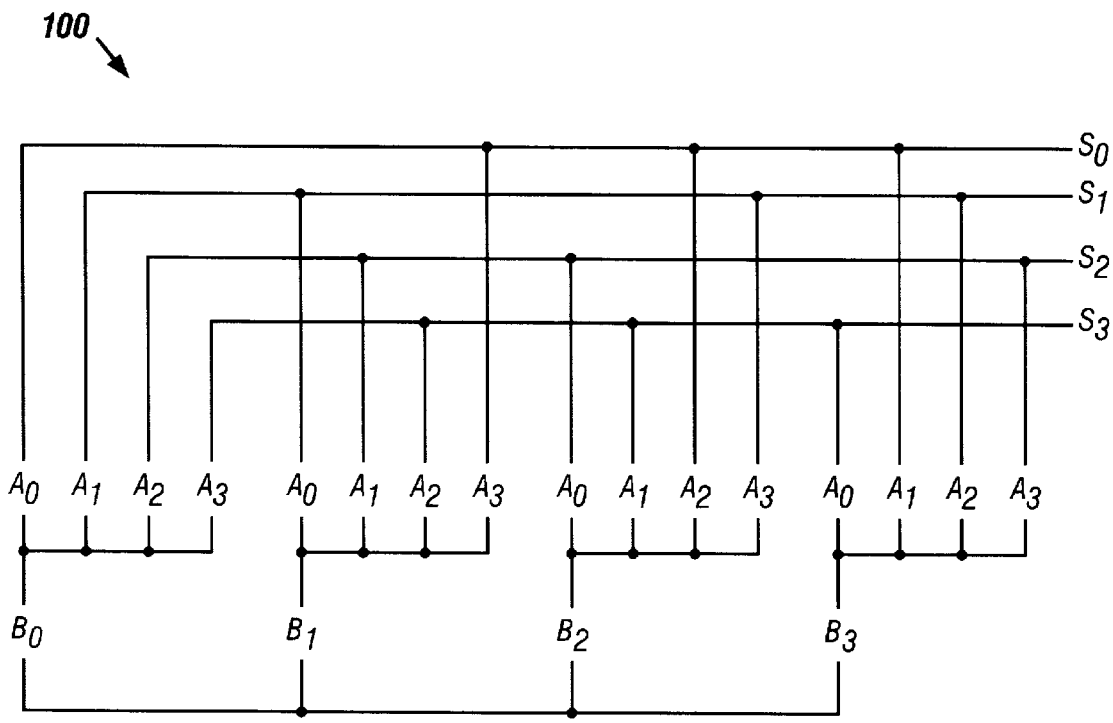
FIG. 5 is a shorthand representation of an N-nary adder gate having two 1-of-4 inputs.
Figure 8:
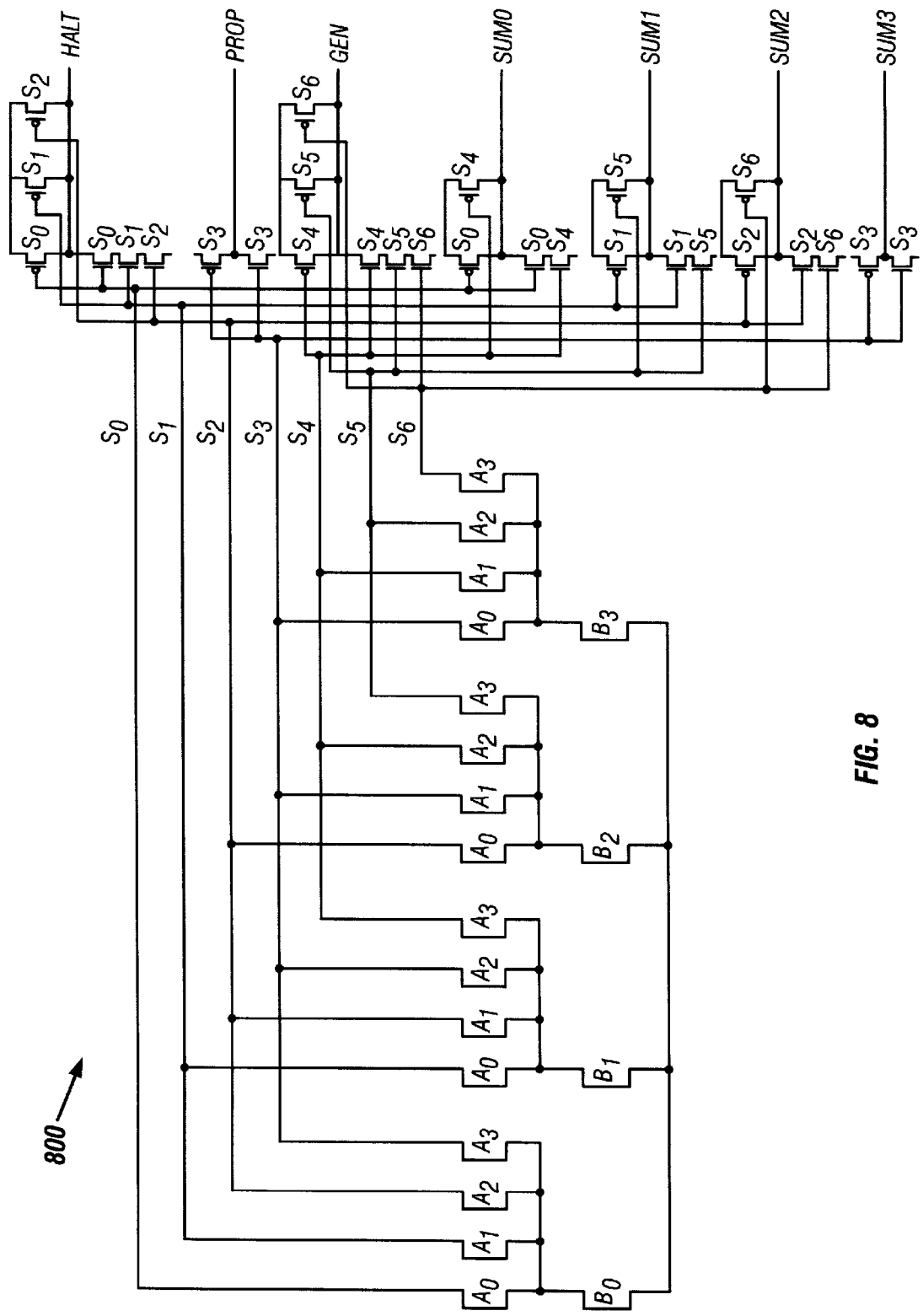
FIG. 8 is a modified shorthand representation of a Sum/HPG gate.
Figure 9:
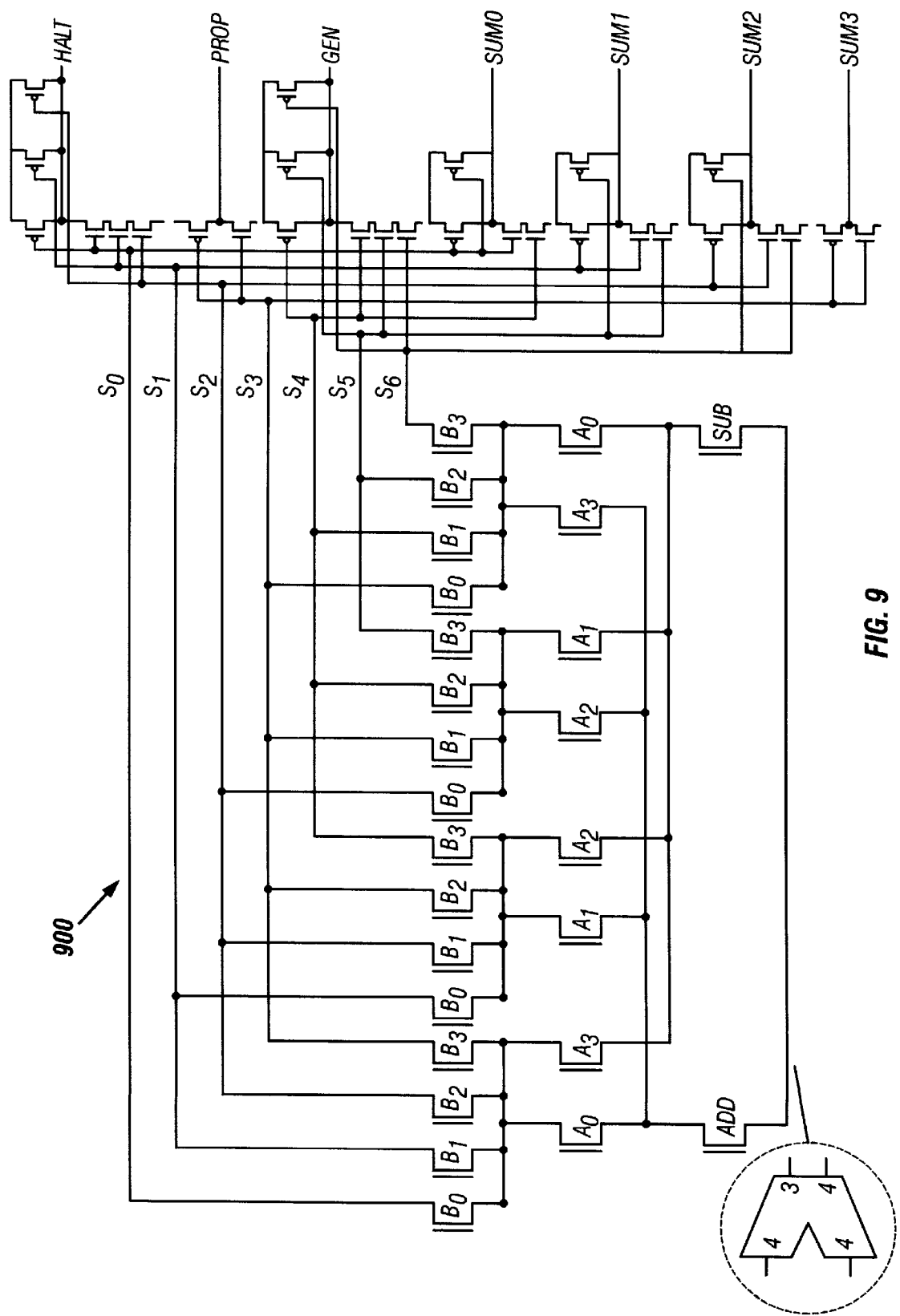
FIG. 9 is a modified shorthand representation of the Level 1 Sum/HPG adder/subtractor gate of the present invention.
Figure 10:
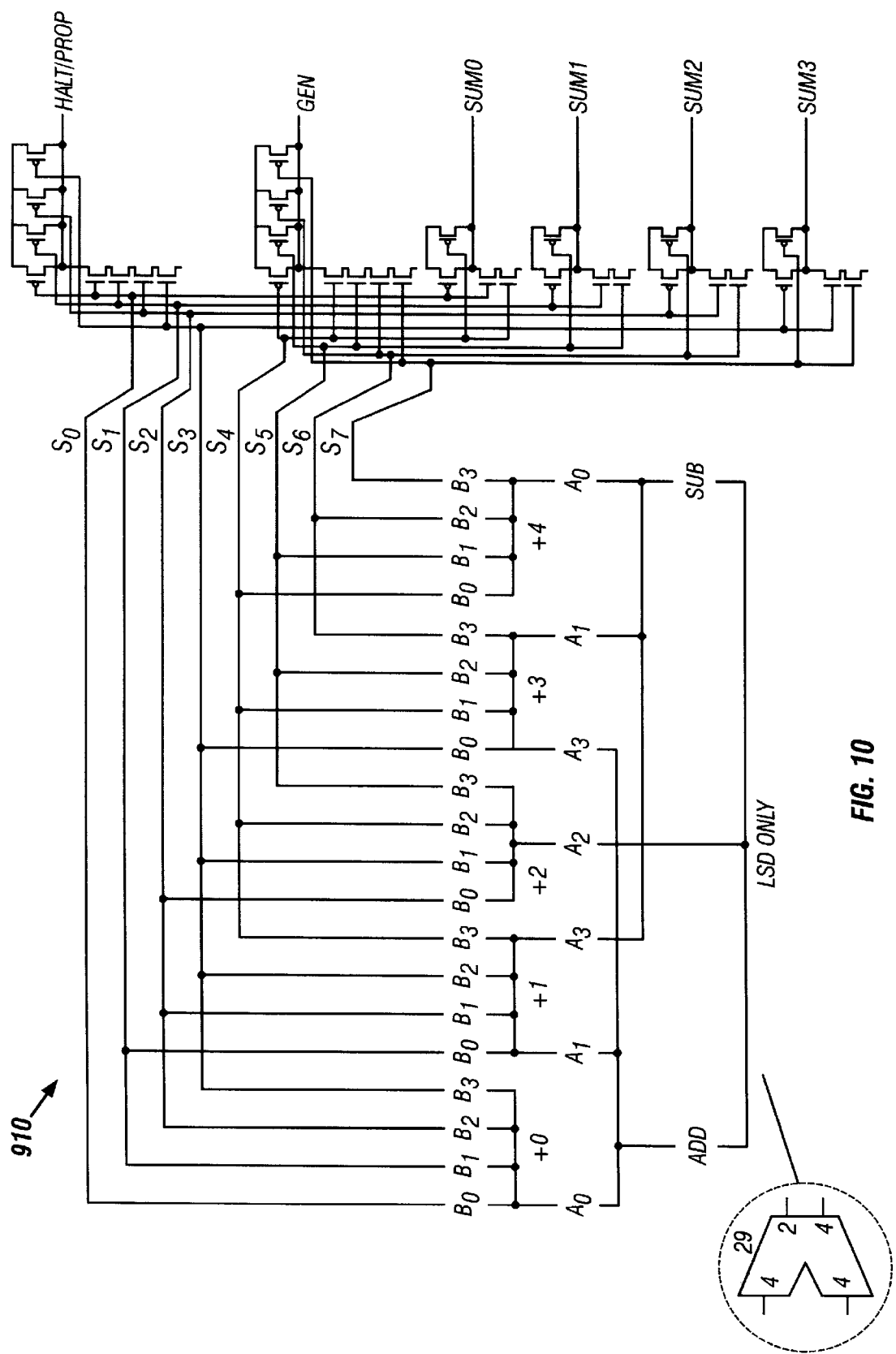
FIG. 10 is a shorthand representation of the Level 1 Sum/HPG adder/subtractor gate for the LSD.

A shorthand notation for N-nary circuit diagrams can be adopted to avoid needless repetition of elements common to all N-nary circuits. FIG. 2 illustrates these common elements. One common element is the precharge P-FET 500. Precharge P-FETs 500 are required for each evaluate node E in every 1-of-N gate. Since all N-nary gates require a pre-charge P-FET 500 for each evaluate node E, the precharge P-FETs 500 may be implied and need not be shown. The same is true for the N-FET associated with each input wire of the A and B inputs. Similarly, each evaluate node E must have its own output buffer 34, which may be implied. The N-FET associated with the evaluate node 36 may also be implied. Since these features are common to all N-nary circuits, we may use the shorthand shown in FIG. 5 to represent the N-nary circuits. Accordingly, FIG. 5 illustrates a shorthand notation of the adder gate depicted in FIG. 2. This shorthand notation is used in FIGS. 5, 7, and 12–18B. FIGS. 8, 9, and 10 use a modified shorthand representation in which N-FETS associated with certain inputs are expressly represented, but all other elements discussed herein are implied. In each figure, the elements discussed herein should be implied accordingly.

Figures 6, 7:
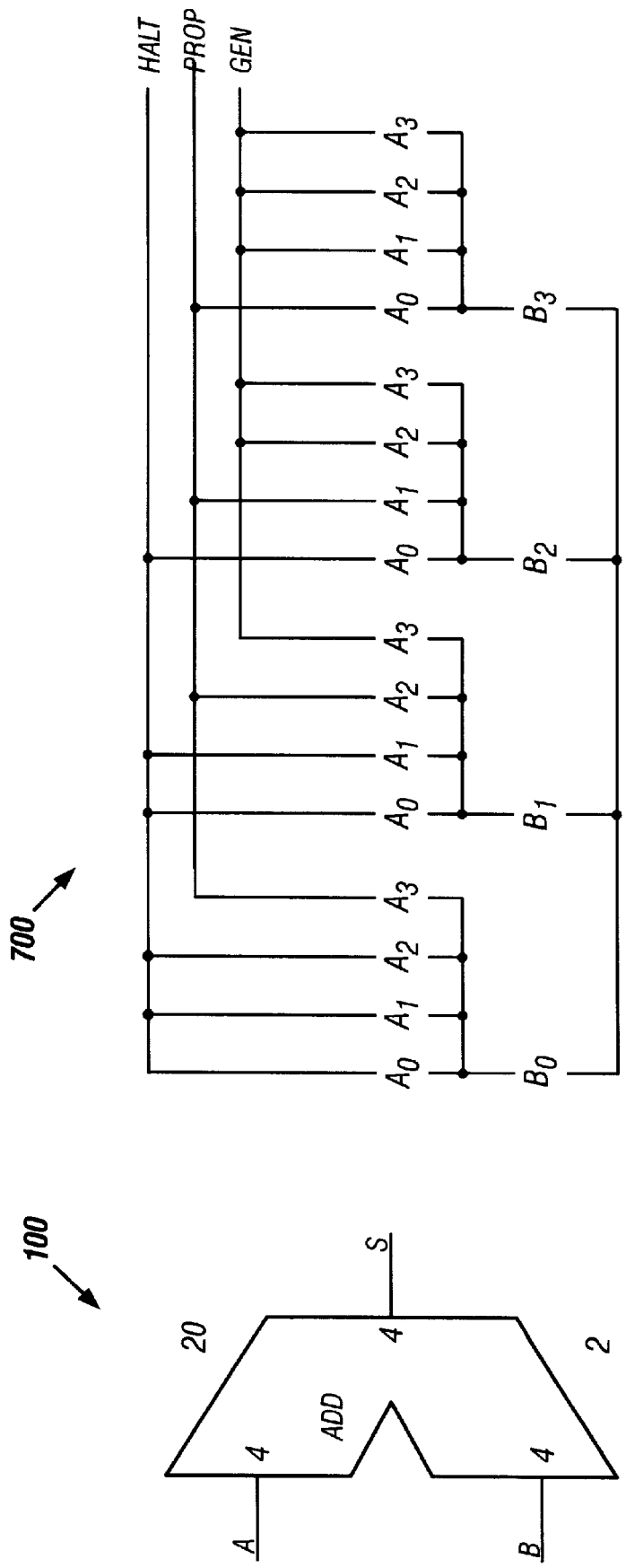
FIG. 6 is a high-level shorthand representation of an N-nary adder gate.
FIG. 7 is a shorthand representation of an N-nary HPG gate having two 1-of-4 inputs.

A further simplification to the representation of the FIG. 2 adder is shown in FIG. 6, where the inputs and outputs are shown as single signals that each can represent one of four signals and each implicitly comprises four wires. The number "4" shown within the add gate of FIG. 6, adjacent to the connections, indicates that each signal can represent one of four values. The number above the gate indicates the number of transistors in the evaluate stack, and the number below the FIG. 6 gate represents the maximum number of transistors in series between the evaluate node and virtual ground. This high level shorthand notation is also used in FIGS. 10–18B and 20–29. In those figures, the elements discussed herein should be implied accordingly.

Preferred Embodiment of Present Invention—Overview

Figure 11:
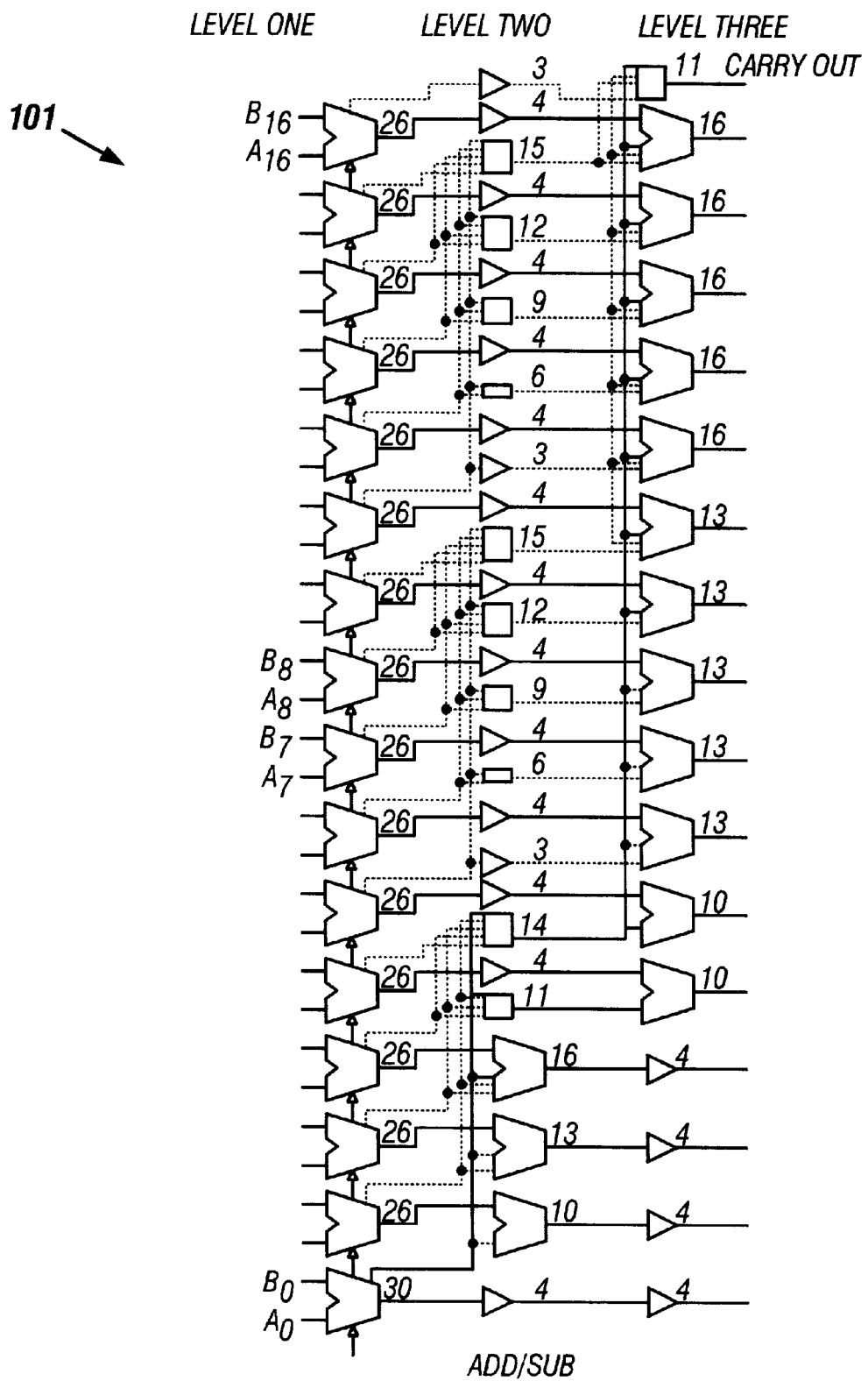
FIG. 11 is a high-level shorthand representation of the preferred embodiment of the present invention.
Figure 19:
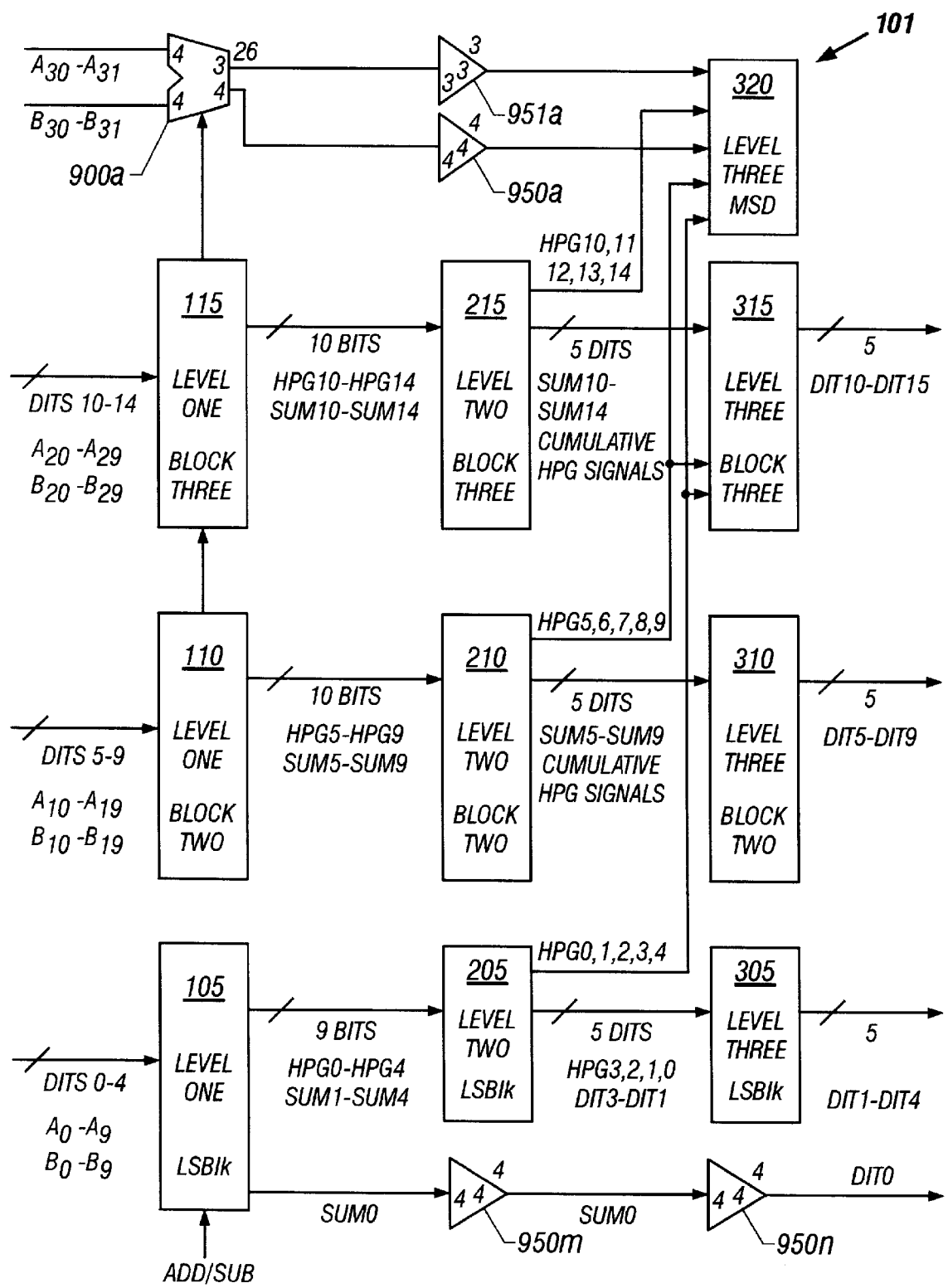
FIG. 19 is a block diagram of the preferred embodiment of the present invention.

FIG. 11 illustrates that the 32-bit carry-propagate adder/subtractor 101 of the present invention (sometimes hereinafter referred to as simply "adder") comprises three logic levels: Level One, Level Two, and Level Three. Inputs into the adder 101 are a 1-of-2 add/subtract signal ("ADD/SUB") and two 32-bit 1-of-4 operands ("A" and "B"). The output of the adder is a 32-bit 1-of-4 sum, comprising DIT0 through DIT 15, and a 1-of-2 carry signal carry-out. FIG. 19 illustrates that the three levels of logic, Level One, Level Two, and Level Three, of the adder 101 each may conceptually be further divided into three or more distinct blocks of logic.

Level One generates a 1-of-4 intermediate sum and a 1-of-3 HPG signal (1-of-2 for the LSD) for each dit of the input operands A and B. Level One is divided into logic blocks referred to in FIG. 19 as "Level One, LSBlk" 105, "Level One, Block Two" 110, and "Level One, Block Three" 115. Level One further comprises an additional gate, 900*a*, for processing the MSD of inputs A and B. FIG. 19 illustrates that the 32 bits of the two operands, A and B, are divided as inputs into the various Level One logic blocks 105, 110, 115 and gate 900*a*. FIG. 19 illustrates that the five least significant dits of A and B, dits 0 through 4, the ten bits referred to herein as the least significant block, or LSBlk, comprise inputs into Level One, LSBlk 105. The next 5 dits of each input, A and B, dits 5 through 9, which are the ten bits of A and B that are immediately more significant than the LSBlk, are shown in FIG. 19 as inputs into Level One, Block Two 110. The next most-significant set of five dits of A and B, dits 10 through 14, comprise inputs into Level One, Block Three 115. Finally, the most significant dit of A and B comprise the inputs into an add gate 900*a* that performs Level One processing for the most significant dit ("MSD") of the two operands.

Figure 12:
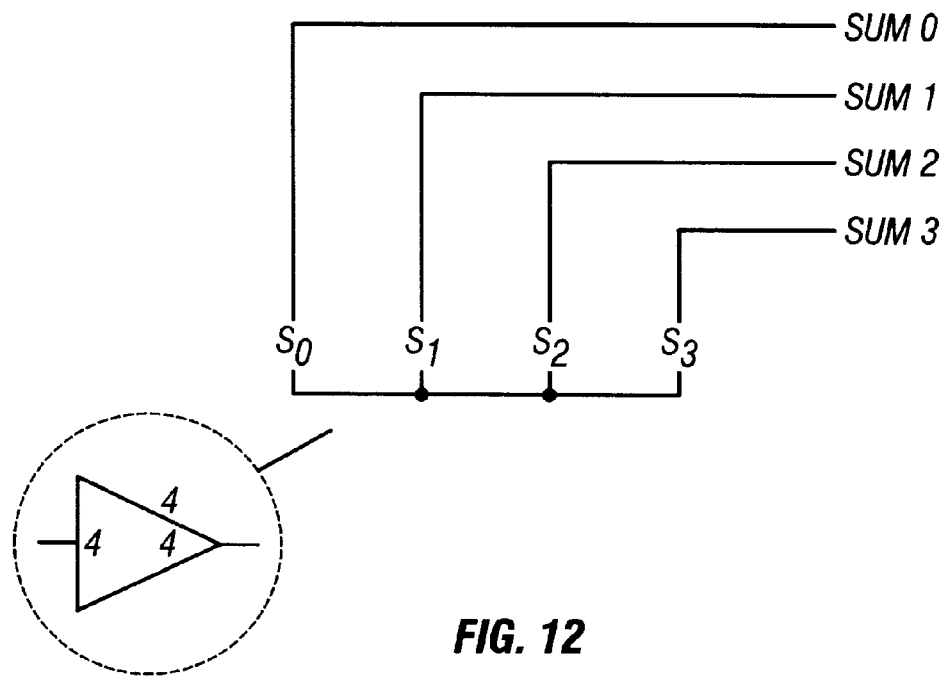
FIG. 12 is a shorthand representation of a sum buffer.
Figure 12A:
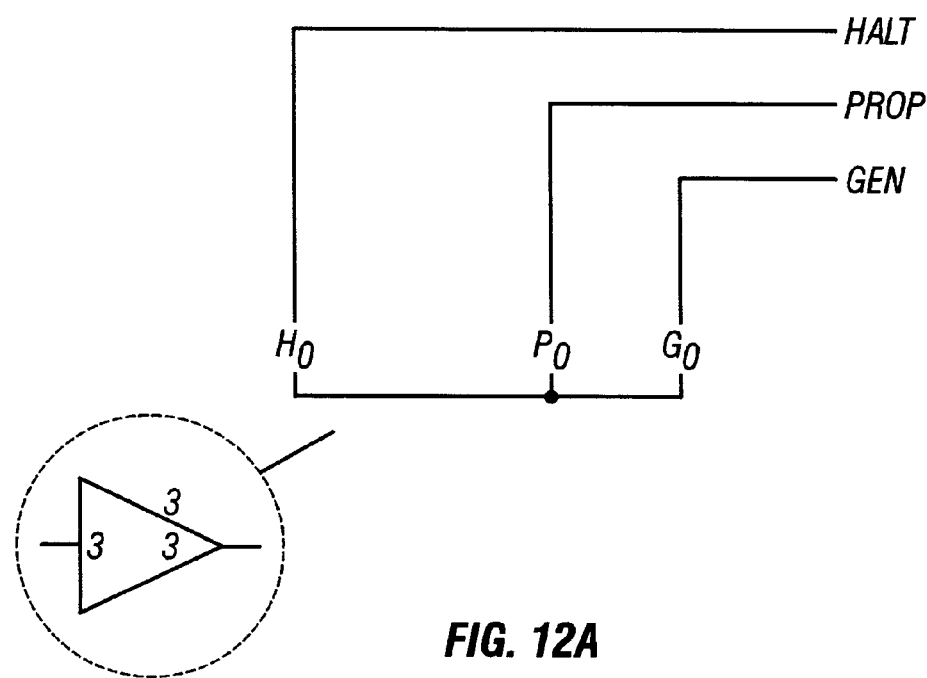
FIG. 12A is a shorthand representation of a n HPG buffer.

Level Two performs block HPG processing. That is, the intermediate sums generated by Level One are, for the most part, merely held by Level Two in buffers for later use by Level Three. Level Two processing therefore focuses, for the most part, on using the HPG signals created by Level One to generate block HPG signals. Level Two comprises "Level Two, LSBlk" 205, "Level Two, Block Two" 210, and "Level Two, Block Three" 215. In addition, Level Two comprises two additional sum buffers 950*a* and 950*m*, and also comprises an additional HPG buffer 951*a*. FIG. 12A illustrates an HPG buffer 951 of the present invention.

Finally, Level Three is also grouped into distinct logic blocks, labeled in FIG. 19 as "Level Three, LSBlk" 305, "Level Three, Block Two" 310, "Level Three, Block Three" 315, and "Level Three, MSD" 320. Generally, Level Three examines the block HPG signal generated by Level Two for each dit of the intermediate sum. If there is a carry into the dit, then Level Three increments that dit of the intermediate sum before final output. Otherwise, Level Three merely passes the intermediate sum through from the Level Two buffer to the final output for that dit. An exception to this general scheme occurs in processing the least significant dit ("LSD"). There will never be a carry into the least significant dit. Level Two block HPG processing is therefore not necessary for the least significant dits. Instead, for the four least significant dits of the intermediate sum, Level Two increments the intermediate sum, if there is a carry into the dit, and passes the result to a Level Three buffer. A more detailed explanation for each of the three logic levels of the present invention is set forth below.

Level One Logic—Overview

Level One generates an intermediate sum (or difference, in the case of subtraction) generated from one dit of operand A and one dit of operand B. The gates 900, 910 that generate this sum are discussed in greater detail below. The intermediate sum produced by Level One does not account for carry (or borrow) conditions, as this will be added in the final level of logic. Instead, a (H)alt, P(ropagate), and (G)enerate status is derived for each dit position. The meaning of this HPG status is discussed in greater detail below in the discussion of carry-propagate logic.

Level One N-nary Addition Logic

The present invention implements both addition and subtraction using N-nary logic. Our discussion of Level One logic will begin with the addition function. A truth table demonstrating the add operation using 1-of-4 encoding is set forth in Table 3. Each of the two-bit 1-of-4 inputs, A and B, in Table 3 can represent one of four values, 0 through 3 inclusive, depending on which of the four wires for each signal is set high. Table 3 discards any potential input value that includes more than one wire asserted for each 1-of-4 signal, such as 1111 and 0101. Such values are undefined for the evaluate stage of 1-of-4 logic gates. The four wires for the two-bit sum of the 1-of-4 addition operation in Table 3 are labeled $S_3$, $S_2$, $S_1$, and $S_0$.

TABLE 3

| $A_3$ | $A_2$ | $A_1$ | $A_0$ | A Dec. Value | $B_3$ | $B_2$ | $B_1$ | $B_0$ | B Dec. Value | $S_3$ | $S_2$ | $S_1$ | $S_0$ | Output Decimal Value |
|---|---|---|---|---|---|---|---|---|---|---|---|---|---|---|
| 0 | 0 | 0 | 1 | 0 | 0 | 0 | 0 | 1 | 0 | 0 | 0 | 0 | 1 | 0 |
| 0 | 0 | 0 | 1 | 0 | 0 | 0 | 1 | 0 | 1 | 0 | 0 | 1 | 0 | 1 |
| 0 | 0 | 0 | 1 | 0 | 0 | 1 | 0 | 0 | 2 | 0 | 1 | 0 | 0 | 2 |
| 0 | 0 | 0 | 1 | 0 | 1 | 0 | 0 | 0 | 3 | 1 | 0 | 0 | 0 | 3 |
| 0 | 0 | 1 | 0 | 1 | 0 | 0 | 0 | 1 | 0 | 0 | 0 | 1 | 0 | 1 |
| 0 | 0 | 1 | 0 | 1 | 0 | 0 | 1 | 0 | 1 | 0 | 1 | 0 | 0 | 2 |
| 0 | 0 | 1 | 0 | 1 | 0 | 1 | 0 | 0 | 2 | 1 | 0 | 0 | 0 | 3 |
| 0 | 0 | 1 | 0 | 1 | 1 | 0 | 0 | 0 | 3 | 0 | 0 | 0 | 1 | 0* |
| 0 | 1 | 0 | 0 | 2 | 0 | 0 | 0 | 1 | 0 | 0 | 1 | 0 | 0 | 2 |
| 0 | 1 | 0 | 0 | 2 | 0 | 0 | 1 | 0 | 1 | 1 | 0 | 0 | 0 | 3 |
| 0 | 1 | 0 | 0 | 2 | 0 | 1 | 0 | 0 | 2 | 0 | 0 | 0 | 1 | 0* |
| 0 | 1 | 0 | 0 | 2 | 1 | 0 | 0 | 0 | 3 | 0 | 0 | 1 | 0 | 1* |
| 1 | 0 | 0 | 0 | 3 | 0 | 0 | 0 | 1 | 0 | 1 | 0 | 0 | 0 | 3 |
| 1 | 0 | 0 | 0 | 3 | 0 | 0 | 1 | 0 | 1 | 0 | 0 | 0 | 1 | 0* |
| 1 | 0 | 0 | 0 | 3 | 0 | 1 | 0 | 0 | 2 | 0 | 0 | 1 | 0 | 1* |
| 1 | 0 | 0 | 0 | 3 | 1 | 0 | 0 | 0 | 3 | 0 | 1 | 0 | 0 | 2* |

In Table 3, output values with asterisks indicate that a carry is conceptually generated into a higher-order bit representing a decimal value of 4.

Illustration: Basic N-nary Adder Gate

Figure 5A:
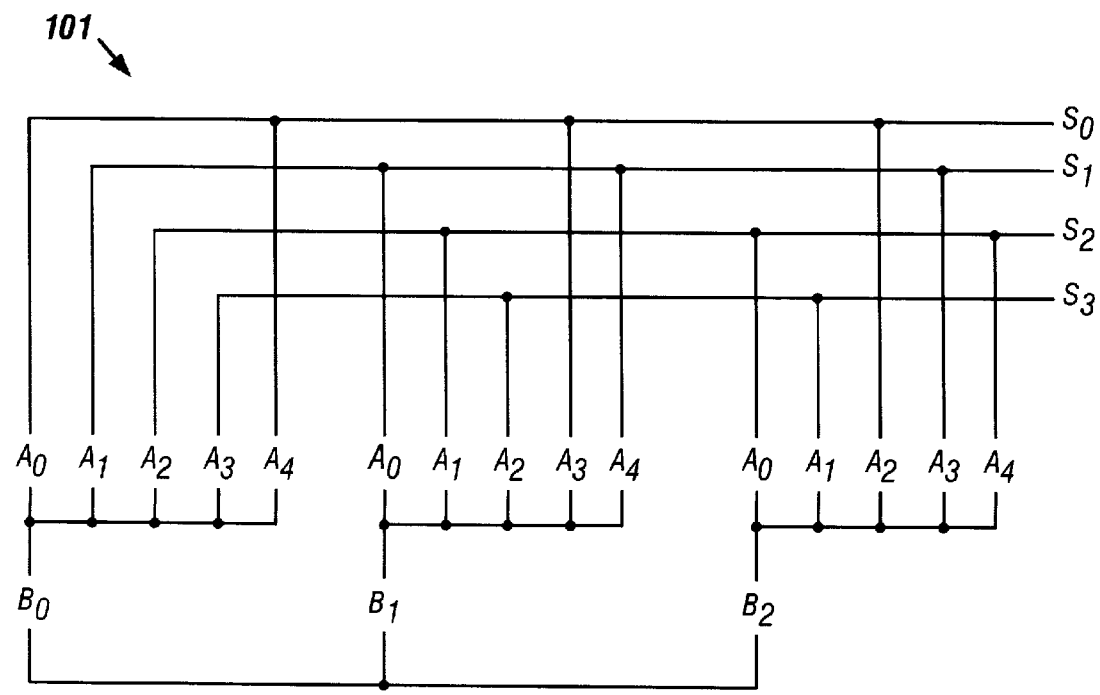
FIG. 5A is a shorthand representation of an N-nary adder gate having one 1-of-3 input and one 1-of-5 input.

FIG. 5 illustrates an N-nary adder circuit 100 that uses 1-of-4 logic to perform the addition function on two two-bit 1-of-4 inputs to generate a two-bit 1-of-4 output signal conforming to Table 3. A similar function may be performed with a gate 101 that takes one 1-of-3 input and one 1-of-5 input. Such a gate 101 is illustrated in FIG. 5A. The function of the adder circuit 100 illustrated in FIG. 5 is to add two 1-of-4 inputs and produce the least significant two bits of the sum, which is also implemented as a 1-of-4 signal. Since the adder circuit 100 operates on two four-value signals it is not appropriate to refer to it as binary. The function of the adder gate 100 is quaternary, rather than binary.

The adder circuit 100 illustrated in FIG. 5 has an A input signal comprising four wires, $A_0$, $A_1$, $A_2$, and $A_3$, and a B input signal comprising four wires, $B_0$, $B_1$, $B_2$, and $B_3$. The A input signal and the B input signal can each represent any integer having a decimal value between zero and three, inclusive. Since N-nary logic requires that only one of the four lines representing the A input be asserted at any one time, and only one of the B input wires be asserted at one time, it is convenient to treat the A and B signals as individual inputs that each can represent one of four values. The adder circuit 100 therefore has eight inputs: $A_0$, $A_1$, $A_2$, $A_3$, $B_0$, $B_1$, $B_2$, and $B_3$. If the value of A is zero, then the $A_0$ line is set high and all other A lines, $A_1$, $A_2$, $A_3$, are set low. By the same token, the $B_0$ line corresponds to zero. Similarly, the $A_1$ line and $B_1$ line correspond to the decimal value of one. The $A_2$ line and $B_2$ line correspond to the decimal value of two. Finally, the $A_3$ line and $B_3$ line correspond to the decimal value of three. The adder circuit 100 illustrated in FIG. 5 performs the following logic functions:

$S_0 = B_0 A_0 | B_1 A_3 | B_2 A_2 | B_3 A_1$ (all cases that equal 0 or 4), $S_1 = B_0 A_1 | B_1 A_0 | B_2 A_3 | B_3 A_2$ (all cases that equal 1 or 5), $S_2 = B_0 A_2 | B_1 A_1 | B_2 A_0 | B_3 A_3$ (all cases that equal 2 or 6), and $S_3 = B_0 A_3 | B_1 A_2 | B_2 A_1 | B_3 A_0$ (all cases that equal 3).

Level One Carry Propagate Logic

The adder gate in FIG. 5 is not complete for the purposes of the present invention because it does not provide any information as to whether the sum is too large to represent in two bits of information. In other words, the FIG. 5 adder does not support the carry conditions denoted by asterisks in Table 3. For the addition function of the present invention, what is required is an adder gate that can not only sum two one-dit numbers, but can utilize carry-propagate techniques to account for carry conditions. This is accomplished through the use of carry propagate logic, as described below.

Carry propagate logic takes carry conditions into account. For any two binary numbers A and B, the sum, $S_n$, and the carry, $C_n$, for a given bit position, n, are:

$$S_n = A_n \oplus B_n \oplus C_{n-1}, \text{ where } C_{n-1} \text{ is the carry in from the previous bit, n-1.} \quad (1)$$

$$C_n = A_n B_n | A_n C_{n-1} | B_n C_{n-1}, \text{ where } C_n \text{ is the carry out from bit n} \quad (2)$$

The binary truth tables for Equation 1 and Equation 2 are set forth in Table 4.

TABLE 4

| $A_3$ | $B_n$ | $C_{n-1}$ | $A_nB_n$ (1) | $A_nC_{n-1}$ (2) | $B_nC_{n-1}$ (3) | $A_n \oplus B_n$ (4) | $S_n = (4) \oplus C_{n-1}$ | $C_n = (1)\|(2)\|(3)$ |
|---|---|---|---|---|---|---|---|---|
| 0 | 0 | 0 | 0 | 0 | 0 | 0 | 0 | 0 |
| 0 | 0 | 1 | 0 | 0 | 0 | 0 | 1 | 0 |
| 0 | 1 | 0 | 0 | 0 | 0 | 1 | 1 | 0 |
| 0 | 1 | 1 | 0 | 0 | 1 | 1 | 0 | 1 |
| 1 | 0 | 0 | 0 | 0 | 0 | 1 | 1 | 0 |
| 1 | 0 | 1 | 0 | 1 | 0 | 1 | 0 | 1 |
| 1 | 1 | 0 | 1 | 0 | 0 | 0 | 0 | 1 |
| 1 | 1 | 1 | 1 | 1 | 1 | 0 | 1 | 1 |

In formulating carry propagate logic, one must recognize that the critical path in any adder is along the carry chain. The most significant bit of the sum depends not only on the two most significant addend bits, but also the addend bits of every other bit position via the carry chain. Simply allowing carries to ripple from the least significant end would result in a compact but very slow adder, since the worst-case carry propagation delay would be approximately as many gate delays as the bit width of the adder.

Fast carry-propagate techniques can dramatically decrease the carry propagation delay, and therefore decrease the overall delay of the adder. Adders employing such techniques are sometimes referred to as carry-propagate adders, or carry-lookahead adders. Conventional carry propagate adder structures speed up the carry chain by computing the individual carry propagate (P) and carry generate (G) signals for each bit position.

For any two binary numbers A and B, the P and G signals for a given bit position, n, are:

$$P_n = A_n \oplus B_n \quad (3)$$

$$G_n = A_n B_n. \quad (4)$$

P and G may also be generated for 1-of-4 numbers. G indicates that the given dit position, n, generates a carry that will have to be accounted for in the higher dits of the sum. G will be set when the sum of two 1-of-4 numbers is greater than 3. P indicates that any carry generated in lower dits will propagate across the given dit position, n, to affect the higher dits of the sum. P will be set when the sum of two 1-of-4 numbers is exactly three. If neither G nor P is true for a given dit position, then a carry halt signal (H) is implied. An H signal indicates that any carry generated in lower dits will not propagate across the given dit position, n. H will be set if the sum of two 1-of-4 numbers is less than three. Restated, if the sum of two operand dits in a given dit position is greater than 3, G is true. If the sum is exactly 3, P is true. Otherwise, H is true.

Figure 7A:
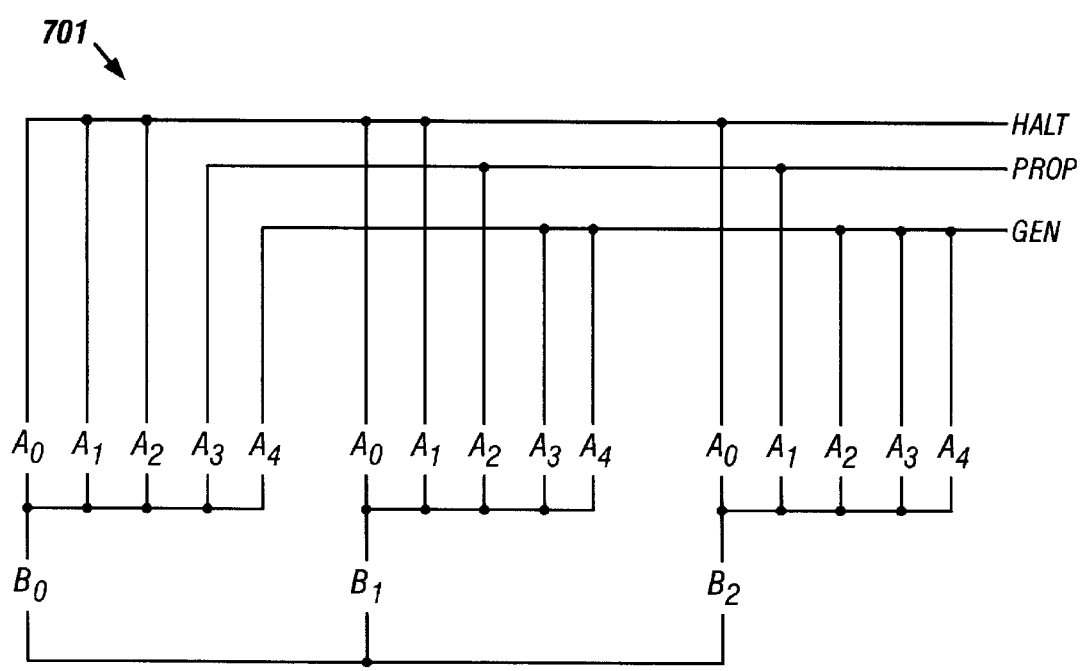
FIG. 7A is a shorthand representation of an N-nary HPG gate having one 1-of-3 input and one 1-of-5 input.

FIG. 7 illustrates an N-nary HPG gate 700 that utilizes carry propagate logic to generate an H, P, or G indication for two two-bit 1-of-4 addends. A similar function may be performed using one 1-of-3 addend and one 1-of-5 addend. Such a gate 701 is illustrated in FIG. 7A. The output of the HPG gate 700 conforms to Table 5. The output of the FIG. 7 gate is a 1-of-3 N-nary signal, such that one, and only one, of the H, P, or G wires is set high during a given evaluate cycle.

TABLE 5

| $A_3$ | $A_2$ | $A_1$ | $A_0$ | A Dec. Value | $B_3$ | $B_2$ | $B_1$ | $B_0$ | B Dec. Value | $H_n$ | $P_n$ | $G_n$ |
|---|---|---|---|---|---|---|---|---|---|---|---|---|
| 0 | 0 | 0 | 1 | 0 | 0 | 0 | 0 | 1 | 0 | 1 | 0 | 0 |
| 0 | 0 | 0 | 1 | 0 | 0 | 0 | 1 | 0 | 1 | 1 | 0 | 0 |
| 0 | 0 | 0 | 1 | 0 | 0 | 1 | 0 | 0 | 2 | 1 | 0 | 0 |
| 0 | 0 | 0 | 1 | 0 | 1 | 0 | 0 | 0 | 3 | 0 | 1 | 0 |
| 0 | 0 | 1 | 0 | 1 | 0 | 0 | 0 | 1 | 0 | 1 | 0 | 0 |
| 0 | 0 | 1 | 0 | 1 | 0 | 0 | 1 | 0 | 1 | 1 | 0 | 0 |
| 0 | 0 | 1 | 0 | 1 | 0 | 1 | 0 | 0 | 2 | 0 | 1 | 0 |
| 0 | 0 | 1 | 0 | 1 | 1 | 0 | 0 | 0 | 3 | 0 | 0 | 1 |
| 0 | 1 | 0 | 0 | 2 | 0 | 0 | 0 | 1 | 0 | 1 | 0 | 0 |
| 0 | 1 | 0 | 0 | 2 | 0 | 0 | 1 | 0 | 1 | 0 | 1 | 0 |
| 0 | 1 | 0 | 0 | 2 | 0 | 1 | 0 | 0 | 2 | 0 | 0 | 1 |
| 0 | 1 | 0 | 0 | 2 | 1 | 0 | 0 | 0 | 3 | 0 | 0 | 1 |
| 1 | 0 | 0 | 0 | 3 | 0 | 0 | 0 | 1 | 0 | 0 | 1 | 0 |
| 1 | 0 | 0 | 0 | 3 | 0 | 0 | 1 | 0 | 1 | 0 | 0 | 1 |
| 1 | 0 | 0 | 0 | 3 | 0 | 1 | 0 | 0 | 2 | 0 | 0 | 1 |
| 1 | 0 | 0 | 0 | 3 | 1 | 0 | 0 | 0 | 3 | 0 | 0 | 1 |

Level One Combined Sum/HPG Function

The function of the HPG gate illustrated in FIG. 7 differs from that of the adder gate illustrated in FIG. 5, but the two gates share the same input terms. The sum/HPG adder gate illustrated in FIG. 8 combines the two functions to generate outputs conforming with Table 6.

TABLE 6

| $A_3$ | $A_2$ | $A_1$ | $A_0$ | A Dec. Value | $B_3$ | $B_2$ | $B_1$ | $B_0$ | B Dec. Value | Sum | H | P | G |
|---|---|---|---|---|---|---|---|---|---|---|---|---|---|
| 0 | 0 | 0 | 1 | 0 | 0 | 0 | 0 | 1 | 0 | 0 | 1 | 0 | 0 |
| 0 | 0 | 0 | 1 | 0 | 0 | 0 | 1 | 0 | 1 | 1 | 1 | 0 | 0 |
| 0 | 0 | 0 | 1 | 0 | 0 | 1 | 0 | 0 | 2 | 2 | 1 | 0 | 0 |
| 0 | 0 | 0 | 1 | 0 | 1 | 0 | 0 | 0 | 3 | 3 | 0 | 1 | 0 |
| 0 | 0 | 1 | 0 | 1 | 0 | 0 | 0 | 1 | 0 | 1 | 1 | 0 | 0 |
| 0 | 0 | 1 | 0 | 1 | 0 | 0 | 1 | 0 | 1 | 2 | 1 | 0 | 0 |
| 0 | 0 | 1 | 0 | 1 | 0 | 1 | 0 | 0 | 2 | 3 | 0 | 1 | 0 |
| 0 | 0 | 1 | 0 | 1 | 1 | 0 | 0 | 0 | 3 | 0 | 0 | 0 | 1 |
| 0 | 1 | 0 | 0 | 2 | 0 | 0 | 0 | 1 | 0 | 2 | 1 | 0 | 0 |
| 0 | 1 | 0 | 0 | 2 | 0 | 0 | 1 | 0 | 1 | 3 | 0 | 1 | 0 |
| 0 | 1 | 0 | 0 | 2 | 0 | 1 | 0 | 0 | 2 | 0 | 0 | 0 | 1 |
| 0 | 1 | 0 | 0 | 2 | 1 | 0 | 0 | 0 | 3 | 1 | 0 | 0 | 1 |
| 1 | 0 | 0 | 0 | 3 | 0 | 0 | 0 | 1 | 0 | 3 | 0 | 1 | 0 |
| 1 | 0 | 0 | 0 | 3 | 0 | 0 | 1 | 0 | 1 | 0 | 0 | 0 | 1 |
| 1 | 0 | 0 | 0 | 3 | 0 | 1 | 0 | 0 | 2 | 1 | 0 | 0 | 1 |
| 1 | 0 | 0 | 0 | 3 | 1 | 0 | 0 | 0 | 3 | 2 | 0 | 0 | 1 |

Figure 8A:
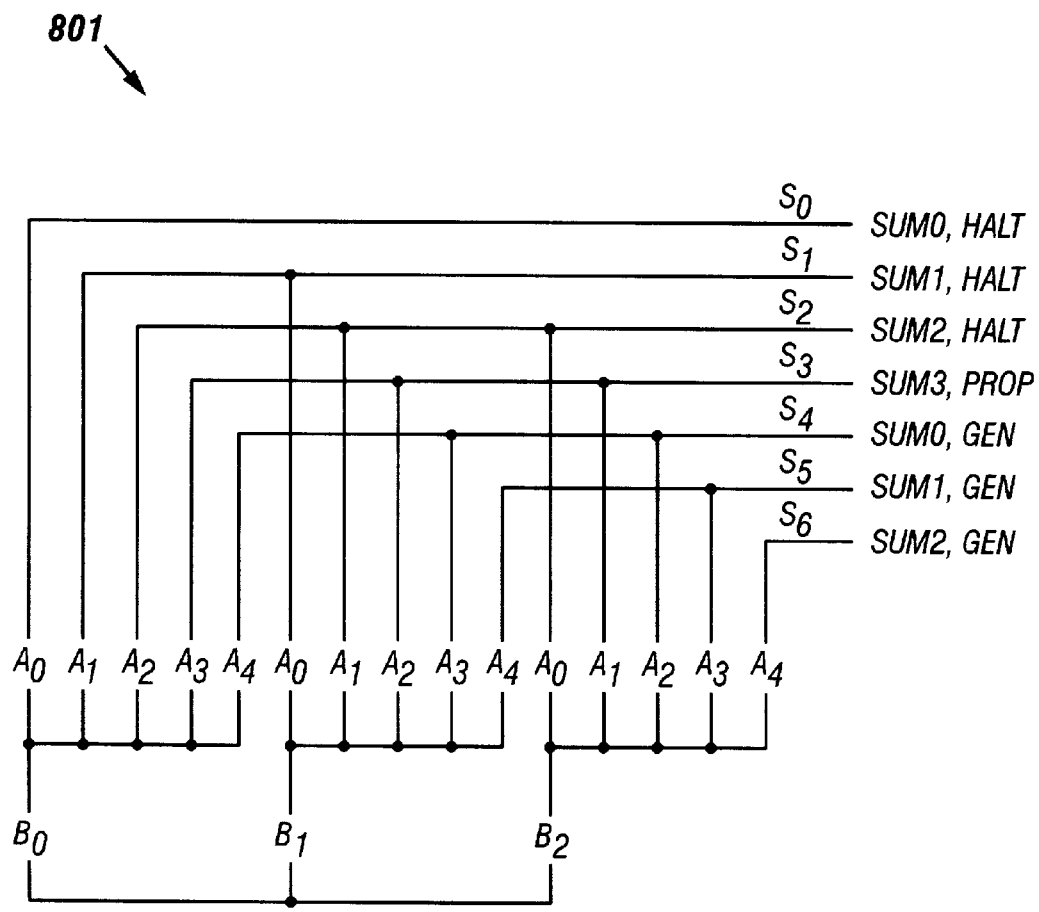
FIG. 8A is a modified shorthand representation of a Sum/HPG gate having one 1-of-3 addend input and one 1-of-5 addend input.

The function of the sum/HPG adder gate illustrated in FIG. 8 is to add two two-bit 1-of-4 inputs and generate the sum and the H, P, and G values set forth in Table 6. The two operands A and B are two-bit 1-of-4 values, as is the sum S. The H, P, and G outputs represent the three wires for a 1-of-3 output. FIG. 8A illustrates a gate 801 that performs a similar function using one 1-of-3 addend and one 1-of-5 addend.

FIGS. 8 and 9 illustrate that it is not necessary to construct multiple identical output signals from an evaluate node, even when a gate comprises two output signals. FIGS. 8 and 9 illustrate that it is instead possible to construct multiple output signals from a single set of evaluate nodes. In FIG. 8, the evaluate nodes are identified as S0, S1, S2, S3, S4, S5, and S6. In order for the two different output signals to conform to the 1-of-N signal definition, additional processing is performed on the evaluate nodes. In this processing, each evaluate node S0–S6 drives more than one output, and the outputs are different. FIG. 8 illustrates that for the HALT output, the S0, S1, and S2 evaluate nodes are NAND'ed together. (Because the evaluate nodes are asserted low and the outputs are high, the effect of NAND'ing is to logically OR the evaluate terms.) The PROP output is pulled high if the S3 evaluate node is asserted. For the GEN output, the S4, S5, and S6 evaluate nodes are NAND'ed together. The Sum0 output is pulled high if the NAND'ed S0 or S4 evaluate nodes are asserted. For Sum1, the S1 and S5 evaluate nodes are NAND'ed together. For Sum 2, the S2 and S6 evaluate nodes are NAND'ed together. Finally, the Sum3 output is pulled high if the S3 evaluate node is asserted. This same processing is performed by the Level One gate depicted in FIG. 9. The same processing is also performed by the Level One LSD gate 910 depicted in FIG. 10, with two modifications. First Gate 910 increments the three's complement of operand A in the LSD to create the four's complement for a subtraction operation. Accordingly, gate 910 has an additional evaluate node, S7, which pulls the GEN output and the SUM3 output high. Second, the HALT and PROP signals are combined in gate 910, since there will never be a borrow propagated into the LSD. Accordingly, the HALT/PROP signal comprises a logical NAND of the S0, S1, S2, and S3 evaluate nodes.

Level One Logic Gates

Figure 20:
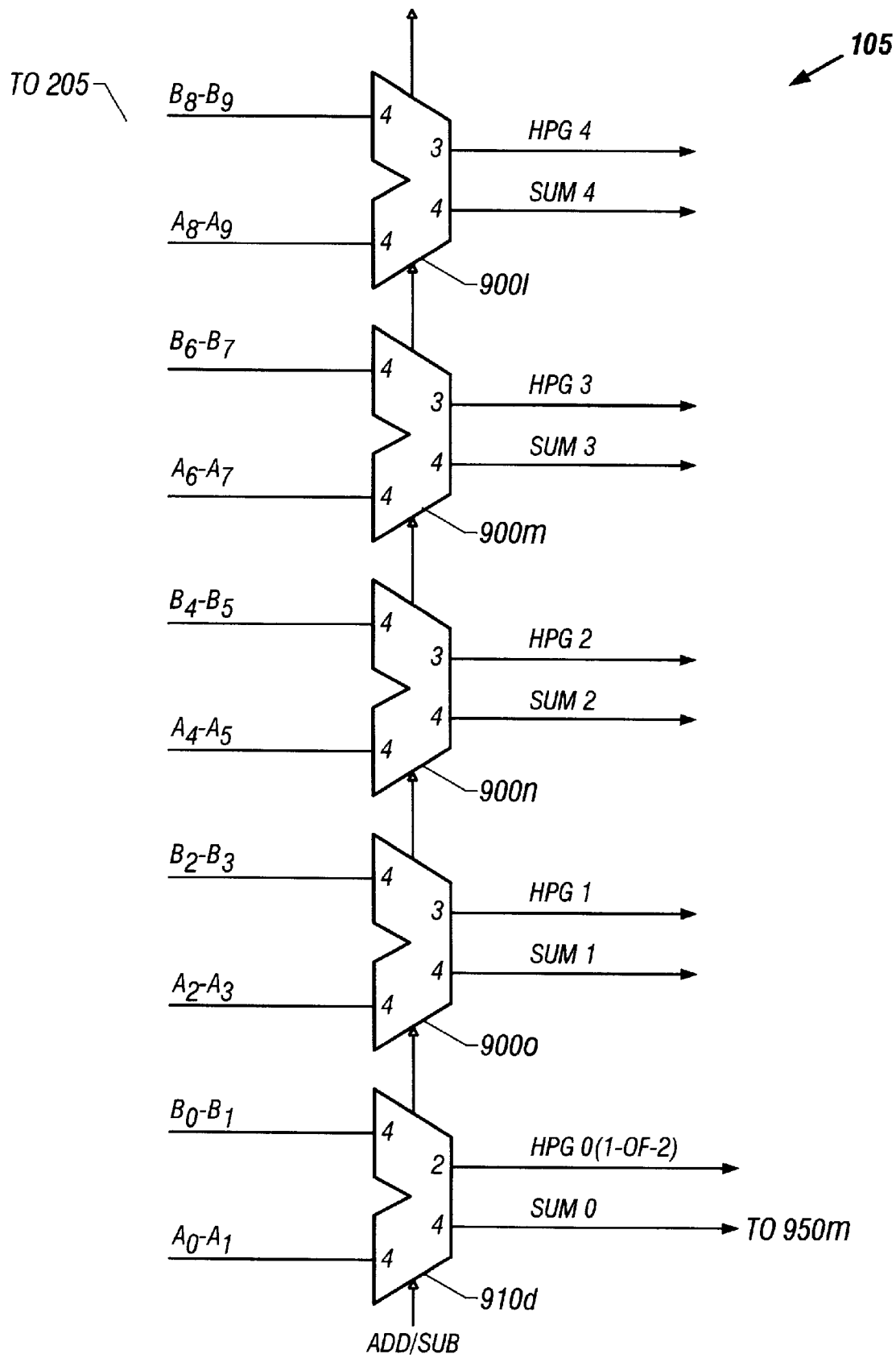
FIG. 20 is a high-level shorthand representation of Level One, LSBlk processing.
Figure 21:
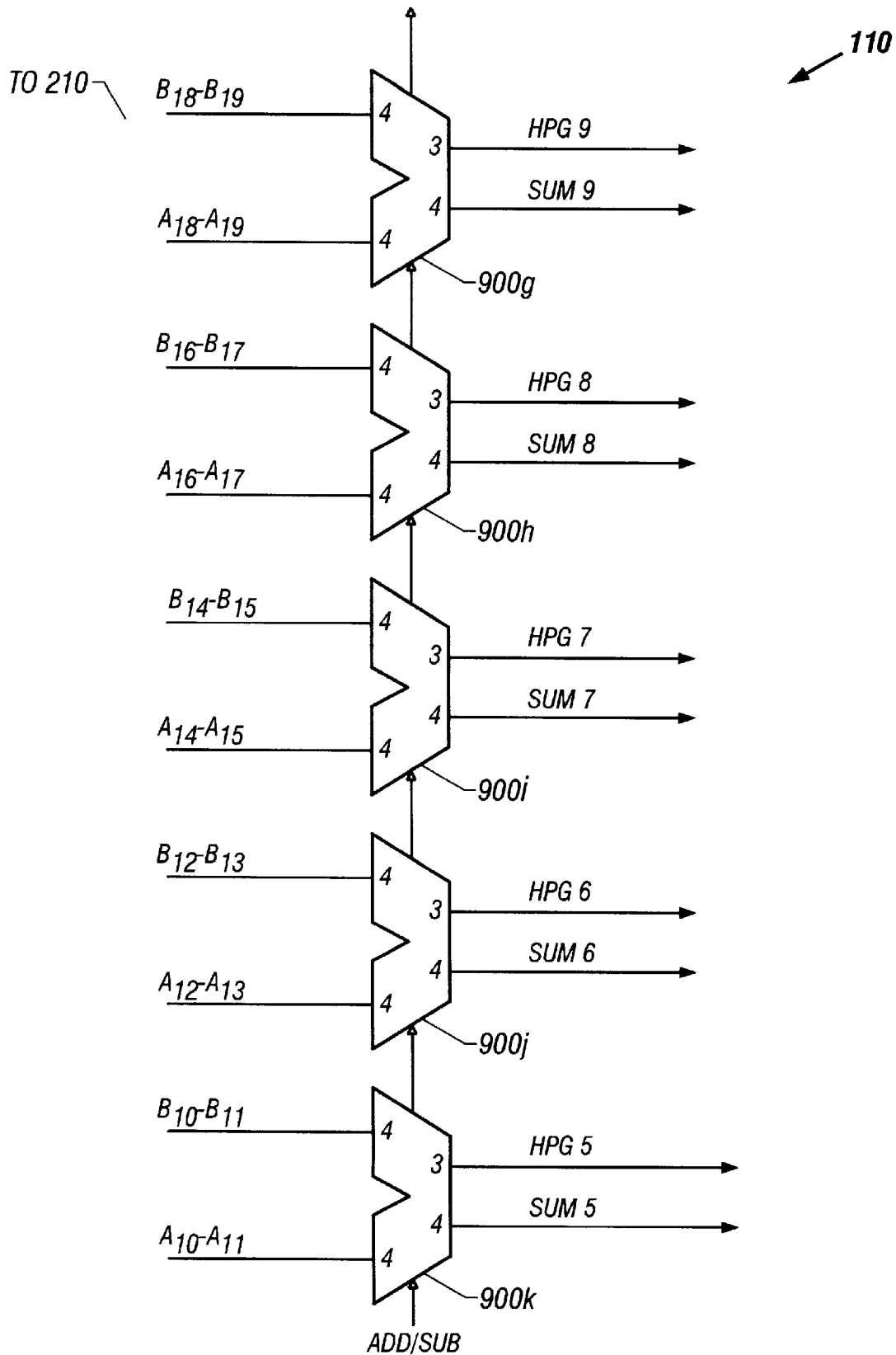
FIG. 21 is a high-level shorthand representation of Level One, Block Two processing.
Figure 22:
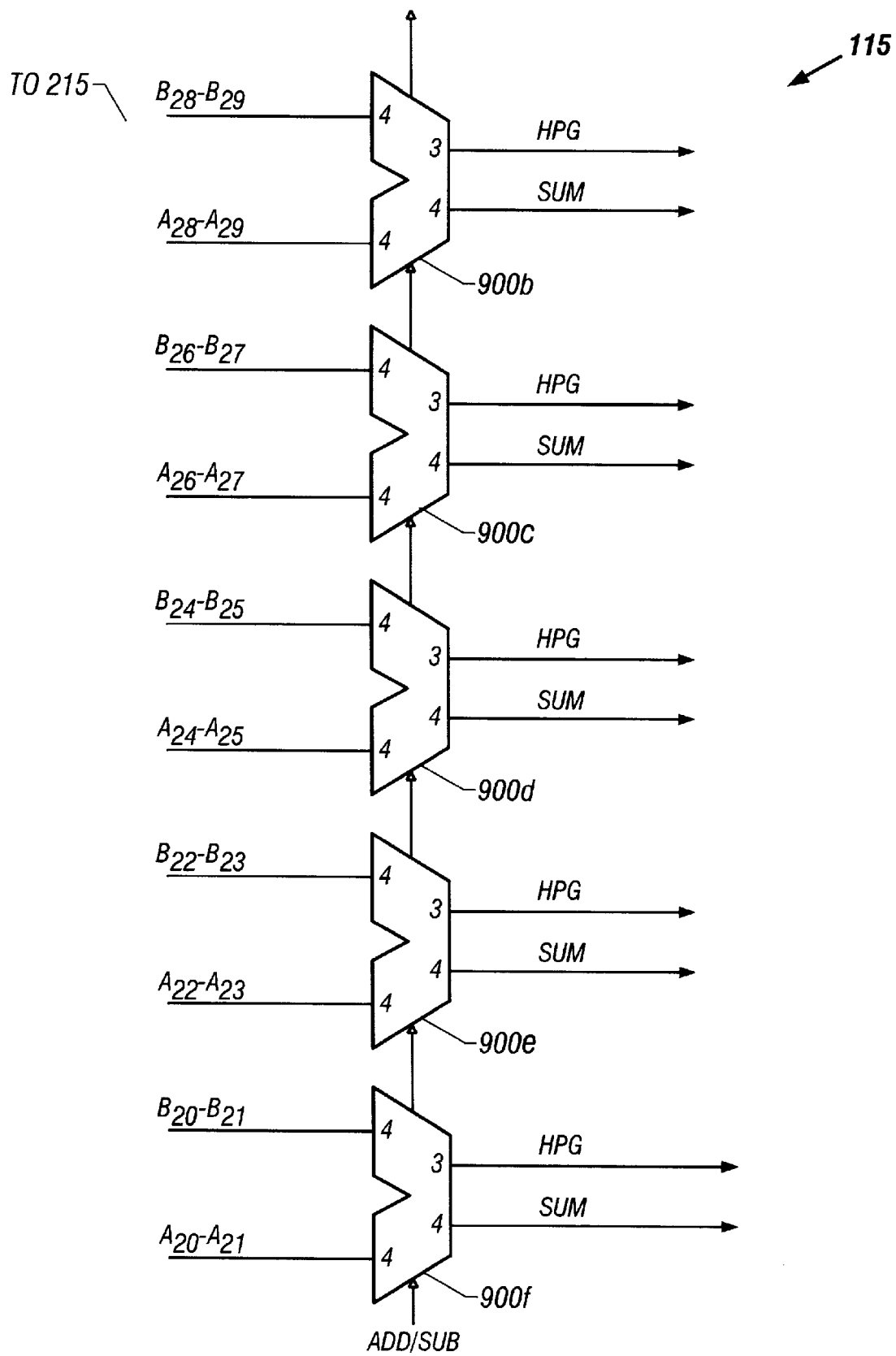
FIG. 22 is a high-level shorthand representation of Level One, Block Three processing.

FIGS. 20, 21, and 22 illustrate that Level One comprises two different combined adder/subtractor/HPG logic gates 900, 910. The Level One combined adder/subtractor/HPG logic gates 900, 910 are depicted in FIGS. 9 and 10. These gates 900, 910 combine the following functions: addition, carry propagate logic, subtraction, and borrow propagate logic. The gate 910 depicted in FIG. 10 is used for the least significant dit ("LSD") of the addends in the first logic level ("Level One"). This specialized gate 910 is used to accommodate the need, for a subtraction operation, to increment the three's complement of the minuend in order to form the four's complement, which is explained below. For all other dits, the standard gate 900 depicted in FIG. 9 is used in Level One. FIGS. 20, 21, and 22 illustrate that the present invention therefore comprises one specialized adder/subtractor/HPG gate 910 and fifteen standard adder/subtractor/HPG gates 900.

FIGS. 9 and 10 illustrate that the standard adder/subtractor/HPG gate 900, as well as the specialized LSD adder/subtractor/HPG gate 910, take as inputs two 1-of-4 addends and the 1-of-2 ADD/SUB selector. FIG. 9 illustrates that the standard gate 900 produces as outputs a 1-of-4 intermediate sum, SUM, and a 1-of-3 HPG signal. The HPG signal reflects the carry/borrow status of the particular dit. FIG. 10 illustrates that the specialized LSD gate 910 produces as outputs a 1-of-4 intermediate sum, SUM, and a 1-of-2 carry/borrow status signal that combines the halt and propagate status for the LSD.

FIGS. 9 and 10 illustrate that, for addition, the gates 900, 910 both operate to compute the intermediate sum in the same manner, deriving it as the simple sum of the two addend dits. For subtraction, the gates 900, 910 operate slightly differently. In both gates 900, 910, the minuend is complemented. In gate 910, an additional function is supplied. That is, the A operand is not only complemented, but, because gate 910 is used in the LSD position, the A operand is then incremented by one to form the four's complement. This subtraction logic is discussed below in further detail.

Level One N-nary Subtraction Logic

The Level One gates 900, 910 possess selectable subtract capability, and may be used for either addition or subtraction, based on the value of the ADD/SUB selector. FIGS. 9 and 10 illustrate the Level One logic gates 900, 910. Each gate 900, 910 not only implements the combined Sum/HPG functions discussed above, but also implements the subtraction and borrow propagate logic discussed herein.

A truth table demonstrating the subtraction operation, B–A, using 1-of-4 encoding is set forth in Table 7. Each of the two-bit 1-of-4 inputs, A and B, in Table 7 can represent one of four values, 0 through 3 inclusive, depending on which of the four wires for each signal is set high. The four wires for the two-bit 1-of-4 difference of the subtraction operation in Table 3 are labeled $D_3$, $D_2$, $D_1$, and $D_0$.

TABLE 7

| $B_3$ | $B_2$ | $B_1$ | $B_0$ | B Dec. Value | $A_3$ | $A_2$ | $A_1$ | $A_0$ | A Dec. Value | $D_3$ | $D_2$ | $D_1$ | $D_0$ | B − A Decimal Value |
|---|---|---|---|---|---|---|---|---|---|---|---|---|---|---|
| 0 | 0 | 0 | 1 | 0 | 0 | 0 | 0 | 1 | 0 | 0 | 0 | 0 | 1 | 0 |
| 0 | 0 | 0 | 1 | 0 | 0 | 0 | 1 | 0 | 1 | 0 | 0 | 1 | 0 | −1 |

TABLE 7-continued

| 0 | $B_2$ | $B_1$ | $B_0$ | B Dec. Value | $A_3$ | $A_2$ | $A_1$ | $A_0$ | A Dec. Value | $D_3$ | $D_2$ | $D_1$ | $D_0$ | B − A Decimal Value |
|---|---|---|---|---|---|---|---|---|---|---|---|---|---|---|
| 0 | 0 | 0 | 1 | 0 | 0 | 1 | 0 | 0 | 2 | 0 | 1 | 0 | 0 | −2 |
| 0 | 0 | 0 | 1 | 0 | 1 | 0 | 0 | 0 | 3 | 1 | 0 | 0 | 0 | −3 |
| 0 | 0 | 1 | 0 | 1 | 0 | 0 | 0 | 1 | 0 | 0 | 0 | 1 | 0 | 1 |
| 0 | 0 | 1 | 0 | 1 | 0 | 0 | 1 | 0 | 1 | 0 | 0 | 0 | 1 | 0 |
| 0 | 0 | 1 | 0 | 1 | 0 | 1 | 0 | 0 | 2 | 1 | 0 | 0 | 0 | −1 |
| 0 | 0 | 1 | 0 | 1 | 1 | 0 | 0 | 0 | 3 | 0 | 1 | 0 | 0 | −2 |
| 0 | 1 | 0 | 0 | 2 | 0 | 0 | 0 | 1 | 0 | 0 | 1 | 0 | 0 | 2 |
| 0 | 1 | 0 | 0 | 2 | 0 | 0 | 1 | 0 | 1 | 1 | 0 | 0 | 0 | 1 |
| 0 | 1 | 0 | 0 | 2 | 0 | 1 | 0 | 0 | 2 | 0 | 0 | 0 | 1 | 0 |
| 0 | 1 | 0 | 0 | 2 | 1 | 0 | 0 | 0 | 3 | 0 | 0 | 1 | 0 | −1 |
| 1 | 0 | 0 | 0 | 3 | 0 | 0 | 0 | 1 | 0 | 1 | 0 | 0 | 0 | 3 |
| 1 | 0 | 0 | 0 | 3 | 0 | 0 | 1 | 0 | 1 | 0 | 1 | 0 | 0 | 2 |
| 1 | 0 | 0 | 0 | 3 | 0 | 1 | 0 | 0 | 2 | 0 | 0 | 1 | 0 | 1 |
| 1 | 0 | 0 | 0 | 3 | 1 | 0 | 0 | 0 | 3 | 0 | 0 | 0 | 1 | 0 |

In Table 7, negative output values in the "B−A" column indicate that a borrow from the next higher-order dit must occur. As is discussed below, the present invention produces output values that are based on the assumption that such a borrow will occur in every case. In cases where such a borrow is not necessary, the present invention compensates accordingly.

In performing subtract logic within a processor, it is useful to implement subtraction as a form of complement addition. An adder may be made to subtract by forming the radix complement of the subtrahend and adding it to the minuend, where "radix" refers to the base of the number system being used. The radix complement of a number is formed by adding one to the least significant bit of the diminished radix complement of the number. The diminished radix complement is formed by subtracting every digit of the subtrahend from a number y, where y=base−1. In binary systems, subtraction is often implemented using the radix complement, or two's complement. Two's complement is formed by incrementing a one's complement number (the diminished radix complement). One's complement is formed by subtracting each bit of the subtrahend from 1, which is one less than the base (2). Formation of the 1's complement effects an inversion of each digit of the subtrahend.

The preferred embodiment of the Level One gates, because they operate on 1-of-4 inputs, are not binary. Instead, the addition system of the present invention is quaternary, with a base of four. Accordingly, the subtraction of the present invention is implemented as a form of four's complement addition. In the present invention, therefore, the subtrahend is converted to three's complement, the diminished radix complement, by novel circuitry that emulates the effect of subtracting each dit of the subtrahend from three. In the least significant dit, the subtrahend is converted from three's complement to four's complement, the radix complement, by novel circuitry that emulates the effect of incrementing the least significant dit of the three's complement number. Table 8 illustrates the three's complement for each of the four possible values of a 1-of-4 dit.

TABLE 8

| x (decimal) | x (1-of-4) | 3's Comp. (3 − x) | 3 − x (1-of-4) |
|---|---|---|---|
| 0 | 0001 | 3 | 1000 |
| 1 | 0010 | 2 | 0100 |
| 2 | 0100 | 1 | 0010 |
| 3 | 1000 | 0 | 0001 |

Since four's complement is generated by adding one to the least significant dit of a three's complement number, the present invention provides subtraction capability with minimal additional cost by providing a path that converts each dit of the subtrahend to the three's complement. In the least significant dit of a subtraction operation, the present invention converts the subtrahend to a four's complement representation.

All Dits Except LSD—Subtraction using Three's Complement

Table 9 sets forth the subtraction truth table for the N-nary circuit illustrated in FIG. 9, which performs subtraction on two 1-of-4 numbers, A and B, by adding the three's complement of A to B in order derive the two-bit difference of B−A. This processing is performed on all dits, except the LSD, during a subtract operation. In Table 9, A and B are represented in both decimal and 1-of-4 representations. The "~A" column of Table 9 represents the three's complement value of the subtrahend, A. The "~A (1-of-4)" column represents the three's complement of A in 1-of-4 representation. The "Pre-corr. Diff." column represents the difference of B−A, represented in a pre-correction format discussed in detail below. The "Diff." column represents the difference in post-correction decimal format.

TABLE 9

| B | B (1-of-4) | A | A (1-of-4) | ~A | ~A (1-of-4) | Pre-Corr. Diff (B − A) | Diff |
|---|---|---|---|---|---|---|---|
| 0 | 0001 | 0 | 0001 | 3 | 1000 | 3 | 0 |
| 1 | 0010 | 0 | 0001 | 3 | 1000 | 0* | 1 |
| 2 | 0100 | 0 | 0001 | 3 | 1000 | 1* | 2 |
| 3 | 1000 | 0 | 0001 | 3 | 1000 | 2* | 3 |
| 0 | 0001 | 1 | 0010 | 2 | 0100 | 2 | −1 |
| 1 | 0010 | 1 | 0010 | 2 | 0100 | 3 | 0 |
| 2 | 0100 | 1 | 0010 | 2 | 0100 | 0* | 1 |
| 3 | 1000 | 1 | 0010 | 2 | 0100 | 1* | 2 |
| 0 | 0001 | 2 | 0100 | 1 | 0010 | 1 | −2 |
| 1 | 0010 | 2 | 0100 | 1 | 0010 | 2 | −1 |
| 2 | 0100 | 2 | 0100 | 1 | 0010 | 3 | 0 |
| 3 | 1000 | 2 | 0100 | 1 | 0010 | 0* | 1 |
| 0 | 0001 | 3 | 1000 | 0 | 0001 | 0 | −3 |
| 1 | 0010 | 3 | 1000 | 0 | 0001 | 1 | −2 |
| 2 | 0100 | 3 | 1000 | 0 | 0001 | 2 | −1 |
| 3 | 1000 | 3 | 1000 | 0 | 0001 | 3 | 0 |

The values in the "Pre-Corr. Diff" column of Table 9 denoted by asterisks are mod 4 values of a difference that is too large to be represented in two bits. Conceptually, these cases generate a carry into the next higher-order dit, where such carry represents a value of four.

FIG. 9 illustrates a gate 900 that performs three's complement subtraction in the following manner. FIG. 9 illustrates that each node of B inputs in gate 910 has been labeled with the conceptual value of the A input. The left most node of B inputs in FIG. 9, corresponding to an addition value of "0" for A and a subtraction value of "3" for A has been labeled "+0." From left to right, the remaining nodes have been labeled as the "+1", "+2", and "+3" nodes, respectively. For subtraction, the $A_0$ input is coupled to the "+3" node. Because the three's complement of zero is three, the addition of three to the B input when the value of $A_n$ is zero effectuates the conversion of A to a three's complement value before it is added to B. Similarly, the $A_1$ input for subtraction is coupled to the "+2" nodes because the three's complement of one is two. Likewise, the $A_2$ input is coupled to the "+1" nodes and the $A_3$ input is coupled to the "+0" node. Through this novel circuitry approach, A is simply and elegantly converted to its three's complement representation.

Pre-correction Format for Three's Complement Subtraction

The values set forth in the "Pre-Corr. Diff" column of Table 9 represent the present invention's pre-correction format for three's complement subtraction. Rather than producing an intermediate difference (hereinafter referred to as "Diff") value that represents B−A for a given bit n, the format of the pre-corrected Diff in Table 9 is: $(b-1)+B_n-A_n$, where b is the base. In the preferred embodiment of the present invention, the base is four. Such format is based on the following two assumptions.

Assumptions

I) a borrow from dit x by the dit of next-lowest significance is implied for each dit except the least significant dit of the intermediate difference; and II) every dit x will require a borrow from the dit of next-higher significance.

Considering the first assumption in isolation, the borrow results in 1 being subtracted ("borrowed") from dit n. This first borrow conceptually adds the base to dit n−1. The first assumption therefore results in subtraction of 1 from the intermediate difference for dit n, providing a pre-correction format of $(-1)+(B_n-A_n)$. The latter assumption results in the base, b, being subtracted ("borrowed") from dit n+1 and added to dit n. Combining the second assumption with the first, the pre-correction format of the present invention therefore becomes $(b-1)+(B_n-A_n)$. The "Pre-Corr. Diff" column of Table 9 illustrates that the output of the present invention conforms to this pre-correction format.

Least Significant Dit—Subtraction using Four's Complement.

Table 9(b) sets forth the subtraction truth table for the N-nary circuit 910 illustrated in FIG. 10, which performs subtraction of two 1-of-4 numbers, A and B, by adding the four's complement of A to B in order derive the two-bit difference of B−A. This processing is performed on the LSD during a subtract operation. In Table 9(b), A and B are represented in both decimal and 1-of-4 representations. The "~A" column of Table 9(b) represents the three's complement value of the subtrahend, A, and the "~A+1" column represents the four's complement value of A. The "~A+1 (1-of-4)" column represents the four's complement of A in 1-of-4 representation. The "Pre-corr. Diff." column represents the difference of B−A, represented in a pre-correction format discussed in detail below. The "Diff." column represents the difference in post-correction decimal format.

TABLE 9(b)

| B | B (1-of-4) | A | A (1-of-4) | ~A | ~A + 1 | ~A + 1 (1-of-4) | Pre-Corr. Diff (B − A) | Diff (B − A) |
|---|---|---|---|---|---|---|---|---|
| 0 | 0001 | 0 | 0001 | 3 | 4 | 0001* | 0* | 0 |
| 1 | 0010 | 0 | 0001 | 3 | 4 | 0001* | 1* | 1 |
| 2 | 0100 | 0 | 0001 | 3 | 4 | 0001* | 2* | 2 |
| 3 | 1000 | 0 | 0001 | 3 | 4 | 0001* | 3* | 3 |
| 0 | 0001 | 1 | 0010 | 2 | 3 | 1000 | 3 | −1 |
| 1 | 0010 | 1 | 0010 | 2 | 3 | 1000 | 0* | 0 |
| 2 | 0100 | 1 | 0010 | 2 | 3 | 1000 | 1* | 1 |
| 3 | 1000 | 1 | 0010 | 2 | 3 | 1000 | 2* | 2 |
| 0 | 0001 | 2 | 0100 | 1 | 2 | 0100 | 2 | −2 |
| 1 | 0010 | 2 | 0100 | 1 | 2 | 0100 | 3 | −1 |
| 2 | 0100 | 2 | 0100 | 1 | 2 | 0100 | 0* | 0 |
| 3 | 1000 | 2 | 0100 | 1 | 2 | 0100 | 1* | 1 |
| 0 | 0001 | 3 | 1000 | 0 | 1 | 0010 | 1 | −3 |
| 1 | 0010 | 3 | 1000 | 0 | 1 | 0010 | 2 | −2 |
| 2 | 0100 | 3 | 1000 | 0 | 1 | 0010 | 3 | −1 |
| 3 | 1000 | 3 | 1000 | 0 | 1 | 0010 | 0* | 0 |

The values in the "Pre-Corr. Diff" and "~A+1 (1-of-4)" columns denoted by asterisks are mod 4 values of a difference that is too large to be represented in two bits. Conceptually, these cases generate a carry into the next higher-order dit, where such carry represents a value of four. Gate 910 performs four's complement subtraction in the following manner. Each node of B inputs in FIG. 10 has been labeled with the conceptual value of the A input. The leftmost node of B inputs in FIG. 10, corresponding to an addition value of "0" for A and a subtraction value of "3" for A, has been labeled as the "+0" node. From left to right, the remaining nodes have been labeled as the "+1", "+2", "+3", and "+4" nodes, respectively. For subtraction, the A0 input is coupled to the "+4" block. Because the four's complement of zero is four (i.e., 3−0=3; 3+1=4), the addition of four to the B input when the value of $A_n$ is zero effectuates the conversion of A to a four's complement value before it is added to B. Table 11(b) illustrates that the output of the FIG. 10 gate in such a case will be three, with a carry generated. The base 4 representation of 7 is 7 MOD 4=3, with a carry. Therefore, it is apparent that the novel circuit 910 depicted in FIG. 10 properly performs four's complement subtraction.

Pre-correction Format for Four's Complement Subtraction

The values set forth in the "Pre. Corr. Diff" column of Table 9(b) represent the present invention's pre-correction format for four's complement subtraction. Rather than three's complement subtraction, gate 910 performs four's complement subtraction to implement the least significant dit (LSD) of the subtraction operation. Since there will never be a borrow out of the LSD by a less significant dit, gate 910 only implements Assumption II listed above, and not Assumption I. Assumption II results in the base, b, being subtracted ("borrowed") from dit n+1 and added to dit n. The pre-correction format for the intermediate difference for gate 910, represented in the "Pre-Corr. Diff" column of Table 9(b), is therefore $b+B_n-A_n$, where b is the base, which is 4. Table 9(b) illustrates that the output of gate 910 conforms to this pre-correction format.

Level One Borrow Propagate Logic

During subtraction, the Level One gates 900, 910 generate a G(enerate) signal for each dit in addition to the intermediate difference in the pre-correction formats discussed above. In addition, gate 900 also generates separate H(alt), and P(ropagate) signals for each dit while gate 910 produces a combined (H)alt/(P)ropagate signal for each dit. In order to understand the present invention's operation regarding the setting of the H, P, and G signals for subtraction, it is useful to keep in mind the various conceptual transfers of data that may occur during a subtract operation. Example 1 sets forth these conceptual transfers among three dits in a subtract operation, the LSD, dit n, and dit n+1.

EXAMPLE 1

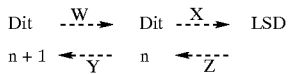

In Example 1, W represents a borrow from Dit n+1 into Dit n. Such borrow will conceptually subtract one from the value of Dit n+1 and will conceptually add a value equal to the base (in this case, four) to the value of Dit n. The borrow depicted by W in Example 1 illustrates the application of Assumption I discussed above to Dit n+1. Likewise, data transfer W also illustrates the application of Assumption II to Dit n. Similarly, X represents a borrow from Dit n into the LSD. Data transfer X therefore represents the application of Assumption I to Dit n and the application of Assumption II to the LSD.

Still referring to Example 1, data transfer Y represents a carry from Dit n into Dit n+1. Such carry will decrement the base (four) from the value of Dit n and will add one to Dit n+1. The carry represented in Y will occur whenever the intermediate difference for Dit n is too large to be represented with two bits. Similarly, Z represents a carry from the LSD into Dit n.

Example 1 also illustrates that there will never be a borrow out of the LSD because there is no dit to the right of the LSD. This is the reason that the four's-complement Level One gate illustrated in FIG. 10 applies only Assumption II, and not Assumption I, to generate the four's complement pre-correction format.

Keeping the foregoing assumptions and data transfers in mind, we now turn to the present invention's setting of the H, P, and G indicators for subtract operations. In the subtraction operation of the present invention, an H signal relates to the concept of "borrowing." A borrow is the complement of a generate associated with addition. Conceptually, the action of a borrow from dit n is to decrement the value of the difference for dit n in the final level of logic in a subtractor, after all borrows have been propagated—just as a G signal that propagates to a given dit position in addition will increment the value of the sum for dit n.

Regarding the H signal, it is important to note that, as stated in Assumption II above, the present invention assumes that the intermediate difference generated for any dit n will be incremented via a borrow. In other words, there is an implied assumption that there will be a borrow by dit n from the dit of next-higher significance (n+1). Assumption II therefore assumes that the data transfer denoted by W in Example I will always occur. Accordingly, the intermediate difference for dit n created by the present invention contains an "implied borrow." The H(alt) signal associated with the subtraction operation on dit n simply means that, for a dit n, the implied borrow out of the dit of next-higher significance (n+1) will indeed take place as assumed. The H signal will be set when the intermediate sum of dit n is a negative number, indicating that a borrow must occur. H will be set when $B_n < A_n$.

A G signal in subtraction corrects the implied borrow described above, if the borrow was unnecessary, by indicating that the intermediate difference for dit n should be incremented by one. In other words, a G signal indicates that the carry denoted by Y in Example I should occur to offset the unnecessary borrow denoted by data transfer W in Example 1. For elaboration, consider the example set forth in Table 10 below. Table 10 shows two consecutive dits in a subtract operation, the LSD and the dit of next-higher significance, dit n. The value of $B_{LSD}$ is 3, the value of $B_n$ is 1, the value of $A_{LSD}$ is 1, and the value of $A_n$ is 2.

TABLE 10

|  | Step 1 | | Step 2 | | Step 3 | | Step 4 | | Step 5 | |
| --- | --- | --- | --- | --- | --- | --- | --- | --- | --- | --- |
|  | n | LSD | n | LSD | n | LSD | n | LSD | n | LSD |
| B | 1 | 3 | 11 | 3 | 10 | 13 | 10 | 13 | 12 | 13 |
| -A | 2 | 1 | 2 | 1 | 2 | 1 | 2 | 1 | 1 | 1 |
| Int. Diff. | — | | — | | — | | 2 | 12 | 3 | 2 |

The first step of Table 10 shows the two dits to be subtracted. Step 2 illustrates the borrow into dit n from the next-higher dit, dit n+1 (not shown), which results in a value of 11 for $B_n$. The value of 11 is the base four representation of 5 (i.e., 5 MOD 4), and 5 is the result of adding the borrowed four to the original value (1) of $B_n$. Step 2 therefore corresponds to the application of Assumption II to dit n, which is depicted as data transfer W in Example 1. Step 2 also corresponds to the application of Assumption I to dit n+2 (not shown).

The third step of Table 10 illustrates the borrow into LSD from dit n and shows that such borrow has two effects. First, the borrow decrements one from $B_n$, resulting in a value of 10 for $B_n$. This first effect corresponds to the application of Assumption I to dit n. Second, the borrow illustrated in Step 3 also results in the addition of four to the original value of $B_{LSD}$, with a resultant value of 7, which has a base four representation of 13. This second effect corresponds to the application of Assumption II to the LSD. Both effects are illustrated by data transfer X in Example 1.

The fourth step of Table 10 illustrates the result of ditwise subtraction on dit n and the LSD after the borrow assumptions have been applied. The intermediate difference for the LSD generates a carry because the result of the subtraction results in a value for the LSD that is greater than the base. The intermediate difference for the LSD is 12, which is the base four representation of 6.

Step 5 illustrates the carry from the LSD back into dit n. This carry corresponds to data transfer Z shown in Example 1. This carry will correct the initial borrow out of dit n that was illustrated in Step 1, and depicted as data transfer X in Example 1. In Step 5, the carry results in 1) the intermediate difference for dit n being incremented by one; and 2) the intermediate difference for the LSD being decremented by four, which is the base. The borrow from dit n into the LSD is unnecessary any time that $B_n > A_n$. Accordingly, the present invention sets the G bit to generate a carry any time $B_n > A_n$, thereby correcting unnecessary Assumption I borrows.

The P signal, for subtraction, indicates that the determination of whether or not a borrow must be generated out of dit n depends on whether there is a borrow into dit n. This function is very similar to the P signal for addition, in that a P for subtraction indicates that a borrow will propagate across dit n. P will be set when $B_n = A_n$.

The state of the H, P, and G bits for each combination of inputs into any but the least significant dit of the present invention is set forth in Table 11. FIG. 9 illustrates the circuit of the present invention that implements subtraction and borrow propagate logic for dits other than the least significant dit. The outputs of the FIG. 9 gate, comprising the pre-corrected intermediate difference, H, P, and G, conform to Table 11.

TABLE 11

| B | B (1-of-4) | A | A (1-of-4) | ~A | ~A (1-of-4) | Pre-Corr. Diff (B − A) | Diff | H $B_n < A_n$ | P $B_n = A_n$ | G $B_n > A_n$ |
|---|---|---|---|---|---|---|---|---|---|---|
| 0 | 1000 | 0 | 1000 | 3 | 0001 | 3 | 0 | 0 | 1 | 0 |
| 1 | 0100 | 0 | 1000 | 3 | 0001 | 0* | 1 | 0 | 0 | 1 |
| 2 | 0010 | 0 | 1000 | 3 | 0001 | 1* | 2 | 0 | 0 | 1 |
| 3 | 0001 | 0 | 1000 | 3 | 0001 | 2* | 3 | 0 | 0 | 1 |
| 0 | 1000 | 1 | 0100 | 2 | 0010 | 2 | −1 | 1 | 0 | 0 |
| 1 | 0100 | 1 | 0100 | 2 | 0010 | 3 | 0 | 0 | 1 | 0 |
| 2 | 0010 | 1 | 0100 | 2 | 0010 | 0* | 1 | 0 | 0 | 1 |
| 3 | 0001 | 1 | 0100 | 2 | 0010 | 1* | 2 | 0 | 0 | 1 |
| 0 | 1000 | 2 | 0010 | 1 | 0100 | 1 | −2 | 1 | 0 | 0 |
| 1 | 0100 | 2 | 0010 | 1 | 0100 | 2 | −1 | 1 | 0 | 0 |
| 2 | 0010 | 2 | 0010 | 1 | 0100 | 3 | 0 | 0 | 1 | 0 |
| 3 | 0001 | 2 | 0010 | 1 | 0100 | 0* | 1 | 0 | 0 | 1 |
| 0 | 1000 | 3 | 0001 | 0 | 1000 | 0 | −3 | 1 | 0 | 0 |
| 1 | 0100 | 3 | 0001 | 0 | 1000 | 1 | −2 | 1 | 0 | 0 |
| 2 | 0010 | 3 | 0001 | 0 | 1000 | 2 | −1 | 1 | 0 | 0 |
| 3 | 0001 | 3 | 0001 | 0 | 1000 | 3 | 0 | 0 | 1 | 0 |

It is apparent from Table 11 that the H signal is set for each situation where $B_n < A_n$, so that every instance where the "Diff" column of Table 11 shows a negative number, a borrow is indicated because the H bit is set for that row. Table 11 also shows that any time the "Pre-corr. Diff" column of Table 8 indicates a carry, the G bit is set in Table 11 for that row. That is, G is set every time $B_n > A_n$.

It should be noted that, for the LSD, P and H are equivalent because no generates or borrows will ever propagate into the LSD. FIG. 10 therefore illustrates an LSD gate 910 of the present invention that performs subtraction in the LSD by adding the four's complement of the first input to the second input. In such a gate, the H and P output signals conceptually serve the same function and are collapsed into a single HALT/PROP output. Table 11(b) illustrates the H/P and G outputs of the four's complement gate 910 illustrated in FIG. 10. Gate 910 of the present invention implements subtraction and borrow propagate logic for the least significant dit. The outputs of gate 910, comprising the pre-corrected intermediate difference, HALT/PROP, and G, conform to Table 11(b). FIG. 10 and Table 11(b) illustrate that H/P is set any time $B_n > A_n$. G is set any time $B_n < A_n$.

TABLE 11(b)

| B | B (1-of-4) | A | A (1-of-4) | ~A | ~A + 1 | ~A + 1 (1-of-4) | Pre-Corr. Diff (B − A) | Diff (B − A) | H/P | G |
|---|---|---|---|---|---|---|---|---|---|---|
| 0 | 0001 | 0 | 0001 | 3 | 4 | 0001* | 0* | 0 | 0 | 1 |
| 1 | 0010 | 0 | 0001 | 3 | 4 | 0001* | 1* | 1 | 0 | 1 |
| 2 | 0100 | 0 | 0001 | 3 | 4 | 0001* | 2* | 2 | 0 | 1 |
| 3 | 1000 | 0 | 0001 | 3 | 4 | 0001* | 3* | 3 | 0 | 1 |
| 0 | 0001 | 1 | 0010 | 2 | 3 | 1000 | 3 | −1 | 1 | 0 |
| 1 | 0010 | 1 | 0010 | 2 | 3 | 1000 | 0* | 0 | 0 | 1 |
| 2 | 0100 | 1 | 0010 | 2 | 3 | 1000 | 1* | 1 | 0 | 1 |
| 3 | 1000 | 1 | 0010 | 2 | 3 | 1000 | 2* | 2 | 0 | 1 |
| 0 | 0001 | 2 | 0100 | 1 | 2 | 0100 | 2 | −2 | 1 | 0 |
| 1 | 0010 | 2 | 0100 | 1 | 2 | 0100 | 3 | −1 | 1 | 0 |
| 2 | 0100 | 2 | 0100 | 1 | 2 | 0100 | 0* | 0 | 0 | 1 |
| 3 | 1000 | 2 | 0100 | 1 | 2 | 0100 | 1* | 1 | 0 | 1 |
| 0 | 0001 | 3 | 1000 | 0 | 1 | 0010 | 1 | −3 | 1 | 0 |
| 1 | 0010 | 3 | 1000 | 0 | 1 | 0010 | 2 | −2 | 1 | 0 |
| 2 | 0100 | 3 | 1000 | 0 | 1 | 0010 | 3 | −1 | 1 | 0 |
| 3 | 1000 | 3 | 1000 | 0 | 1 | 0010 | 0* | 0 | 0 | 1 |

To summarize, the Level One gates, 900, 910, utilize N-nary logic to perform both addition and subtraction within one gate. FIG. 9 illustrates an embodiment of a Level One combined sum/HPG gate 900 that implements the add, carry propagate, subtract (three's complement), and borrow propagate functions, discussed above, into one gate. FIG. 10 illustrates an embodiment of a Level One LSD combined sum/HPG gate 910 that implements the add, carry propagate, subtract (four's complement), and borrow propagate functions, discussed above, into one gate. It will be noted from FIGS. 9 and 10 that the inputs into the Level One gates 900, 910 comprise a 1-of-2 ADD/SUB selector and two two-bit (one-dit) operands, A and B. The value of the 1-of-2 ADD/SUB selector determines whether the gate 900, 910 will perform subtraction or addition. Each gate 900, 910 comprises four sets, referred to as "nodes", of the four wires comprising the B input, $B_3$, $B_2$, $B_1$, $B_0$. In gate 900, each of the wires $A_3$, $A_2$, $A_1$, $A_0$ for input A are connected to two separate nodes of the B input wires. For reasons discussed below, each of the four wires for input A are connected to two separate nodes of the B input wires, except $A_2$, which is only connected to one node of B inputs. In both FIGS. 9 and 10, each node of B input wires has been labeled with the conceptual value of the A input associated with that node for the addition function. For instance, the leftmost node of B input wires in FIGS. 9 and 10, corresponding to an addition value of "0" for A, is labeled as the "+0" node. From left to right in FIGS. 9 and 10, the remaining nodes of B input wires have been labeled as the "+1", "+2", "+3" nodes, respectively.

In both gates 900 and 910, the value of the ADD/SUB selector will determine which A input line corresponds to each node of B input wires. For instance, in gate 900, although the A0 wire is coupled to the "+0" node for addition, the three's complement of zero, $A_3$, is coupled to the "+0" node for subtraction. FIG. 9 and Tables 6 and II illustrate that this novel scheme produces the desired results for both addition and subtraction. For instance, consider the add and subtract functions for $A_0$, which corresponds to an A input value of zero. If the ADD value is enabled for the ADD/SUB selector, the $A_0$ input value will be coupled with the "+0" node of B inputs. Thus, the value of B will be added to zero. In contrast, for subtraction, the A input is coupled with the "+3" node of B inputs, which represent the three's complement of A. If SUB value is enabled for the ADD/SUB selector, the three's complement zero will therefore be added to the B input.

Level One Configuration

The configuration of Level One is illustrated in FIGS. 11 and 19. FIG. 19 illustrates that Level One is conceptually divided into three distinct blocks of logic, plus an additional gate 900a. Each block performs processing for a group of five dits. The Level One blocks are "Level One, LSBlk" 105, "Level One, Block Two" 110, and "Level One, Block Three" 115. The additional gate, 900a, processes the MSD of inputs A and B. Each of the Level One blocks, 105, 110, and 115, contains 5 combined adder/subtractor/HPG gates, 900b through 900o, each of which produces a sum and HPG signal for one dit of the A and B operands. The least significant Level One grouping, Level One LSBlk 105 is further illustrated in FIG. 20. Referring to FIG. 20, one should note that the least significant gate of Level One LSBlk 105 comprises the specialized gate 910a that is used for LSD processing. Level One LSBlk 105 therefore comprises four standard adder/subtractor/HPG gates 900l through 900o and one LSD adder/subtractor/HPG gate 910a. The next significant block of Level One is labeled in FIG. 19 as "Level One, Block Two" 110 and is further illustrated in FIG. 21. The most significant Level One block is labeled as "Level One, Block 3" 115 and is further illustrated in FIG. 22. Finally, FIGS. 11 and 19 illustrate that Level One processing occurs in gate 900a for the MSD of A and B. The outputs from all of the Level One gates, 910a and 900a through 900o, comprise inputs into the Level Two logic gates discussed below.

Level Two—Overview

The present invention's second level comprises logic that computes block-level HPG signals. This step is executed to reduce the complexity of the "carry in" computation for each block of dits that occurs in Level Three logic. The basic function of the Level Two gates is to perform "block HPG" logic to determine if a carry into a particular dit of the intermediate sum will occur. This block HPG logic takes into account any carry into the dit of interest that is generated by dits of lesser significance within the same block. The block HPG signals generated by Level Two are used by Level Three to determine if the intermediate difference for each dit should be incremented before final output. The maximum block size is five dits. On each five-dit boundary of the intermediate sum, a five-input Level Two gate is used to combine the HPG signals from all 5 dits within the block to determine whether a carry will be generated out of the block. For Level Two, LSBlk 205, the five-input Level Two gate 920a is a specialized gate that received the 1-of-2 combined HPG signal from the LSD adder gate 910a. In contrast, the five-input Level Two gates 955a, 955b for the remaining blocks receive five 1-of-3 HPG inputs.

The efficiency of block-level HPG logic in the Second Level is revealed when the carry-in calculation for each dit is examined. Referring back to Equ. 1, above, the Carry into a bit, $C_{n-1}$, is calculated as:

$$C_{n-1} = G(n-1)|P(n-1)G(n-2)|P(n-1)P(n-2)G(n-3)| \ldots |P(n-1)P(n-2) \ldots P(1)G(0). \quad (5)$$

Equation 5 illustrates that any carry can theoretically be determined from propagate and generate signals using a single level of logic. To do so, however, becomes impractical for any substantial adder because the size of the carry gate becomes impractical for one level of logic. For instance, in a 32-bit adder, Equation 5 indicates that 31 AND terms would be required with the largest term containing 31 literals. To reduce the complexity of the carry computation, the Second Level of the present invention constrains the scope of the computation to blocks of 5 dits each. This simplifies the gates required in return for the cost of adding more levels of logic to the critical path.

Accordingly, the Second Level of logic focuses only on carry propagate logic. FIGS. 11, 23, 24, and 25 illustrate that most of the intermediate sums calculated for each dit in Level One are stored in sum buffers 950b through 950l until needed in Level 3. FIG. 12 illustrates a sum buffer 950 of the present invention. The only processing performed in most of Level Two is therefore block HPG processing that is performed on the HPG signals generated by the Level One gates, 910a and 900a through 900o.

Level Two Logic Gates

Figure 13:
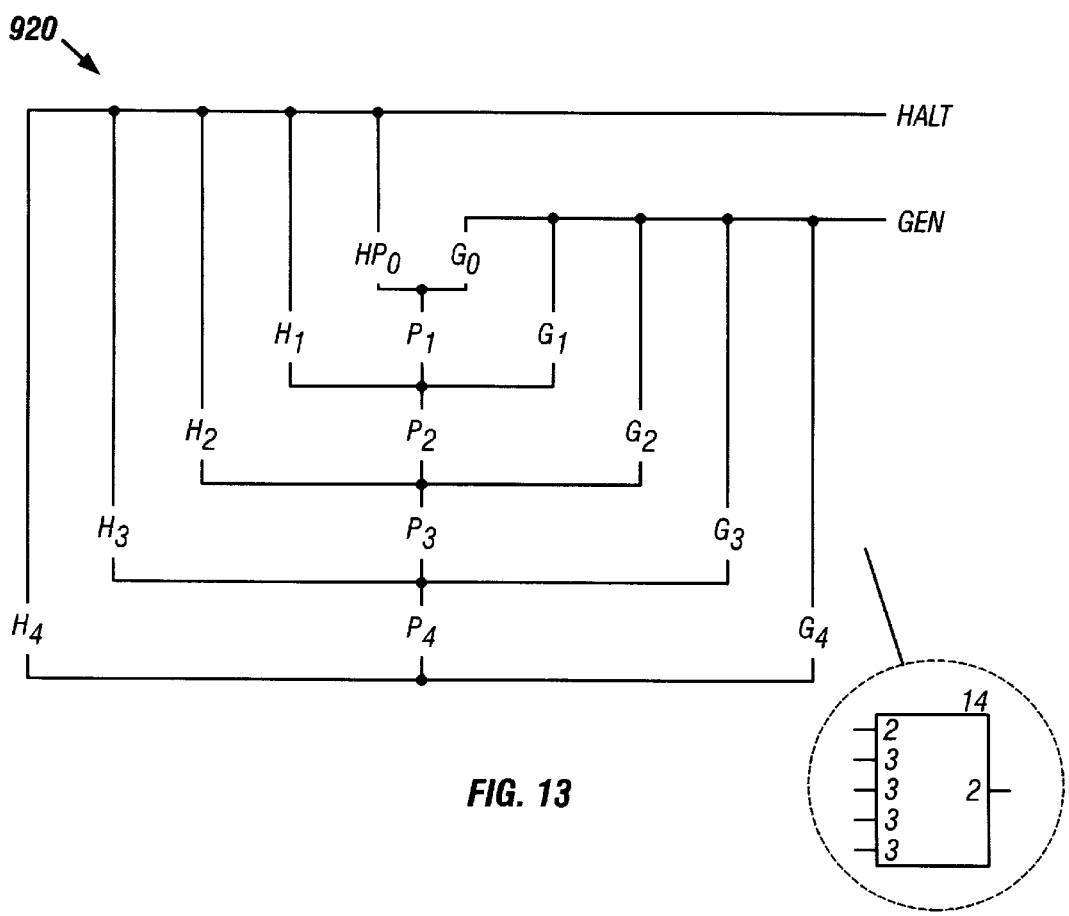
FIG. 13 is a shorthand representation of a five -input Level Two LSB HPG gate.
Figure 13A:
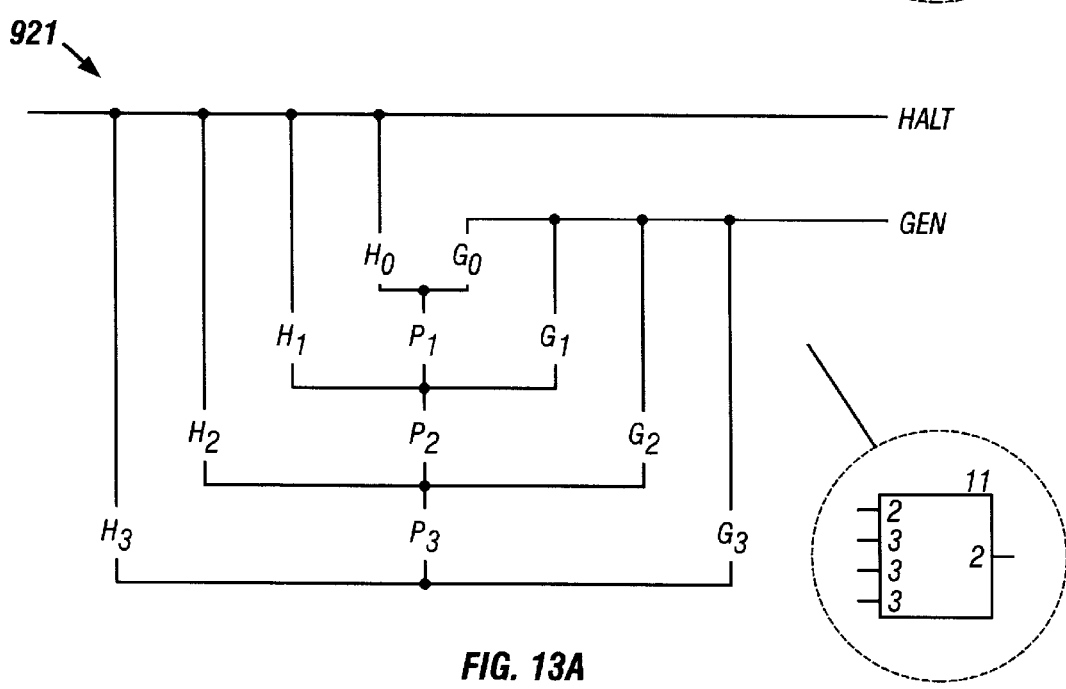
FIG. 13A is a shorthand representation of an LSBlK four-input Level Two HPG gate.

The block HPG gates 920, 921, 952, 953, 954, 955 of the present invention's second logic level are shown in FIGS. 13 through 17, including FIG. 13A. These gates compute block-level HPG signals based on the individual HPG signals generated for each dit in the first level of logic. These Level Two HPG gates are of varying sizes. FIG. 11 illustrates that the largest gates 920 and 955, are used to calculate the block HPG signals for an entire five-dit block. FIG. 11 illustrates that such gates are the most significant gates within a Level Two block. The smaller gates 921, 952, 953, and 954 are used within a block to compute the carry into dit positions not on block boundaries.

Figure 14:
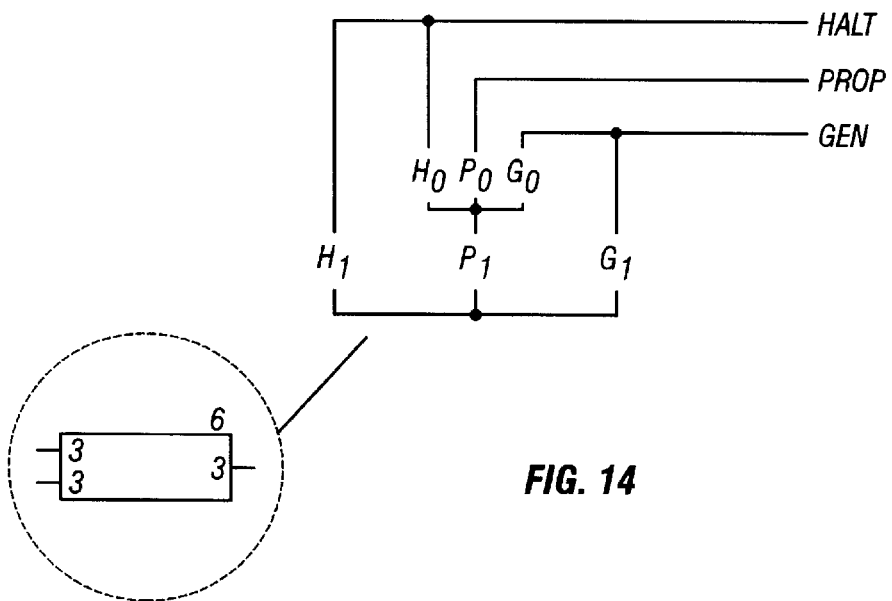
FIG. 14 is a shorthand representation of a two-input Level Two HPG gate.

The smallest Level Two HPG gate 952 calculates the carry into a particular dit based on the HPG signals for the two dits of lesser significance within the block in which the dit of interest lies. FIG. 14 further illustrates this two-input Level Two HPG gate 952. The two-input Level Two HPG gate 952 receives as inputs two 1-of-3 HPG signals. The first signal, noted as HPG1 in FIG. 14, comprises three wires labeled as H1, P1, and G1. FIG. 11 illustrates that the HPG1 signal delivers to gate 952 the HPG signal for the dit immediately adjacent (less significant) than the dit of interest. The second HPG input into the two-input Level Two HPG gate 952, noted as HPG0 in FIG. 14, comprises three wires labeled as H0, P0, and G0. FIG. 11 illustrates that the HPG0 signal delivers to gate 952 the HPG signal from the second dit less significant than the dit of interest. FIG. 14 illustrates that if the H1 signal is asserted, signifying a halt signal from the adjacent dit, then the HALT output signal is asserted. If the G1 signal is asserted, signifying a generate signal from the adjacent dit, then a GEN signal output signal is asserted. If the P1 input signal is asserted, then the HPG0 signal must be evaluated. FIG. 14 illustrates that if P1 and H0 are asserted, a halt signal has propagated, from the dit of second lesser significance, across the immediately adjacent dit. In such a case, the two-input Level Two HPG gate 952 asserts the HALT output signal. If P1 and G0 are asserted, then a generate signal has propagated, from the dit of second lesser significance, across the immediately adjacent dit. In such a case, the two-input Level Two HPG gate 952 asserts the GEN signal output. If P1 and P0 are both asserted, then a PROP output is asserted by gate 952.

Figure 15:
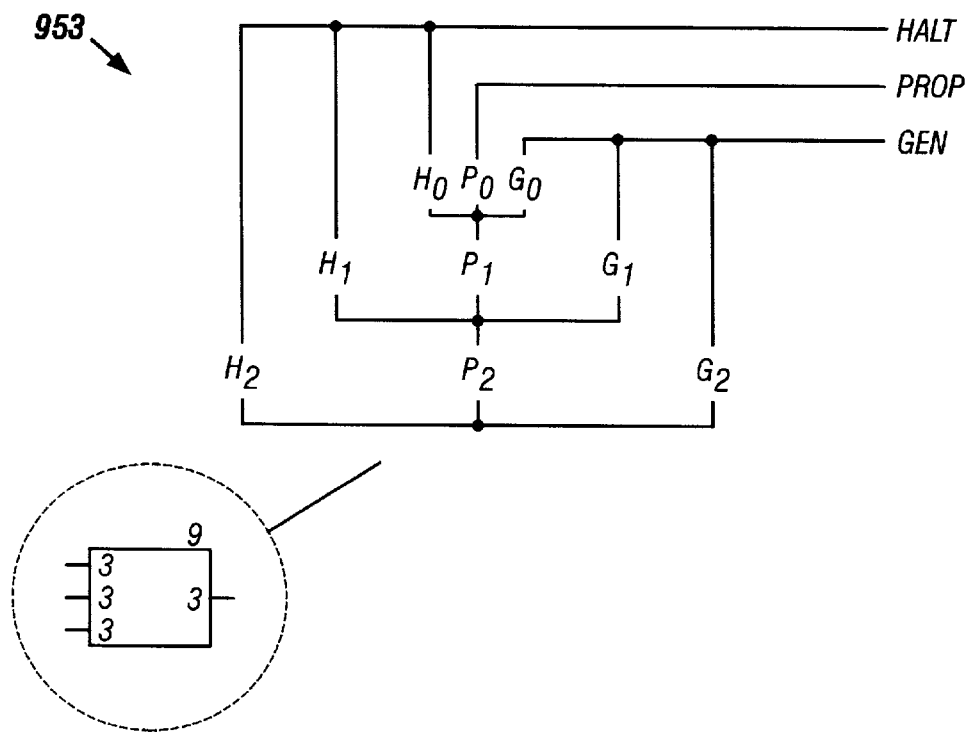
FIG. 15 is a shorthand representation of a three -input Level Two HPG gate.
Figure 16:
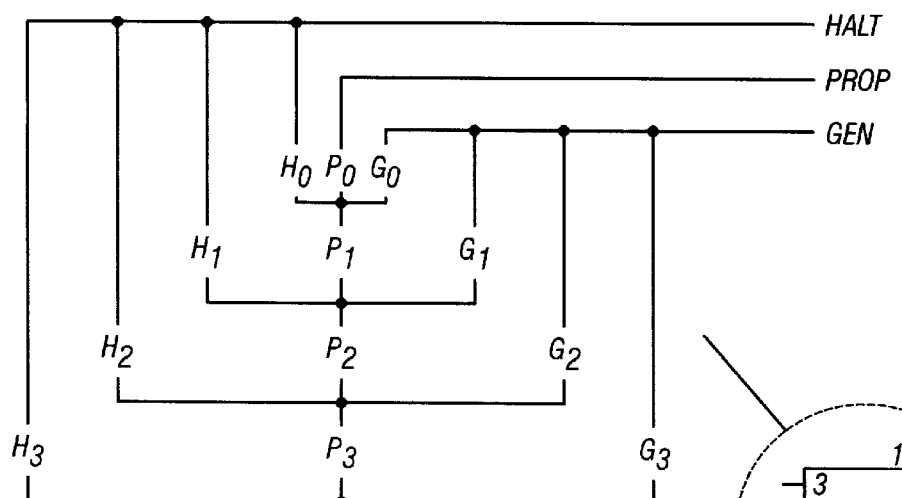
FIG. 16 is a shorthand representation of a standard four-input Level Two HPG gate.
Figure 16:
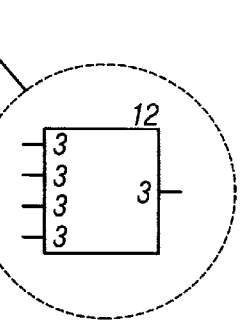

FIG. 15 illustrates that the operation of the three-input Level Two HPG gate 953 is essentially the same as that of the two-input Level Two HPG gate 952 discussed above, except that the three-input Level Two HPG gate 953 receives as inputs three 1-of-3 HPG signals instead of two. Similarly, the four-input Level Two HPG gate 954 illustrated in FIG. 16 receives four 1-of-3 HPG inputs. As with the two-input gate 952, the three-input 953 and four-input 954 Level Two HPG gates generate a HALT output if they encounter an H input, generate a GEN output if they encounter a G input, and go on to evaluate the HPG signal for a dit of lesser significance if they encounter a P input.

FIG. 13A illustrates a modified four-input Level Two HPG gate 921 that is used for LSBlk processing. A comparison of FIGS. 16 and 13A reveals that the only difference between the standard four-input Level Two HPG gate 954 and the LSD four-input Level Two HPG gate 921 is that the LSD gate 921 receives a 1-of-2 signal for the HPG0 indicator. In gate 921, if P3, P2, and P1 are asserted, then the HPG0 signal is examined. If P3, P2, P1, and G0 are asserted, the gate 921 asserts a GEN signal. On the other hand, if P3, P2, P1, and the combined HP0 signal is asserted, then the LSD four-input Level Two gate 921 asserts a HALT signal. The unique nature of the 1-of-2 inputs for gate 921 stems from the fact that the least-significant dit combines the halt and propagate signals to save a wire, since there will never be a carry into the LSD and the LSD will therefore never propagate a value.

Figure 17:
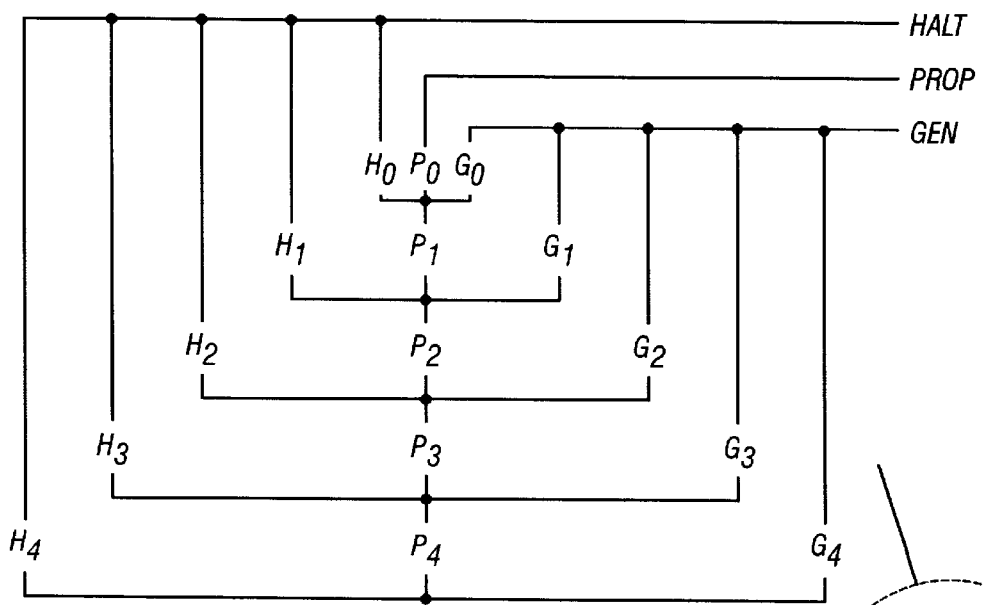
FIG. 17 is a shorthand representation of a standard five-input Level Two HPG gate.
Figure 17:
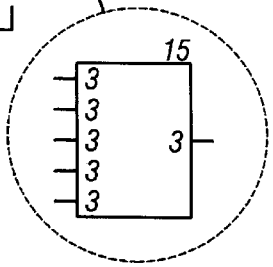

The largest gates 920 and 955, which each receive five HPG signals as inputs, are shown in FIGS. 13 and 17. FIG. 13 illustrates the five-input Level Two HPG gate 920 used in the LSB of the second logic level, while FIG. 17 illustrates a standard five-input Level Two HPG gate 955. FIG. 13 reflects that one of the 5 inputs into the LSD five-input gate 920 is a 1of-2 signal, the wires of which are labeled in FIG. 13 as HP0 and G0. In contrast, the standard five-input Level Two HPG gate 955 receives five 1-of-3 HPG input signals, each having an H wire, a P wire, and a G wire. Again, this difference between the two gates 920, 955 stems from the fact that the HPG0 signal is the block carry signal of the LSD, which combines the halt and propagate indicators since there is never a carry into the LSD. The five-input gates 920, 955 perform basically the same function as the other Level Two HPG gates discussed above. The gates 920, 955 begin with evaluation of the HPG signal generated for the adjacent dit, and proceed to dits of lesser significance as long as P signals are encountered. If the gates 920, 955 ever encounter an H signal, then a HALT output is asserted. If the gates 920, 955 ever encounter a G signal, then a GEN output is asserted. If a P signal is encountered, the HPG signal a dit of lesser significance is evaluated.

Level Two Configuration

FIG. 19 illustrates that, as with Level One, the Level Two HPG gates 920, 921, 952, 953, 954, 955 may be conceptually grouped into three distinct groups, "Level Two, LSBlk" 205, "Level Two, Block Two" 210, and "Level Two, Block Three" 215. In addition to these three groups of logic gates, Level Two comprises three additional buffers. A sum buffer 950a and an HPG buffer 951a store the MSD sum and the MSD HPG signal, respectively, that are calculated in Level One. In addition, Level Two comprises a sum buffer 950m for the sum calculated by Level One for the LSD. Each of the Level Two blocks is discussed below.

Level Two, LSBlk

Figure 23:
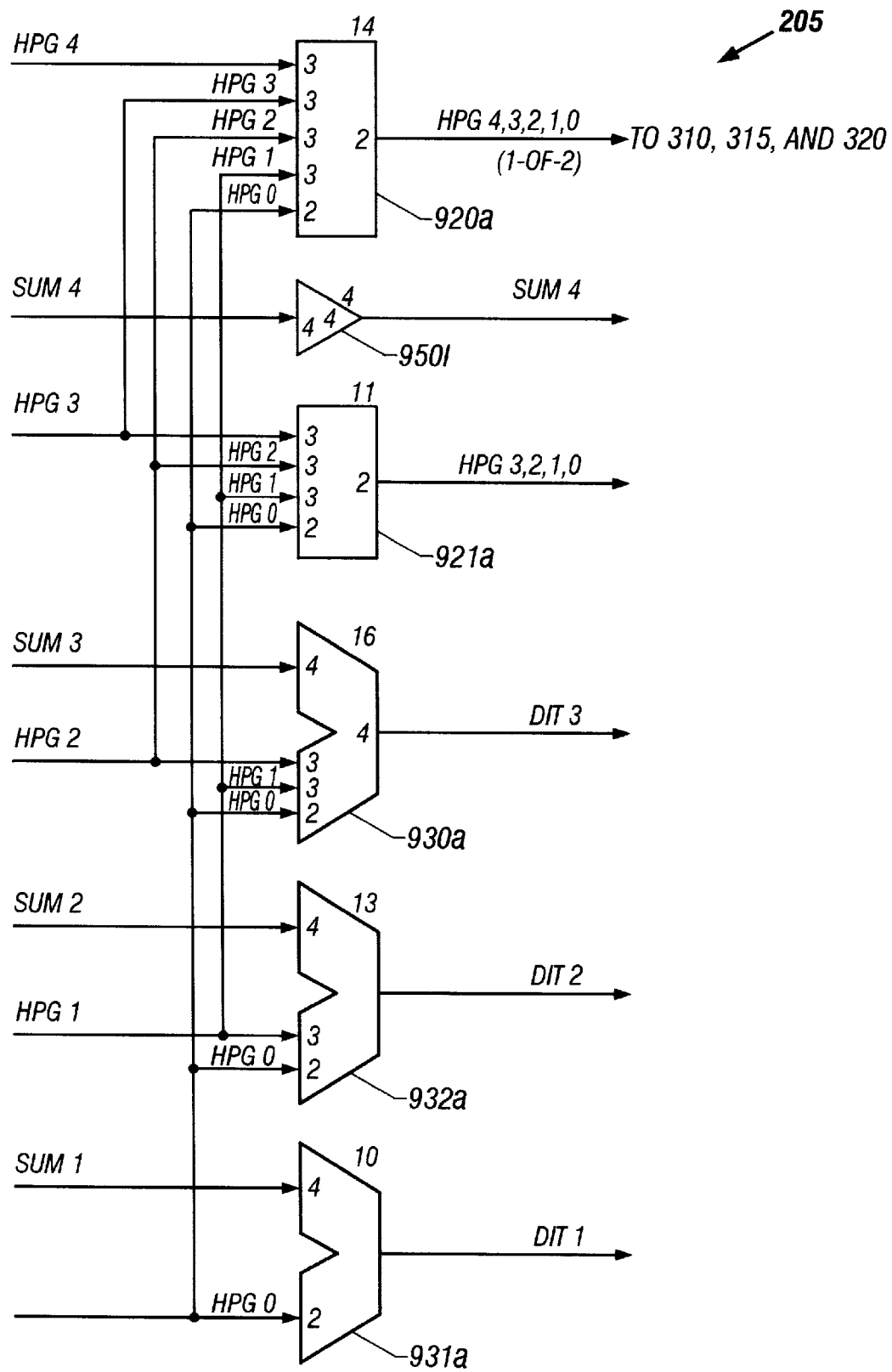
FIG. 23 is a high-level shorthand representation of Level Two, LSBlk processing.

Still referring to FIG. 19, the first block of Level Two logic gates 205, which performs logic for the LSBlk, is labeled as "Level Two, LSBlk" 205. FIG. 23 illustrates Level Two, LSBlk 205 in detail. The inputs into Level Two, LSBlk 205 comprise, with one exception, the outputs of Level One, LSBlk 105. That is, the inputs into Level Two, LSBlk 205 comprise (1) the HPG signals, HPG0 through HPG4, for the five least significant dits of the intermediate sum of A and B; and (2) the sum values for dits 1 through 4 of said intermediate sum, SUM1 through SUM4. FIG. 19 illustrates that the intermediate sum for dit zero, Sum0, is not wired as an input into Level Two, LSBlk 205, but is rather input directly into a sum buffer 950m.

As the discussions below of Level Two, Block Two 210 and Level Two, Block Three 215 will illustrate, most Level Two processing involves storing the intermediate sum for each dit in a sum buffer 950 and performing block HPG processing with the individual HPG signals that have been generated, by Level One, for each dit of the intermediate sum. Level Two processing for the LSBlk does not follow this general pattern because there is never a carry in to the LSBlk. For this reason, the final output values for dits one through three, DIT1–DIT3, are generated at Level Two, by gates 931a, 932a, and 930a, respectively. The operation of these gates is set forth below in the section entitled "Level Three Incrementor Gates."

FIG. 23 illustrates that Level Two handles the remaining dit of the LSBlk differently than it does the four least significant dits of Level Two, LSBlk. The Level One intermediate sum for dit 4 is stored by Level Two LSBlk in a sum buffer 950l. A four-input Level Two block HPG gate, 921a, calculates a block HPG signal, HPG0,1,2,3, that will be used to determine whether the intermediate sum for dit 4, having been stored by Level Two in a sum buffer 950l, will need to be incremented in Level Three. Similarly, a specialized five-input block HPG gate 920a takes the HPG signals for dits zero through four of the intermediate sum, as calculated in Level One, and generates a block HPG signal for the LSBlk, labeled in FIG. 23 as HPG4,3,2,1,0.

Level Two, Block Two

Figure 24:
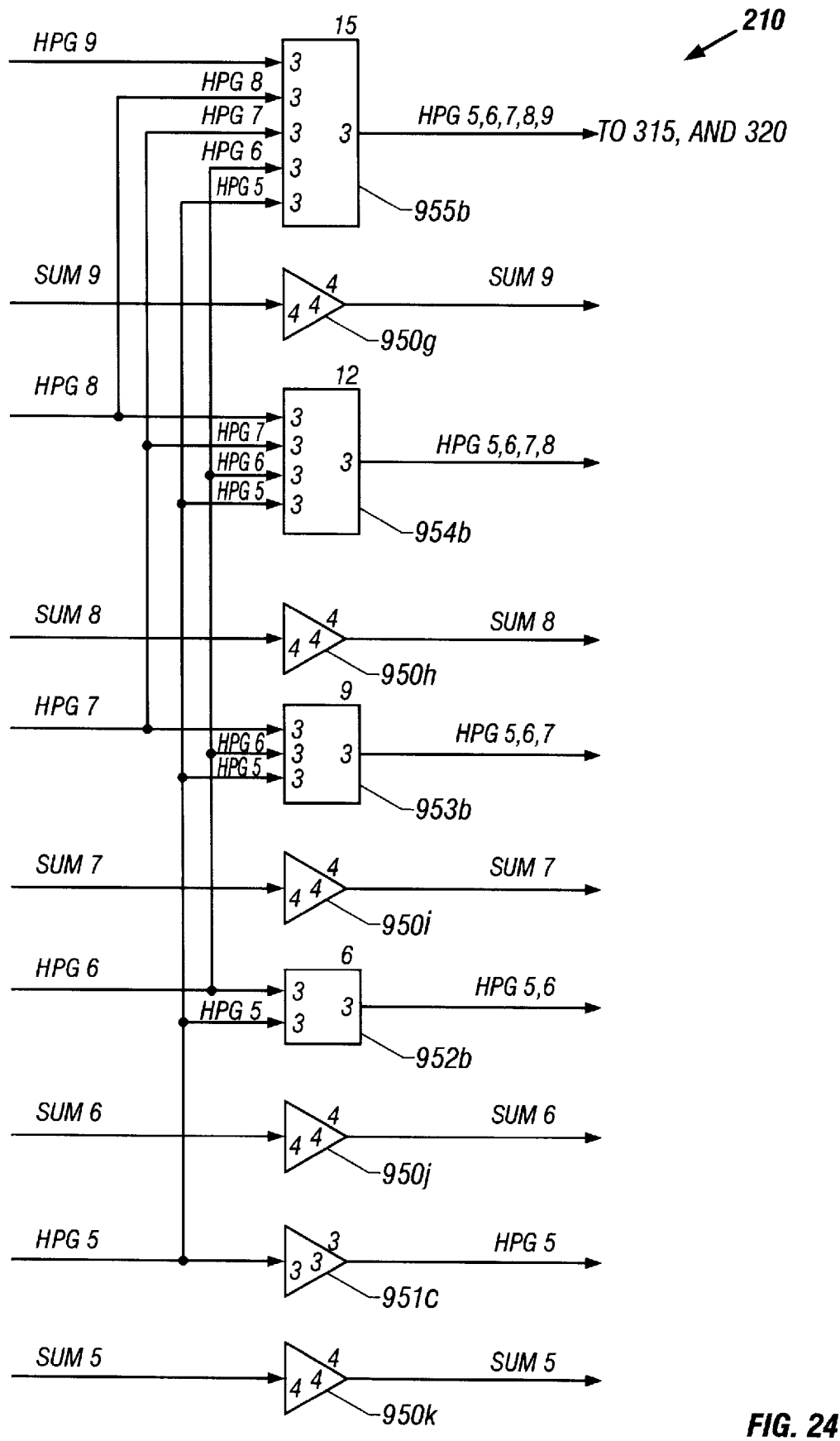
FIG. 24 is a high-level shorthand representation of Level Two, Block Two processing.

FIG. 24 illustrates in detail the logic of Level Two, Block Two. All intermediate sums for dits comprising the second block are stored in sum buffers 950g through 950k. The HPG signal for dit 5 of the intermediate sum is stored in an HPG buffer 951 c; this signal will be used in Level Three to determine whether there is a carry into dit 6 of the intermediate sum. For dits 7 through 10 of the intermediate sum, block HPG signals are generated for each dit. A two-input HPG gate 952b calculates the HPG signal, HPG5,6, necessary for the Level Three determination of whether there is a carry into dit 7 of the intermediate sum. Similarly, a three-input HPG gate 953b calculates the block HPG signal, HPG5,6,7, for use with dit 8 of the intermediate sum, a four-input HPG gate 954b calculates the block HPG signal HPG5,6,7,8, for use with dit 9 of the intermediate sum, and a five-input HPG gate 955*b* calculates the block HPG signal, HPG5,6,7,8,9 for use with dit 10 of the intermediate sum.

Level Two, Block Three

Figure 25:
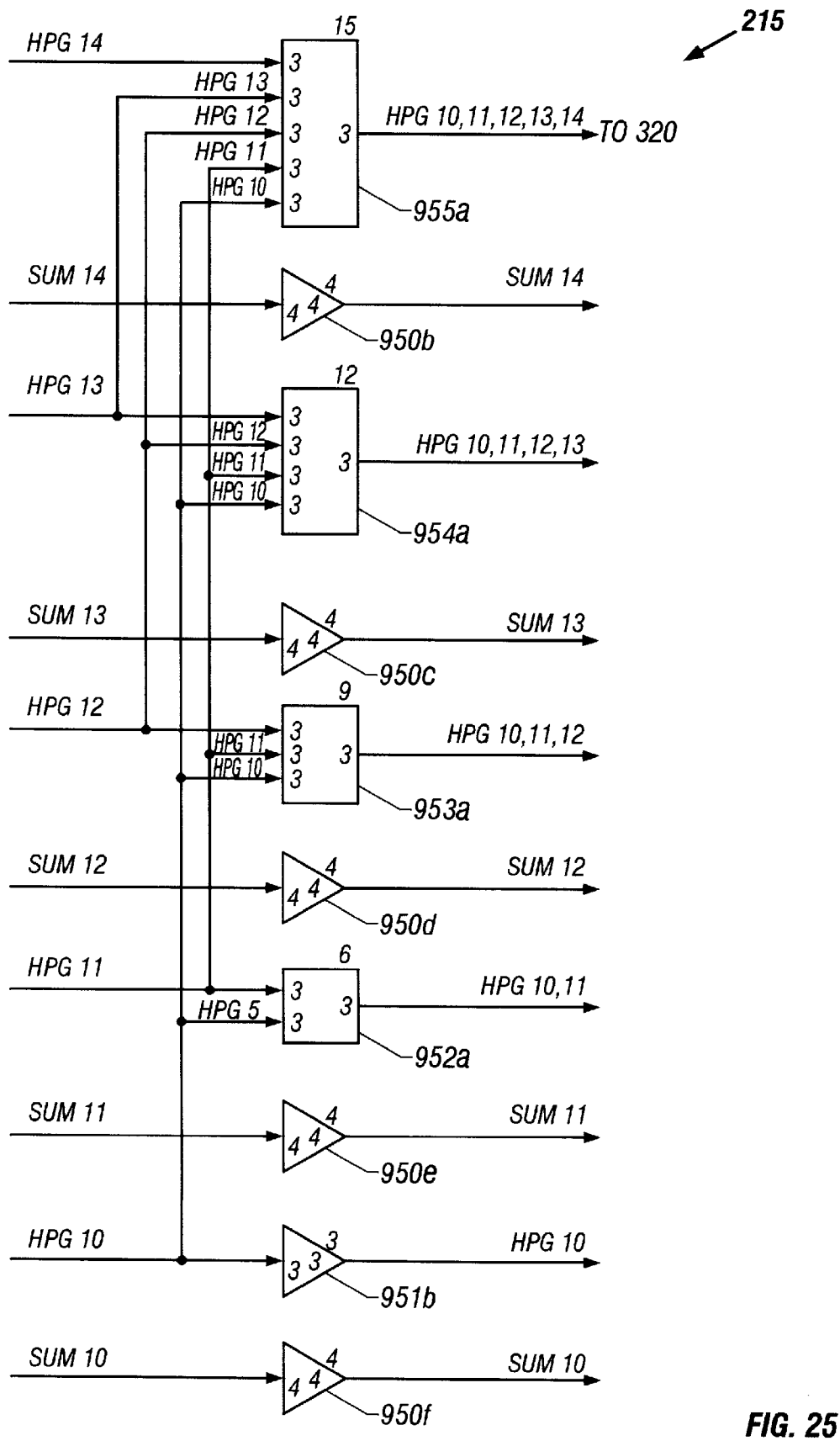
FIG. 25 is a high-level shorthand representation of Level Two, Block Three processing.

FIG. 25 illustrates the logic of Level Two, Block Three. All intermediate sums for dits comprising the third block are stored in sum buffers 950*b* through 950*f*. The HPG signal generated by Level One for dit 10 of the intermediate sum is stored in an HPG buffer 951*b*; this signal will be used by Level Three to determine whether there is a carry into dit 11 of the intermediate sum. For dits 12 through 15 of the intermediate sum, block HPG signals are generated for each dit. A two-input HPG gate 952*a* calculates the HPG signal, HPG10,11 necessary for the Level Three determination of whether there is a carry into dit 12 of the intermediate sum. Similarly, a three-input HPG gate 953*a* calculates the block HPG signal, HPG10,11,12, for use with dit 13 of the intermediate sum, a four-input HPG gate 954*a* calculates the block HPG signal HPG10,11,12,13, for use with dit 14 of the intermediate sum, and a five-input HPG gate 955*a* calculates the block HPG signal, HPG10,11,12,13,14 for use with dit 15 of the intermediate sum.

Level Three—Overview

FIG. 11 illustrates that the present invention 101 comprises incrementor gates 930*b*–930*f*, 931*b*, 931*c*, 932*b*–932*e*, that increment the value of a particular dit of the intermediate sum, if there is a carry or propagate into said dit. This logic utilizes the block HPG signals generated by Level Two Logic to determine whether to increment the intermediate sum values stored in buffers 950*a* through 950*l* in Level Two. FIG. 11 illustrates that Level Three comprises buffers 950*n*–950*q* that store the final output values for certain LSBlk dits as generated by Level Two. Finally, Level Three comprises a carry gate 921*b* that generates a carry out indicator for the present invention 101.

Level Three Incrementor Gates

Figure 18:
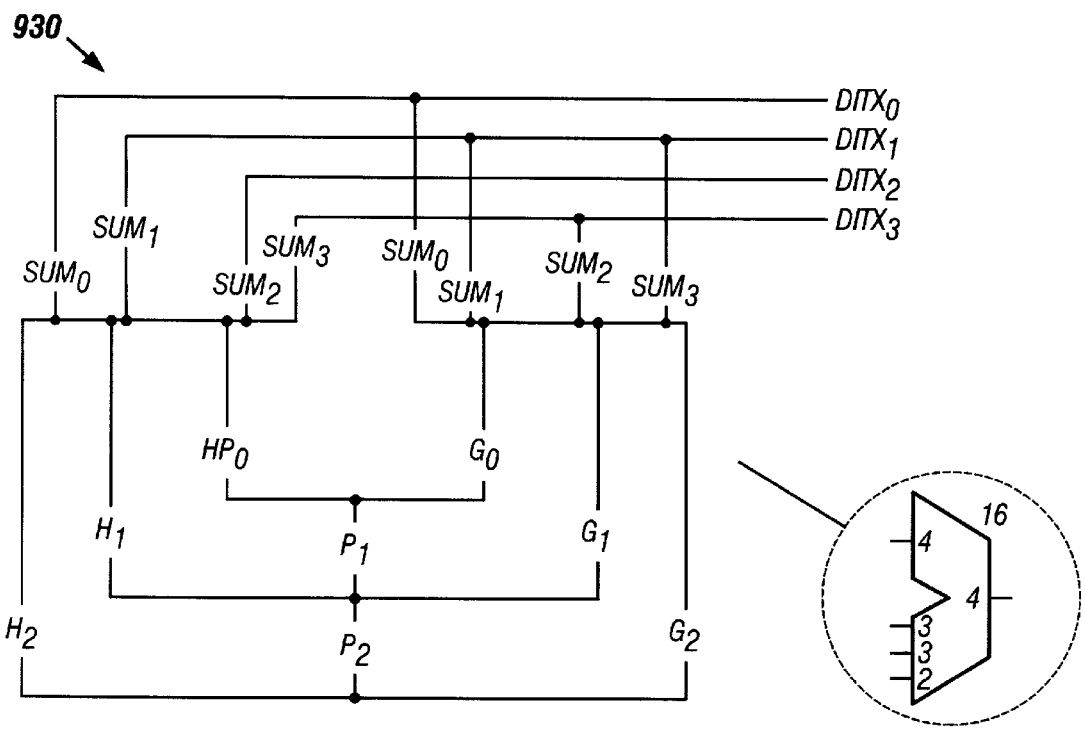
FIG. 18 is a shorthand representation of a three-block incrementor gate.
Figure 18A:
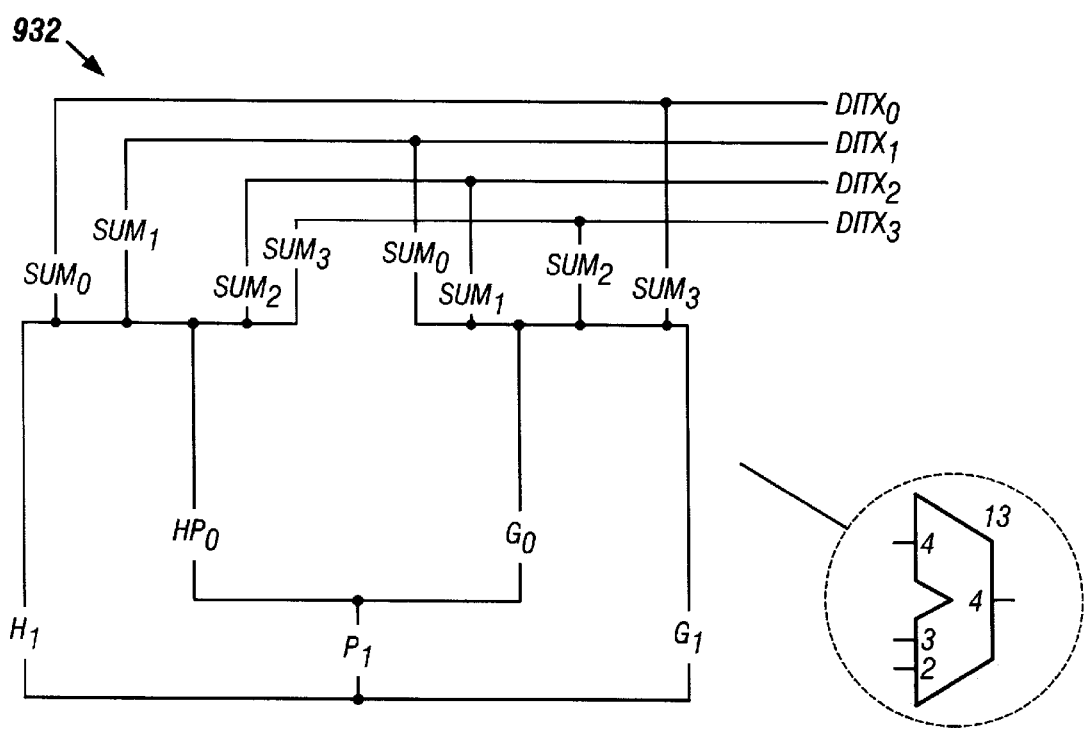
FIG. 18A is a shorthand representation of a two-block incrementor gate.
Figure 18B:
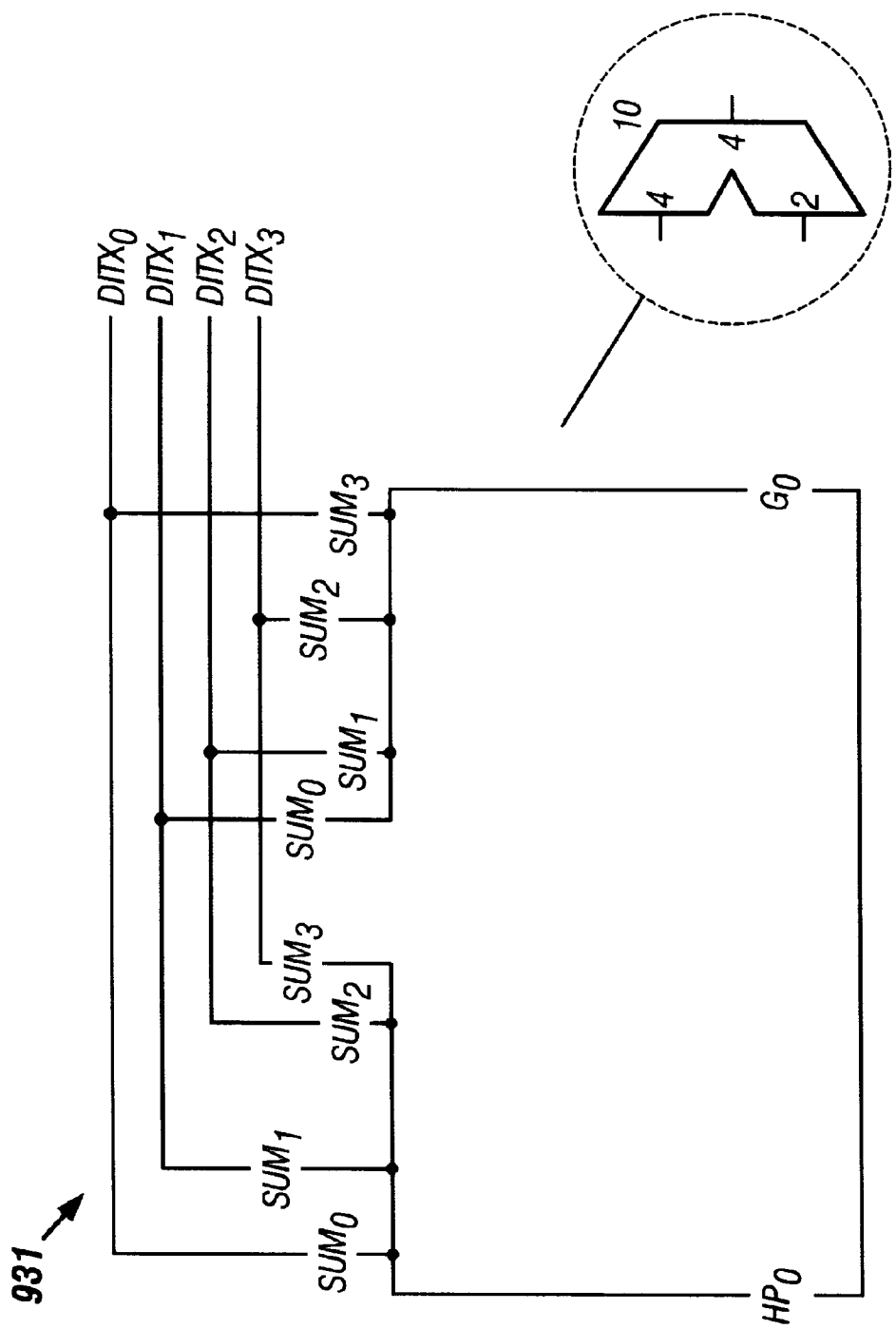
FIG. 18B is a shorthand representation of a simple incrementor gate.

The incrementor gates 930, 931, and 932 of the final level are shown in FIGS. 18, 18A, and 18B. The inputs into the incrementor gates 930, 931, and 932 are the 1-of-4 intermediate sum for the dit of interest, computed in the first level of logic, and up to three 1-of-3 block HPG signals computed in the second level. The output of the incrementor gates 930, 931, and 932 is a final 1-of-4 sum for the dit of interest. In Level Three, if there is a carry into the dit position for the dit of interest, then 1 is added to the intermediate sum to form the final sum. A carry into the dit of interest is signified by a generate in an adjacent dit or a more distant generate propagated through adjacent dits. If there is no carry in, then the intermediate sum for the dit of interest is passed through the incrementor gates 930, 931, 932 unmodified.

FIG. 18B illustrates the simplest of the incrementor gates 931, referred to herein as the "simple incrementor gate." The simple incrementor gate 931 produces the final output result values for Dit 1, Dit 4, and Dit 5. As discussed above, Level Two utilizes gate 931 to generate the final output result for Dit 1. Level Three performs this processing for Dits 4 and 5. For illustrative purposes, the operation of Gate 931 is presented in the context of Dit 1 processing. FIG. 23 illustrates that SUM1 and the HPG signal for the LSD, HPG0, are inputs into a simple incrementor gate 931*a*. Gate 931*a* is illustrated in FIG. 18B. The HPG0 signal is a 1-of-2 signal generated by the Level One LSD gate, which is labeled as 910*a* in FIG. 20. The value of the HPG0 signal indicates whether a combined Halt/Propagate signal is generated by the LSD, or whether a Generate signal is generated by the LSD. FIG. 18B illustrates that the simple incrementor gate 931*a* takes this 1-of-2 HPG0 signal and the 1-of-4 SUM1 signal and increments SUM by one, if the G0 signal is asserted, to generate the final output for dit 1, DIT1. Otherwise, a carry into the dit of interest, Dit 1, has not occurred. Accordingly, when the HP0 signal is asserted, the simple incrementor gate 931*a* does not increment the value of SUM, but merely passes it through as the final output, DIT1. The operation of the simple incrementor gate 931 is set forth in the above discussion concerning Level Two, LSBlk logic gates.

Figure 26:
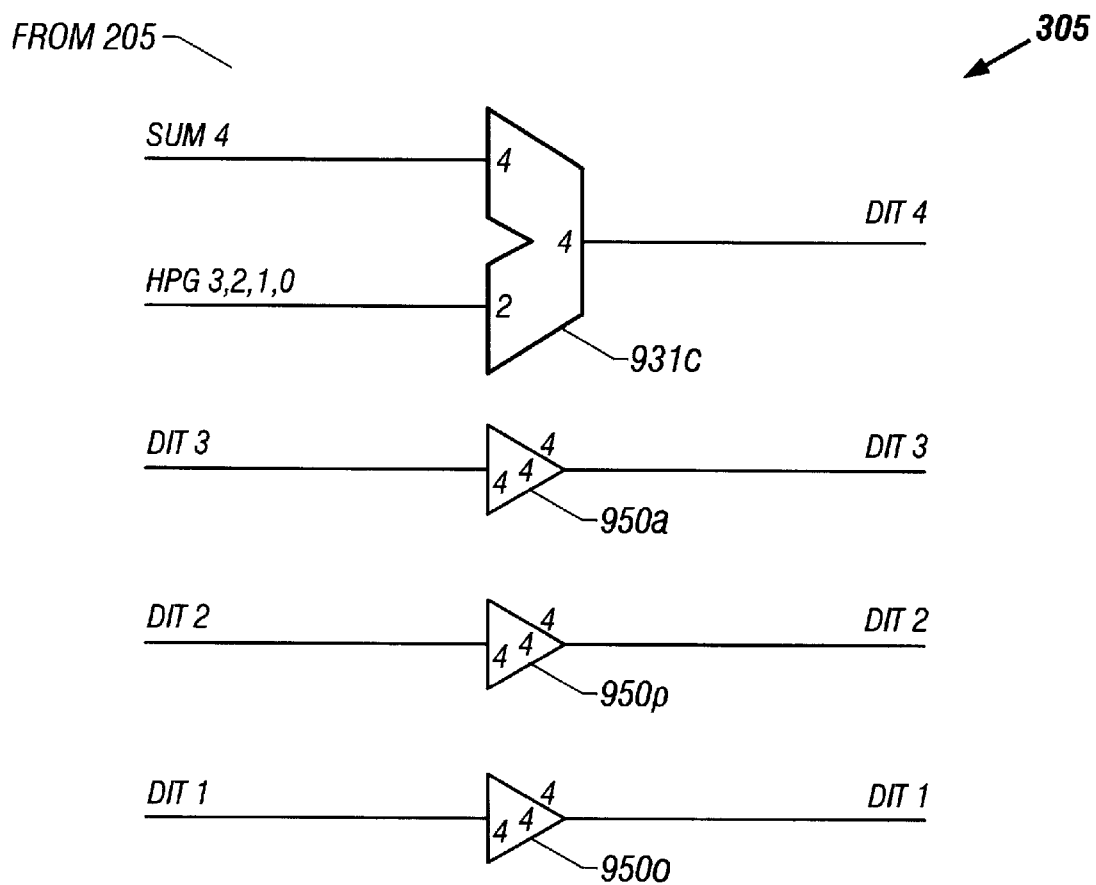
FIG. 26 is a high-level shorthand representation of Level Three, LSBlk processing.
Figure 27:
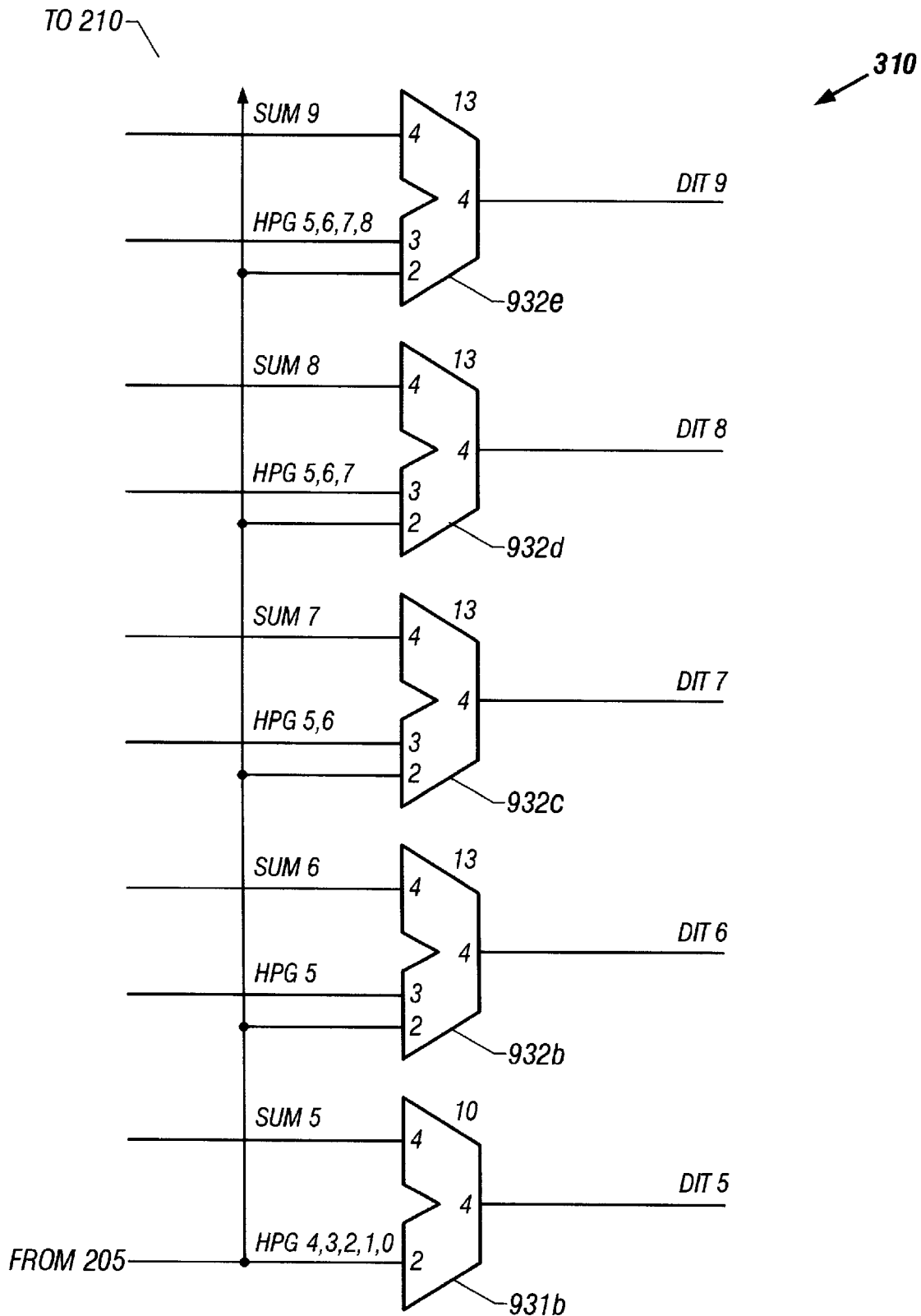
FIG. 27 is a high-level shorthand representation of Level Three, Block Two processing.

The simple incrementor gate 931 is distinct from the other two incrementor gates, 930 and 932, because it receives as inputs only the sum and a 1-of-2 HPG signal that combines the H and P indicators. This feature stems from the fact that there will never be a carry propagated into the LSBlk. Accordingly, FIGS. 11, 23, and 26 illustrate that Gate 931 is used in LSBlk processing. FIG. 27 illustrates that a simple incrementor gate 931*b* is also used in Block 2 when the only block HPG signal being processed is that of the LSBlk.

FIG. 18A illustrates an incrementor gate 932 that is slightly more complex than the simple incrementor gate 931 because it takes two block HPG signals as inputs, rather than one. Such gate 932 is referred to herein as the "two-block incrementor gate." The two-block incrementor gate 932 receives as inputs the intermediate sum, SUM, for a particular dit, as well as two block HPG signals, HPG0 and HPG1. HPG1, comprising H1, P1, and G1, is the 1-of-3 block HPG signal generated by the dit(s) of lesser significance within the block in which the dit of interest lies. FIG. 11 shows that one exception is gate 932*f*, which is the two-block incrementor gate for the least significant dit in Block3. FIG. 11 illustrates that, for gate 932*f*, HPG1 corresponds to the block HPG signal for the immediately adjacent block of lesser significance, Block 2. HPG0, comprising HP0 and G0, is the 1-of-2 HPG signal for the LSBlk. (For gate 932*a*, HPG0 is the HPG signal for the least significant dit, rather than the least significant block). FIG. 18A illustrates that the two-block incrementor gate 932 first evaluates the HPG1 signal. If H1 is asserted, then the intermediate sum, SUM, for the dit of interest is simply passed through as the final output, DITX. If GI is set, then a carry has been generated by the block of lesser significance closest to the block in which the dit of interest lies. FIG. 18A illustrates that, if G1 is asserted, then the intermediate sum, SUM, is incremented by one before being delivered as the final output for the dit of interest, DITX. If P1 is asserted, then SUM will only be incremented if a carry from the next-further dit propagates across the dit adjacent to the dit of interest. HPG0 must therefore be examined if P1 is asserted. FIG. 18A illustrates that when P1 is asserted, the two-block incrementor gate 932 increments the intermediate sum, SUM, if G0 is asserted. If HP0 and P1 are asserted, then the two-block incrementor gate 932 simply passes SUM through as the final output, DITX.

FIG. 18 illustrates that similar processing occurs in the remaining incrementor gate 930, referred to herein as the "three-block incrementor gate." The three-block incrementor gate 930 is slightly more complex than the two-block incrementor gate 932 because it receives three block HPG signals as inputs, rather than two. The three-block incrementor gate 930 receives as inputs the 1-of-4 intermediate sum, SUM, for the dit of interest. FIG. 18 illustrates that SUM is a 1-of-4 input comprising 4 wires: SUM$_3$, SUM$_2$, SUM$_1$, and SUM$_0$. FIG. 18 also illustrates that Gate 930 also receives as inputs three block HPG signals, HPG0, HPG1, and HPG2. HPG2, comprising H2, P2, and G2, is the 1-of-3 block HPG signal generated by the dit(s) of lesser significance within the block in which the dit of interest lies.

HPG1, comprising H1, P1, and G1, is the 1-of-3 block HPG signal for the immediately adjacent block of lesser significance, Block Two. HPG0, comprising HP0 and G0, is the 1-of-2 block HPG signal for the LSBlk. FIG. 18 illustrates that the three-block incrementor gate 930 first evaluates the HPG2 signal. If H2 is asserted, then the intermediate sum, SUM, for the dit of interest is simply passed through as the final output, DITX. If G2 is asserted, then a carry has been generated by Block 2. (For gate 930a, which is used in Level Two, LSBlk, assertion of G2 indicates that a carry has been generated by the immediately adjacent dit of lesser significance, Dit 2). FIG. 18 illustrates that, if G2 is asserted, then the intermediate sum, SUM, is incremented by one before being delivered as the final output for the dit of interest, DITX. If P2 is set, then SUM will only be incremented if a carry has generated into the adjacent dit or has propagated from a more distant dit across all intervening dits. HPG1 must therefore be examined if P2 is asserted. FIG. 18 illustrates that, if P2 is asserted, the three-block incrementor gate 930 next evaluates the HPG1 signal. If H1 is asserted, then the intermediate sum, SUM, for the dit of interest is simply passed through as the final output, DITX. If G1 is set, then a carry has been generated by the block of lesser significance closest to the block in which the dit of interest lies. FIG. 18 illustrates that, if G1 is asserted, then the intermediate sum, SUM, is incremented by one before being delivered as the final output for the dit of interest, DITX. If P1 is set, then SUM will only be incremented if there is a carry into the dit of interest. HPG0 must therefore be examined if P1 is asserted. FIG. 18 illustrates that when P1 is set, the three-block incrementor gate 930 increments the intermediate sum, SUM, if G0 is set. If P1 and HP0 are set, then the three-block incrementor gate 930 simply passes SUM through as the final output, DITX.

Level Three Carry Gate

FIG. 11 illustrates that the most significant gate of Level Three is a four-input Level Two block HPG gate 921b that calculates whether a carry out is generated by the present invention 101. The carry gate 921b is further illustrated in FIG. 13A. Its functionality is described above in connection with the other Level Two Block HPG gates. FIG. 11 illustrates that the carry gate 921b takes as inputs the block HPG signal for each Level Two block, 205, 210, 215, as well as the carry out signal generated at Level One for the MSD by gate 900a and stored at Level Two in a buffer 951a. The block HPG signal for the LSBlk is a 1-of-2 signal; the others are 1-of-3 signals. FIG. 13A illustrates that the HPG signal for the MSD, HPG3, is examined first. Then, if necessary, the HPG signals for successively less significant blocks are examined. If the carry gate 921b ever encounters an H signal, then the gate 921b asserts a HALT signal. If the carry gate 921b ever encounters a G signal, the gate 921b asserts a GEN signal. If a P signal is ever encountered, then the HPG signal for the next-less significant dit is examined.

Level Three Configuration

FIG. 19 illustrates that, as with Level One and Level Two, the Level Three incrementor gates 930b–930f, 931b, 931c, 932b–932e, buffers 950n–950q, and carry gate 921b may be conceptually grouped into distinct groups: "Level Three, LSBlk" 305, "Level Three, Block Two" 310, "Level Three, Block Three" 315, and "Level Three, MSD" 320. In addition to these four groups of logic gates, Level Three further comprises an additional sum buffer 950n that stores the LSD output value, DIT0, that is calculated in Level One. Each of the four Level Three blocks is discussed below.

Level Three, LSBlk

FIG. 19 illustrates that the least significant block of Level Three logic gates 305, which performs logic for the LSBlk, is labeled as "Level Three, LSBlk" 305. FIG. 26 illustrates Level Three, LSBlk 305 in detail. The inputs into Level Three, LSBlk 305 comprise, with one exception, the outputs of Level Two, LSBlk 205. That is, the inputs into Level Three, LSBlk 305 comprise (1) the output values, Dit1 through Dit3, stored by Level Two for dits 1 through 3 of the intermediate sum of A and B, (2) the value stored by Level Two for dit 4 of said intermediate sum, SUM4, and 3) the block HPG signal HPG0,1,2,3 representing the carry out of dits 0 through 3 and into dit 4. FIG. 19 illustrates that the output value, Dit0, stored by Level Two for dit 0 of the intermediate sum of A and B, is not wired as an input into Level Three, LSBlk 305, but is rather input directly into a sum buffer 950n.

As the discussions below of Level Three, Block Two, 310, Level Three, Block Three 315, and Level Three, MSD320 will illustrate, most Level Three processing involves determining whether a carry into said dit requires that the intermediate sum for that dit be incremented. For the most part, Level Three processing for the LSBlk does not follow this general pattern because there is never a carry in to the LSBlk. For this reason, as FIG. 26 illustrates, the final output values for dits 1 through 3, DIT1–DIT3, are generated at Level Two and are merely passed through sum buffers 950o, 950p, 950q at Level Three. (FIG. 19 illustrates that the same processing occurs for dit 0 of the intermediate sum.)

FIG. 26 illustrates that Level Three handles the remaining dit of the LSBlk differently than it does the four least significant dits of the intermediate sum. Level Three, LSBlk 305 calculates the final output value for dit 4, DIT4, using a simple Level Three incrementor gate 931c. The simple incrementor gate 931c receives as an input the intermediate sum for dit 4 from sum buffer 950l. The simple incrementor gate 931c also receives as an input the block HPG signal, HPG0,1,2,3, which represents the block carry signal indicating whether there is a carry into dit 4. As is described above, the operation of the simple incrementor gate 931c, which is further illustrated in FIG. 18B, is to increment the intermediate sum value for dit 4 if the G indicator is asserted for signal HPG0,1,2,3. If, on the other hand, the HP signal is asserted for signal HPG0,1,2,3, then the value of the intermediate sum for dit 4 is output from gate 931c as the final output, DIT4, for dit 4.

Level Three, Block Two

FIG. 27 illustrates that the inputs into Level Three, Block Two 310 comprise the sum and the block HPG carry in values for dits 5 though 9 of the intermediate sum. The Block HPG signal, HPG0,1,2,3,4, representing the block HPG signal for the LSBlk, comes from Level Two, LSBlk 205 and is an input into each of the Level Three, Block Two incrementor gates 931b, 932b–932e. The remaining inputs into Level Three, Block Two 310 come from Level Two, Block Two 210. The output from Level Three, Block Two is the final output for dits 5 through 9, DIT5–DIT9.

Level Three, Block Two 310 comprises one simple incrementor gate 931b and four two-block incrementor gates 932b–932e. The simple Level Three incrementor gate 931b processes dit 5, the least significant dit of Level Three, Block Two 310. The two-block incrementor gates 932b–932e process dits 6 through 9.

FIG. 27 illustrates that, in order to determine whether the intermediate sum for a particular dit need be incremented before final output, the logic of Level Three must determine whether a carry has been generated for the dit of interest. To do this, two sources of potential carries into the dit of interest must be considered. First, the incrementor gates 931b, 932b–932e must receive as inputs the HPG indicator from the previous block, the LSBlk. This carry in indicator is, as stated above, HPG0,1,2,3,4. In addition, the incrementor gates 932b–932e, except the gate 931b for dit 5, must also receive a block HPG signal representing all dits, within Level Three, Block Two, of lesser significance than the dit of interest.

FIG. 27 illustrates that processing for dit 5 is simplified by the fact that dit 5 is the least significant dit within the block 310. For this reason, there will never be an HPG signal representing dits of lesser significance within the block 310. Accordingly, the incrementor gate 931b for dit 5 receives only one block HPG signal as input, the block HPG signal, HPG0,1,2,3,4 from the block of next-lesser significance, Level Three, LSBlk. Gate 931b also receives as an input the intermediate sum, SUM5, for dit 5. If the G indicator for HPG0,1,2,3,4 is asserted, then the simple incrementor gate 93 1b increments the value of SUM5 and outputs the incremented value as the final output for dit 5, DIT5. Otherwise, when the HP indicator for HPG0,1,2,3,4 is asserted, the value of SUM5 is passed through gate 931b as the final output value, DIT5.

Each of remaining the Level Three, Block Two 310 logic gates 932b–932e receives two HPG signals as inputs. Again, one of the HPG inputs into each of the gates 932b–932e is the LSBlk block HPG indicator, HPG0,1,2,3,4. In addition, the two-block incrementor gate 932b that performs Level Three processing for dit 6 receives the HPG indicator from the dit of lesser significance within the block 310, HPG5. By the same token, the two-block incrementor gate 932c that performs Level Three processing for dit 7 receives the HPG indicator from the two dits that are less significant than dit 7 (i.e., dits 6 and 5). This HPG input into gate 932c is labeled in FIG. 27 as HPG5,6. Similarly, the two-block incrementor gate 932d for dit 8 receives HPG5,6,7 and the two-block incrementor gate 932e for dit 9 receives HPG5,6,7,8.

FIG. 18A illustrates that the two-block incrementor gates 932b–932e will not increment the value of the dit of interest before final output if the H indicator of the block HPG signal for dits of lesser significance within Level Three, Block Two is asserted. On the other hand, the two-block incrementor gates 932b–932e will increment the value of the dit of interest before final output if the G indicator of the block HPG signal for dits of lesser significance within Level Three, Block Two is asserted. If the P indicator for the block HPG signal for dits of lesser significance within Level Three, Block Two is asserted, then the block HPG signal for the LSBlk, HPG0,1,2,3,4, is evaluated. In such a case, if the HP indicator for HPG0,1,2,3,4 is asserted, then the value of the dit of interest is not incremented before final output. Otherwise, the value of the dit of interest is incremented before final output.

Level Three, Block Three

Figure 28:
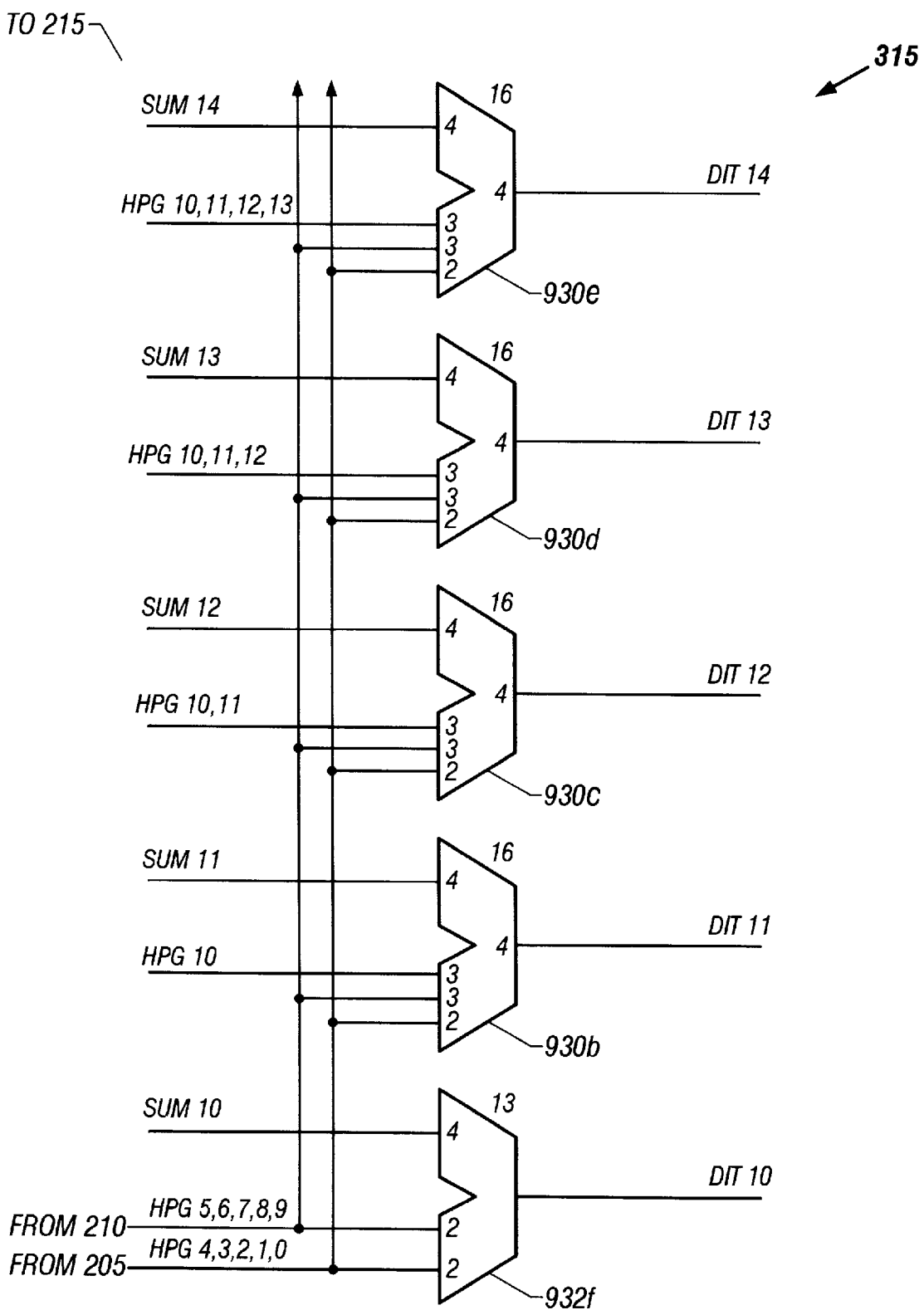
FIG. 28 is a high-level shorthand representation of Level Three, Block Three processing.

FIG. 28 illustrates that the inputs into Level Three, Block Three 315 comprise the sum and the block HPG carry in values for dits 10 though 14 of the intermediate sum. The Block HPG signal, HPG0,1,2,3,4, representing the block HPG signal for the LSBlk, comes from Level Two, LSBlk 205 and is an input into each of the Level Three, Block Three incrementor gates 932f, 930b–930e. The Block HPG signal, HPG5,6,7,8,9, representing the block HPG signal for the Level Two, Block Two 210, is also an input into each of the Level Three, Block Three incrementor gates 932f, 930b–930e. The remaining inputs into Level Three, Block Two 310 come from Level Two, Block Three 215. The output from Level Three, Block Three 315 is the final output for dits 10 through 14, DIT1–DIT14.

Level Three, Block Three 315 comprises one two-block incrementor gate 932f and four three-block incrementor gates 930b–930e. The two-block incrementor gate 932f processes dit 10, the least 20 significant dit of Level Three, Block Three 315. The three-block incrementor gates 930b–930e process dits 10 through 14.

FIG. 28 illustrates that, in order to determine whether the intermediate sum for a particular dit 23 need be incremented before final output, the logic of Level Three, Block Three 315 must determine whether a carry has been generated for the dit of interest. To do this, two sources of potential carries into the dit of interest must be considered. First, the incrementor gates 932f, 930b–930e must receive as inputs the HPG indicator from the previous blocks, the LSBlk and Block Two. The block carry in indicator for the LSBlk is, as stated above, HPG0,1,2,3,4. The block carry in indicator for Block Two is HPG5,6,7,8,9. In addition, the incrementor gates 930b–930e, except the gate 932f for dit 10, must also receive a block HPG signal representing all dits, within Level Three, Block Three, of lesser significance than the dit of interest.

FIG. 28 illustrates that processing for dit 10 is simplified by the fact that dit 10 is the least significant dit within the block 315. For this reason, there will never be an HPG signal representing dits of lesser significance within the block 315. Accordingly, the incrementor gate 932f for dit 10 receives only two block HPG signals as inputs: the 1-of-2 block HPG signal, HPG0,1,2,3,4 from the LSBlk and HPG5,6,7,8,9, the 1-of-3 block HPG signal from Block Two. Gate 932f also receives as an input the intermediate sum, SUM10, for dit 10. The operation of the two-block incrementor 932f is as described above for other two-block incrementor gates 932a–932e. FIG. 18A illustrates that the two-block incrementor gate 932 will not increment the value of the dit of interest before final output if the H indicator of the block HPG signal for dits of lesser significance within the same block is asserted. On the other hand, the two-block incrementor gate 932 will increment the value of the dit of interest before final output if the G indicator of the block HPG signal for dits of lesser significance within the same block is asserted. If the P indicator for the block HPG signal for dits of lesser significance within the same block is asserted, then the block HPG signal for the LSBlk, HPG0,1,2,3,4, is evaluated. In such a case, if the HP indicator for HPG0,1,2,3,4 is asserted, then the the value of the intermediate sum for dit 10, SUM10, is passed unmodified through gate 932f as the final output value, DIT0. Otherwise, the value of SUM10 is incremented before final output. FIG. 28 illustrates that each of remaining the Level Three, Block Three 315 logic gates 930b–930e receives three HPG signals as inputs. Again, one of the HPG inputs into each of the gates 930b–930e is the LSBlk block HPG indicator, HPG0,1,2,3,4 and another is the Block Two block HPG indicator, HPG5,6,7,8,9. In addition, the three-block incrementor gate 930b that performs Level Three processing for dit 11 receives the HPG indicator from the dit of lesser significance within the block 310, HPG10. By the same token, the three-block incrementor gate 930c that performs Level Three processing for dit 12 receives the HPG indicator from the two dits that are less significant than dit 12 (i.e., dits 11 and 10). This HPG input into gate 930c is labeled in FIG. 28 as HPG10,11. Similarly, the three-block incrementor gate 930d for dit 13 receives HPG10,11,12 and the three-block incrementor gate 930e for dit 14 receives HPG10,11,12,13.

FIG. 18 illustrates that the three-block incrementor gates 930b–930e of Level Three, Block Three 315 will not increment the value of the dit of interest before final output if the H indicator of the block HPG signal for dits of lesser significance within Level Three, Block Three, labeled as HPG2 in FIG. 18, is asserted. On the other hand, the three-block incrementor gates 930b–930e will increment the value of the dit of interest before final output if the G2 indicator is asserted. If the P2 indicator is asserted, then the block HPG signal for Block Two, HPG5,6,7,8,9, is evaluated. The Block Two indicator, HPG5,6,7,8,9, corresponds to the signal labeled as HPG1 in FIG. 18. If P2 and H1 are asserted, then the value of the dit of interest is not incremented before output. If P2 and G1 are both asserted, then the value of the dit of interest is incremented before final output. If both the P2 and P1 indicators are asserted, then the block HPG signal for the LSBlk, HPG0,1,2,3,4, is evaluated. HPG0,1,2,3,4 is referred to as HPG0 in FIG. 18. In such a case, if the HP indicator for HPG0,1,2,3,4 is asserted, then the value of the dit of interest is not incremented before final output. Otherwise, the value of the dit of interest is incremented before final output.

Level Three, MSD

Figure 29:
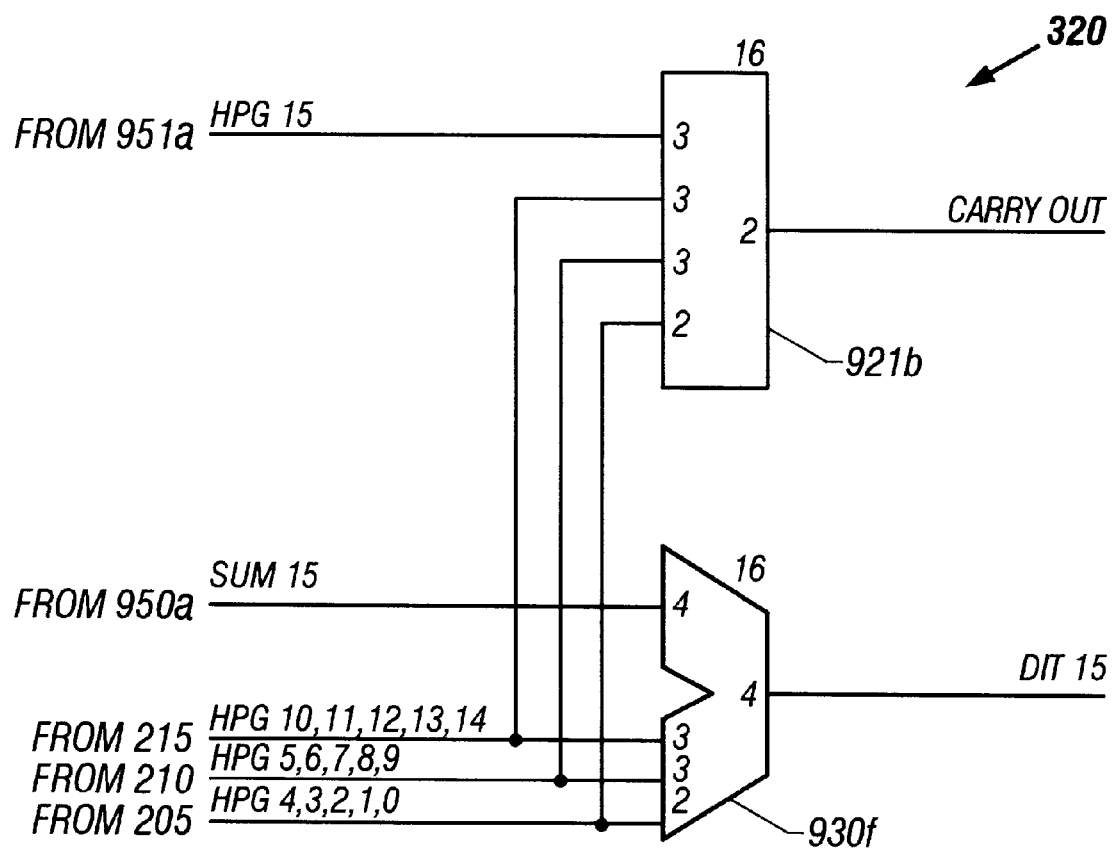
FIG. 29 is a high-level shorthand representation of Level Three, MSD processing.

FIG. 19 illustrates that Level Three, MSD 320 performs processing to produce the final output value for Dit 15 and also to produce the carry out indicator. Level Three, MSD 320 is illustrated in further detail in FIG. 29. FIG. 29 illustrates that, in order to determine whether there is a carry into dit 15, Level Three, MSD 320 comprises a three-block incrementor gate 930f. This gate 930f receives as inputs the intermediate sum for dit 15, SUM15, as well as three block HPG signals. The three block HPG signals each correspond to a less significant block. That is, the 1-of-2 HPG signal for the LSBlk, HPG0,1,2,3,4, comprises one input into gate 930f. The 1-of-3 block HPG signal for Block Two, HPG5,6,7,8,9, comprises another of the three HPG inputs into gate 930f. Finally, the block HPG signal for Block Three, HPG10,11,12,13,14 is the third input into gate 930f. The operation of gate 930f is as described above for the three-block incrementor gate 930. The HPG signal for Block Three is examined first. If necessary, the block HPG signals for successively less significant blocks are examined. FIG. 29 illustrates that, if an H signal is asserted, then the value of SUM15 is not incremented before being output as DIT15. If the gate 930f ever encounters a G signal, then the value of SUM15 is incremented by the gate 930f before being output as DIT15. If a P signal is encountered, the block HPG signal for the adjacent block is examined.

In sum, the present invention is an adder that receives as inputs two 32-bit operands. In the preferred embodiment of the present invention, the operands comprise 1-of-4 encoding. The adder of the present invention processes the two 1-of-4 operands in three stages of logic. In the first stage, ditwise addition is performed on the operands and the result, the intermediate sum, for each dit is stored in a buffer. In the second stage of logic, block HPG signals are generated to determine 1) the block HPG signal for each block of five dits, as well as the HPG signal for the MSD, and 2) an HPG signal, representing the carry into each dit except the least significant dit in a block, that is calculated by examining the HPG value of each dit of lesser significance in the block in which the dit of interest resides. In the third level of logic, the intermediate sum for each dit is incremented if there is a carry into the dit.

Other embodiments of the invention will be apparent to those skilled in the art after considering this specification or practicing the disclosed invention. The specification and examples above are exemplary only, with the true scope of the invention being indicated by the following claims.

We claim:

1. An apparatus that performs an arithmetic operation on two N-nary operands, comprising:

a 1-of-P first input that receives the first operand;

a 1-of-Q second input that receives the second operand;

a sum/HPG logic, coupled to said first input and to said second input, that performs an arithmetic operation on one grouping of two or more bits of the first operand and on one grouping of two or more bits of the second operand, to produce an intermediate result and an HPG indicator;

a block HPG logic, coupled to said sum/HPG logic, that receives said HPG indicator and produces a block HPG indicator; and an increment logic, coupled to said block HPG logic, that receives said intermediate result and said block HPG indicator and produces a 1-of-R final result and a 1-of-T carry indicator.

2. The apparatus of claim 1, wherein:

said apparatus further comprises a 1-of-S operation selector input, coupled to said sum/HPG logic, that receives a 1-of-S operation selector, wherein said operation selector comprises one of a predetermined plurality of select values comprising an add selection and a subtract selection; and said arithmetic operation comprises one of a predetermined plurality of operations comprising an add operation, to be performed when said operation selector comprises said add selection, and a subtract operation to be performed when said operation selector comprises said subtract selection.

3. The apparatus of claim 2 wherein said add operation comprises adding said grouping of two or more bits of the first operand to said grouping of two or more bits of the second operand to produce said intermediate result.

4. The apparatus of claim 2 wherein said subtract operation comprises converting said grouping of two or more bits of the first operand to a diminished radix (P−1)'s complement number and adding said diminished radix (P−1)'s complement number to said grouping of two or more bits of the second operand to produce said intermediate result, wherein said intermediate result is of the format (P−1)+ (second operand grouping−first operand grouping).

5. The apparatus of claim 2 wherein said subtract operation comprises converting said grouping of two or more bits of the first operand to a radix P's complement number and adding said radix P's complement number to said grouping of two or more bits of the second operand to produce said intermediate result, wherein said intermediate result is of the format P+(second operand grouping−first operand grouping).

6. The apparatus of claim 2 wherein P, Q and R equal four and wherein S and T equal two.

7. The apparatus of claim 1 wherein P, Q and R equal four and wherein T equals two.

8. A system for performing an arithmetic operation on two N-nary operands, comprising:

a 1-of-P first input that receives the first operand;

a 1-of-Q second input that receives the second operand;

a sum/HPG logic means, coupled to said first input and to said second input, for performing an arithmetic operation on one grouping of two or more bits of the first operand and on one grouping of two or more bits of the second operand, to produce an intermediate result and an HPG indicator;

a block HPG logic means, coupled to said sum/HPG logic, for receiving said HPG indicator and producing a block HPG indicator; and an increment logic means, coupled to said block HPG logic means, for receiving said intermediate result and said block HPG indicator and producing a 1-of-R final result and a 1-of-T carry indicator.

9. The system of claim 8, wherein:

said system further comprises a 1-of-S operation selector means, coupled to said sum/HPG logic, for selecting one of a predetermined plurality of select values comprising an add selection and a subtract selection; and said arithmetic operation further comprises a means for performing one of a predetermined plurality of operations comprising an add operation, to be performed when said operation selector comprises said add selection, and a subtract operation to be performed when said operation selector comprises said subtract selection.

10. The system of claim 9 wherein said add operation comprises a means for adding said grouping of two or more bits of the first operand to said grouping of two or more bits of the second operand and producing said intermediate result.

11. The apparatus of claim 9 wherein said subtract operation comprises a means for converting said grouping of two or more bits of the first operand to a diminished radix (P−1)'s complement number and adding said diminished radix (P−1)'s complement number to said grouping of two or more bits of the second operand to produce said intermediate result, wherein said intermediate result is of the format (P−1)+(second operand grouping−first operand grouping).

12. The apparatus of claim 9 wherein said subtract operation comprises a means for converting said grouping of two or more bits of the first operand to a radix P's complement number and adding said radix P's complement number to said grouping of two or more bits of the second operand to produce said intermediate result, wherein said intermediate result is of the format P+(second operand grouping−first operand grouping).

13. The apparatus of claim 9 wherein P, Q and R equal four and wherein S and T equal two.

14. The apparatus of claim 8 wherein P, Q and R equal four and wherein S equals two.

15. A method to manufacture an apparatus that performs an arithmetic operation on two N-nary operands, comprising:

providing a 1-of-P first input that receives the first operand;

providing a 1-of-Q second input that receives the second operand;

providing a sum/HPG logic that performs an arithmetic operation on one grouping of two or more bits of the first operand and on one grouping of two or more bits of the second operand, to produce an intermediate result and an HPG indicator;

coupling said sum/HPG logic to said first input and to said second input;

providing a block HPG logic that receives said HPG indicator and produces a block HPG indicator;

coupling said block HPG logic to said sum/HPG logic;

providing an increment logic that receives said intermediate result and said block HPG indicator and produces a 1-of-R final result and a 1-of-T carry indicator;

coupling said increment logic to said block HPG logic.

16. The method of claim 15, wherein said method further comprises:

providing a 1-of-S operation selector input that receives a 1-of-S operation selector, wherein said operation selector comprises one of a predetermined plurality of select values comprising an add selection and a subtract selection;

coupling said operation selector input to said sum/HPG logic; and wherein said arithmetic operation comprises one of a predetermined plurality of operations comprising an add operation, to be performed when said operation selector comprises said add selection, and a subtract operation to be performed when said operation selector comprises said subtract selection.

17. The method of claim 16 wherein said add operation comprises adding said grouping of two or more bits of the first operand to said grouping of two or more bits of the second operand to produce said intermediate result.

18. The method of claim 16 wherein said subtract operation comprises converting said grouping of two or more bits of the first operand to a diminished radix (P−1)'s complement number and adding said diminished radix (P−1)'s complement number to said grouping of two or more bits of the second operand to produce said intermediate result, wherein said intermediate result is of the format (P−1)+(second operand grouping−first operand grouping).

19. The method of claim 16 wherein said subtract operation comprises converting said grouping of two or more bits of the first operand to a radix P's complement number and adding said radix P's complement number to said grouping of two or more bits of the second operand to produce said intermediate result, wherein said intermediate result is of the format P+(second operand grouping−first operand grouping).

20. The method of claim 16 wherein P, Q and R equal four and wherein S and T equal two.

21. The method of claim 15 wherein P, Q and R equal four and wherein S equals two.

22. A method to perform an arithmetic operation on two N-nary operands, comprising:

receiving the first operand;

receiving the second operand;

performing an arithmetic operation on one grouping of two or more bits of the first operand and on one grouping of two or more bits of the second operand, to produce an intermediate result and an HPG indicator;

producing a block HPG indicator; and producing a 1-of-R final result and a 1-of-T carry indicator.

23. The method of claim 22, wherein:

said method further comprises selecting one of a predetermined plurality of select values comprising an add selection and a subtract selection; and said step of performing an arithmetic operation further comprises performing an add operation, when said operation selector comprises said add selection, and performing a subtract operation when said operation selector comprises said subtract selection.

24. The method of claim 23 wherein said step of performing said add operation further comprises adding said grouping of two or more bits of the first operand to said grouping of two or more bits of the second operand and producing said intermediate result.

25. The method of claim 24 wherein said step of performing said subtract operation further comprises converting said grouping of two or more bits of the first operand to a diminished radix (P−1)'s complement number and adding said diminished radix (P−1)'s complement number to said grouping of two or more bits of the second operand to produce said intermediate result, wherein said intermediate result is of the format (P−1)+(second operand grouping−first operand grouping).

26. The method of claim 24 wherein said step of performing said subtract operation further comprises converting said grouping of two or more bits of the first operand to a radix P's complement number and adding said radix P's complement number to said grouping of two or more bits of the second operand to produce said intermediate result, wherein said intermediate result is of the format P+(second operand grouping−first operand grouping).

27. The apparatus of claim 22 wherein P, Q and R equal four and wherein S equals two.

28. The apparatus of claim 22 wherein P, Q and R equal four and wherein S and T equal two.

* * * * *